US012672072B2

(12) United States Patent
Nikopour et al.

(10) Patent No.: US 12,672,072 B2
(45) Date of Patent: Jun. 30, 2026

(54) WIRELESS NETWORK ENERGY SAVING WITH GRAPH NEURAL NETWORKS

(71) Applicant: Intel Corporation, Santa Clara, CA (US)

(72) Inventors: Hosein Nikopour, San Jose, CA (US); Oner Orhan, San Jose, CA (US); Vasuki Narasimha Swamy, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/470,901

(22) Filed: Sep. 20, 2023

(65) Prior Publication Data

US 2024/0023028 A1     Jan. 18, 2024

Related U.S. Application Data

(60) Provisional application No. 63/427,285, filed on Nov. 22, 2022, provisional application No. 63/427,757, filed on Nov. 23, 2022.

(51) Int. Cl.
*H04W 52/22* (2009.01)
*G06N 3/08* (2023.01)

(52) U.S. Cl.
CPC ............ *H04W 52/223* (2013.01); *G06N 3/08* (2013.01)

(58) Field of Classification Search
CPC ....... H04W 52/223; G06N 3/08; G06N 3/044; G06N 3/045; Y02D 30/70
See application file for complete search history.

(56) References Cited

U.S. PATENT DOCUMENTS

| | | | | |
|---|---|---|---|---|
| 2023/0104448 A1* | 4/2023 | Sivakumar | ............... | G06N 3/08 |
| | | | | 706/25 |
| 2023/0138190 A1* | 5/2023 | Zhang | .................. | H04W 36/24 |
| | | | | 370/311 |
| 2023/0284139 A1* | 9/2023 | Ma | ....................... | H04B 7/0626 |
| | | | | 370/329 |

OTHER PUBLICATIONS

Qualcomm, "O-Ran: How to build high-performance 5G networks with vRan and O-Ran?", (Feb. 17, 2021), 25 pages.
Samsung, "Technical Report: Virtualized Radio Access Network", (2019), 16 pages.

(Continued)

*Primary Examiner* — Fayyaz Alam
(74) *Attorney, Agent, or Firm* — Essential Patents Group, LLP; Christopher K. Gagne

(57) ABSTRACT

The present disclosure discusses network energy savings (NES) machine learning (ML) models that predict NES parameters used to adjust control parameters of respective network nodes in a wireless network, wherein the NES parameters can be used by the respective network nodes to adjust their control parameters, such that the wireless network realizes or achieves NES as a whole. The wireless network is represented as a graph with heterogeneous vertices that represent corresponding network nodes and edges that represent connections between the network nodes. The NES ML model comprises a graph neural network (GNN) and a fully connected neural network (FCNN). The GNN may be a graph convolutional neural network or a graph attention network. The FCNN may be a multi-layer perceptron, a deep neural network, and/or some other type of neural network. Other embodiments may be described and/or claimed.

20 Claims, 12 Drawing Sheets

(56) References Cited

OTHER PUBLICATIONS

Samsung, "Technical White Paper: Virtualized RAN—vol. 2", (Apr. 2021), 16 pages.

Checko et al., "Cloud RAN for Mobile Networks—A Technology Overview," IEEE Communications Surveys & Tutorials, vol. 17, No. 1, pp. 405-426, First quarter 2015, 24 pages (Sep. 12, 2014).

Checko et al., "Evaluating C-RAN fronthaul functional splits in terms of network level energy and cost savings," in Journal of Communications and Networks, vol. 18, No. 2, pp. 162-172, 11 pages (Apr. 2016).

Checko, "IEEE 1914 NGFI (xhaul); efficient and scalable fronthaul transport for 5G", BackNets 2017 In conjunction with IEEE VTC Fall 2017, Toronto Canada, 16 pages (Sep. 24, 2017).

Gilmer et al., "Neural Message Passing for Quantum Chemistry", Proceedings of the 34th International Conference on Machine Learning in Proceedings of Machine Learning Research (PMLR), vol. 70, pp. 1263-1272 (Aug. 2017), https://proceedings.mlr.press/v70/gilmer17a.html.

He et al., "An Overview on the Application of Graph Neural Networks in Wireless Networks", IEEE Open Journal of the Communications Society, vol. 2, pp. 2547-2565, 19 pages (Dec. 2, 2021).

Malpezzi, "O-RAN Software Deployement and Orchestration on Virtualized Infrastructures", Masters Thesis in Laboratory of Networking M, Univ. of Bologna, School of Engineering and Architecture, 81 pages (Oct. 2021), https://amslaurea.unibo.it/24128/1/Malpezzi_thesis_CORRECT.pdf.

López-Pérez et al., "A Survey on 5G Radio Access Network Energy Efficiency: Massive MIMO, Learn Carrier Design, Sleep Modes, and Machine Learning", arXiv:2101.11246v2 [cs.NI], 107 pages (Oct. 7, 2021).

Hasan et al., "Green Cellular Networks: A Survey, Some Research Issues and Challenges", arXiv:1108.5493v3 [cs.NI], 16 pages (Sep. 24, 2011).

Veličković et al., "Grahp Attention Networks", ICLR 2018, 12 pages (Feb. 15, 2018), https://openreview.net/forum?id=rJXMpikCZ.

Bonati et al., "Intelligence and Learning in O-RAN for Data-driven NextG Cellular Networks", arXiv:2012.01263v2 [cs.NI], 7 pages (Jul. 21, 2021).

Polese et al., "Understanding O-RAN: Architecture, Interfaces, Algorithms, Security, and Research Challenges", transformaarXiv:2202.01032v2 [cs.NI], 33 pages (Aug. 1, 2022).

"Environmental Engineering (EE); Assessment of mobile network energy efficiency", ETSI ES 203 228 V1.3.1 (Oct. 2020), 37 pages.

ETSI, "Environmental Engineering (EE); Assessment of mobile network energy efficiency", ETSI ES 203 228 V1.4.1 (Apr. 2022), 39 pages.

"3rd Generation Partnership Project; Technical Specification Group Services and System Aspects; Study on Energy Efficiency Aspects of 3GPP Standards(Release 15)", 3GPP TR 21.866 V15.0.0 (Jun. 2017), 31 pages.

Sana et al., "Multi-agent deep reinforcement learning for distributed handover management in dense mmWave networks", IEEE International Conference on Acoustics, Speech and Signal Processing (ICASSP), pp. 8976-8980, 5 pages (May 4, 2020).

Shen et al., "Graph Neural Networks for Wireless Communications: From Theory to Practice", arXiv:2203.10800v2 [cs.IT], 15 pages (Nov. 4, 2022).

Shen et al., "Graphy Neural Networks for Scalable Radio Resource Management: Architecture Design and Theoretical Analysis", IEEE Journal on Selected Areas in Communications, vol. 39, No. 1, Jan. 2021, pp. 101-115, 15 pages (Nov. 9, 2020).

Simonovsky et al., "Dynamic edge-conditioned filters in convolutional neural networks on graphs", Proceedings of the IEEE conference on computer vision and pattern recognition, pp. 3693-3702 (2017).

Tan et al., "Graph neural network-based cell switching for energy optimization in ultra-dense heterogeneous networks", Sci Rep, vol. 12, Article No. 21581,18 pages (Dec. 14, 2022).

O-RAN, "O-RAN Working Group 6 (Cloudification and Orchestration) Cloud Architecture and Deployment Scenarios for O-RAN Virtualized RAN", O-RAN.WG6.CADS-v04.00, 55 pages (2022).

* cited by examiner

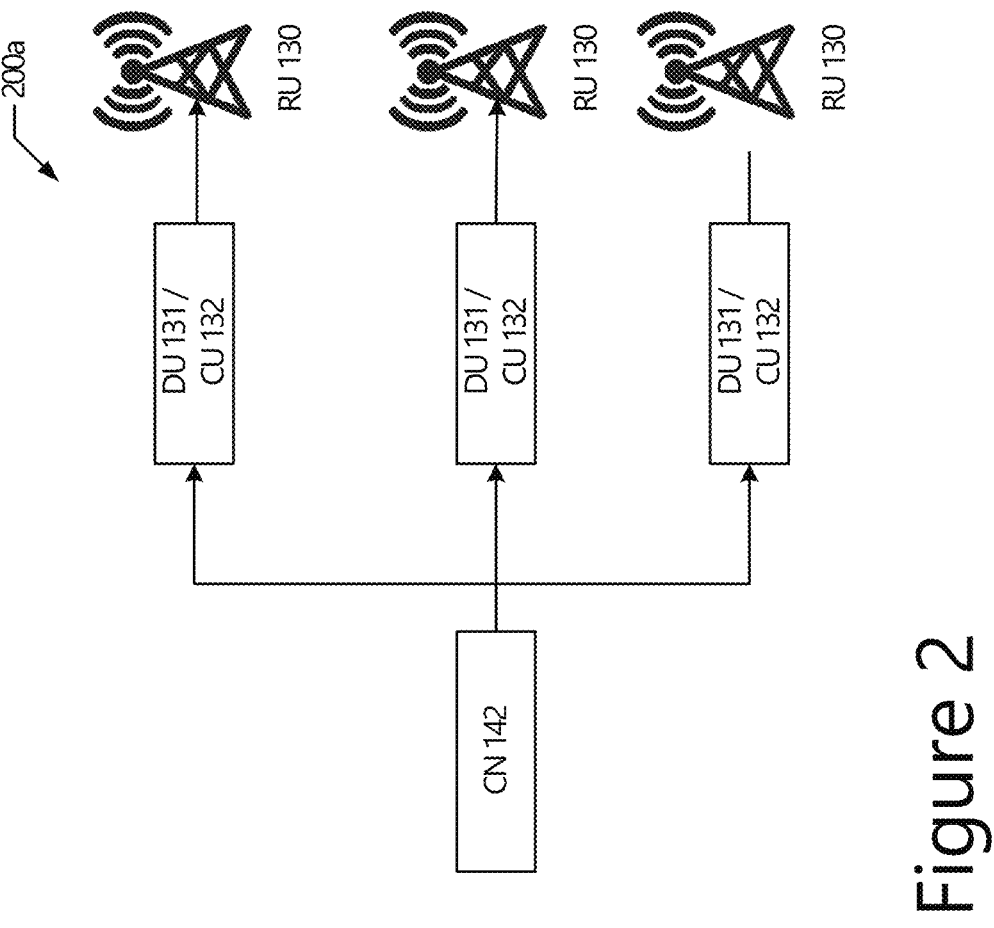
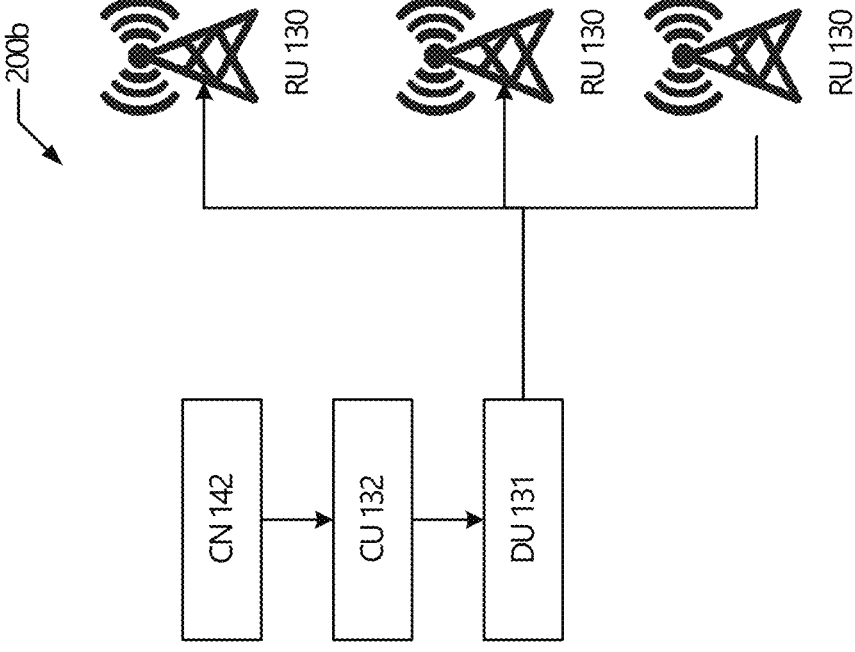
Figure 2

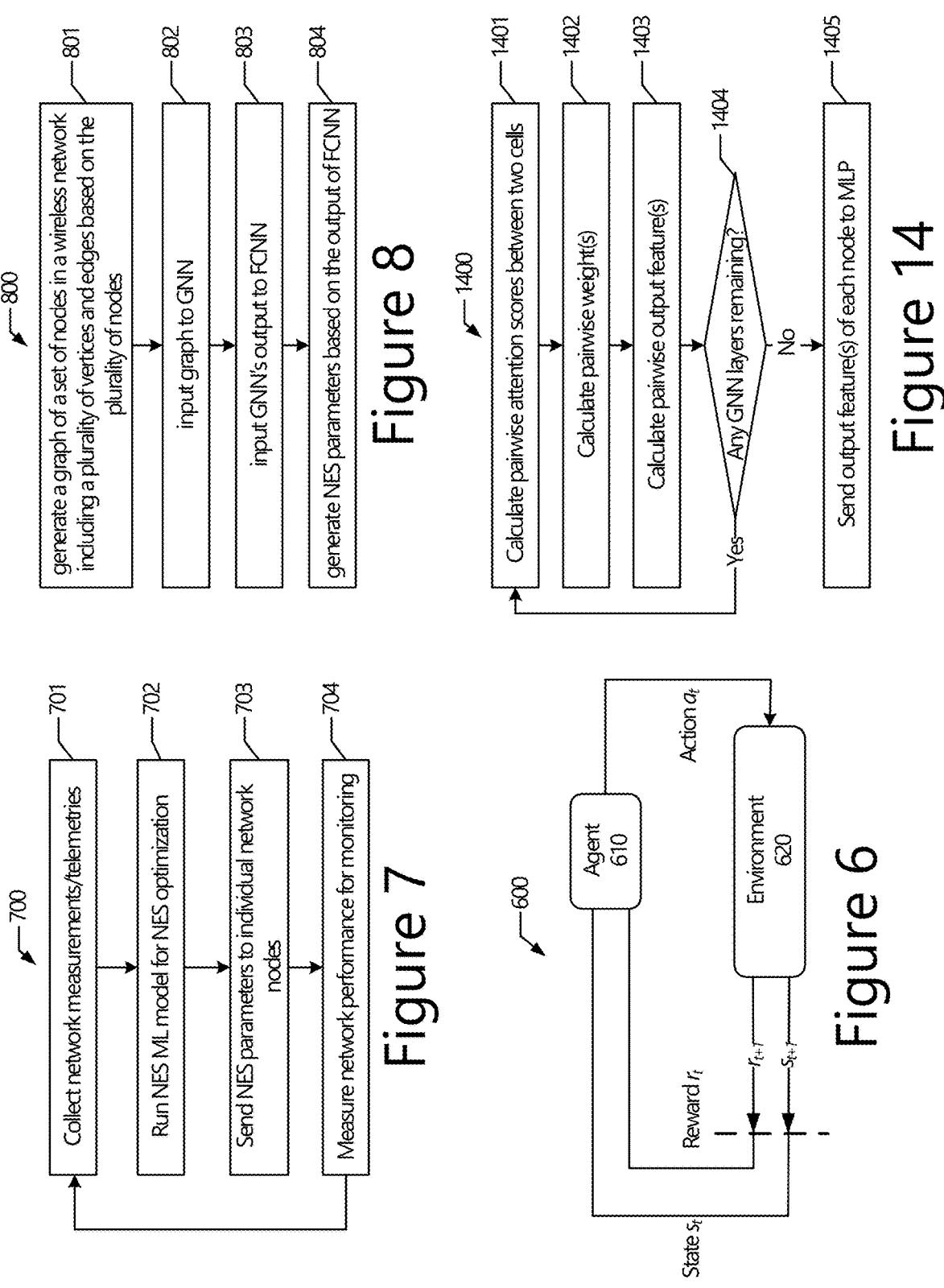

800

801 — generate a graph of a set of nodes in a wireless network including a plurality of vertices and edges based on the plurality of nodes 802 — input graph to GNN 803 — input GNN's output to FCNN 804 — generate NES parameters based on the output of FCNN

1401 — Calculate pairwise attention scores between two cells

1402 — Calculate pairwise weight(s)

1403 — Calculate pairwise output feature(s)

1404 — Any GNN layers remaining?

Yes / No

1405 — Send output feature(s) of each node to MLP

701 — Collect network measurements/telemetries

702 — Run NES ML model for NES optimization

703 — Send NES parameters to individual network nodes

704 — Measure network performance for monitoring

Agent 610

Environment 620

Action $a_t$

Reward $r_t$ $r_{t+1}$ $s_{t+1}$

State $s_t$

WIRELESS NETWORK ENERGY SAVING WITH GRAPH NEURAL NETWORKS

RELATED APPLICATIONS

The present application claims priority to U.S. Provisional App. No. 63/427,285 filed on Nov. 22, 2022 ("285") and U.S. Provisional App. No. 63/427,757 filed on Nov. 23, 2022 ("757"), the contents of each of which are hereby incorporated by reference in their entireties.

BACKGROUND

Wireless networks tend to consume a significant amount of energy resources. In addition to a one-time carbon footprint resulting from setting up and/or deploying the network, the carbon footprint for operating such networks can also be significant. Existing fifth generation (5G) networks and future network implementations and/or deployments are expected to have a large number of users and base stations with heterogeneous requirements and loads, which may increase the amount of energy such networks consume. Therefore, optimizing network energy utilization based on network needs is an important problem for providing more sustainable and energy-efficient networks. However, optimizing network energy efficiency is complex problem to model and optimize with conventional techniques. Furthermore, while some existing base station deployment optimization techniques do take energy utilization into account, such techniques do not account for energy inefficiencies in day-to-day operations of these networks.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 2 depicts example fifth generation (5G) radio access network (RAN) functional splits including a with a centralized architecture and a distributed architecture;

FIG. 6 shows an example reinforcement learning architecture;

FIGS. 7 and 8 depict example processes flow related to NES ML model inference;

FIG. 10 depicts an example network with macrocells and small cells and different kinds of UEs;

FIG. 14 shows an example process.

DETAILED DESCRIPTION

Figure 1:
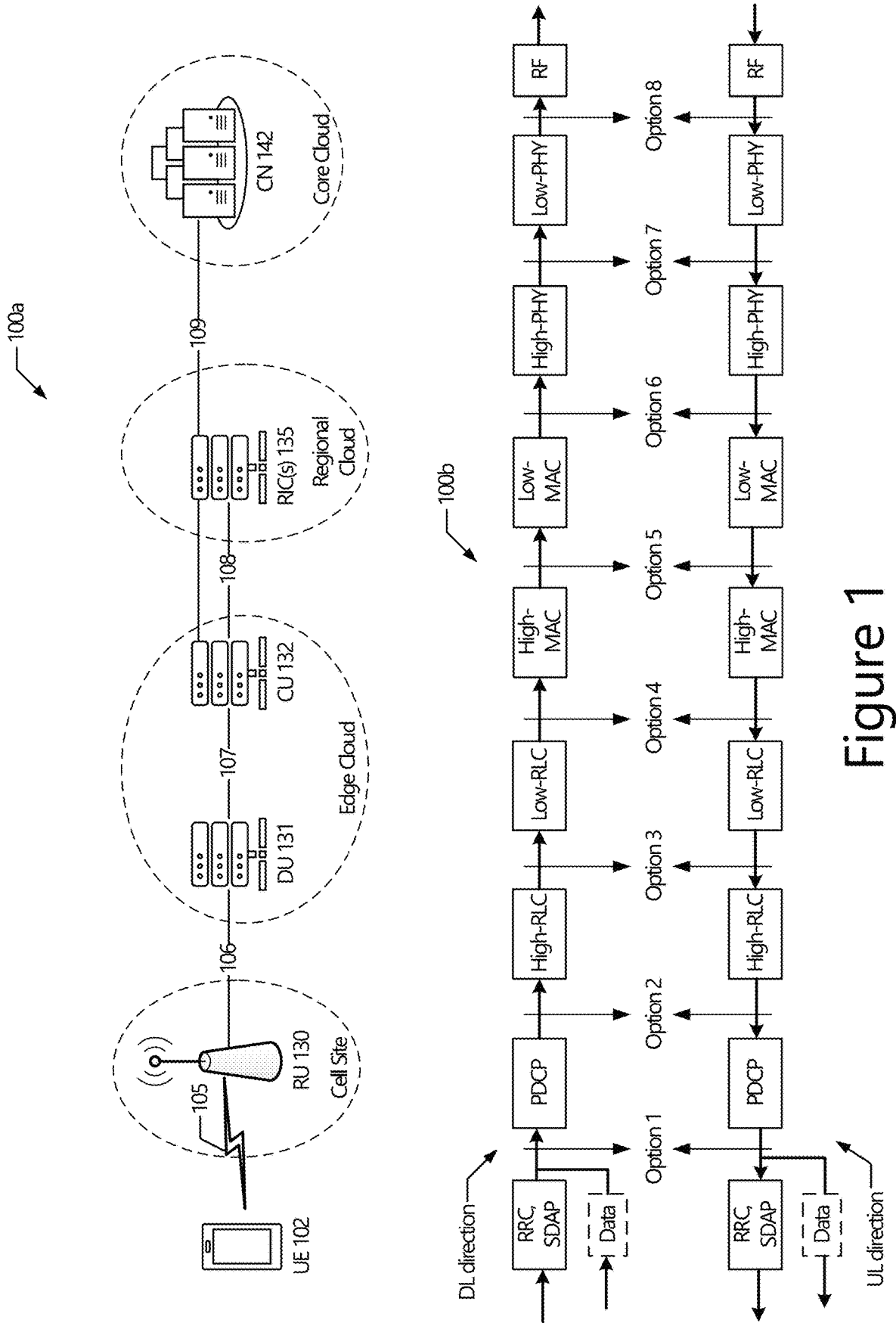
FIG. 1 depicts an example of a split network architecture.

1. Network Energy Savings (NES) with Graph Neural Network (GNN) Aspects

The present disclosure discusses technologies and techniques for wireless network energy saving (NES) using graph neural networks (GNNs) (or graph convolution neural networks (GCNs) including spectral-based and spatial-based, graph attention NNs, gated graph sequence NNs, spatial-temporal GNNs, graph autoencoders (GAEs), and/or the like). GNNs are a framework to capture the dependence of nodes in graphs via message passing between the nodes. GNNs are generally used for tasks, such as node classification, link prediction, graph classification, and/or other graph-related ML tasks. Unlike deep neural networks (DNNs), GNNs directly operate on a graph to represent information from its neighborhood with arbitrary hops. Additionally, GNNs learn embeddings of various graph attributes (e.g., nodes, edges, and global attributes/parameters). An embedding is a representation of data points in an n-dimensional space that captures their underlying relationships and patterns. GNNs are an apt tool to use for wireless networks, which have complex features that cannot be captured in a closed form.

In various embodiments, a network energy saving (NES) machine learning (ML) model architecture includes a GNN connected to another neural network (NN), such as a fully connected NN, a multi-layer perceptron (MLP), a deep NN (DNN), and/or some other type of NN, such as any of those discussed herein. A wireless network (or a portion of a wireless network) includes a set of user equipment (UEs) and a set of network access nodes (NANs). This network is represented using a graph data structure or graph representation (e.g., adjacency matrix, edge list, distributed vector, point cloud, and/or the like) with heterogeneous graph vertices and edge dependent NN weights. The vertices represent different NANs and UEs in the network, and the edges represent connections between the NANs and UEs. The graph may also include a set of embeddings or node features for each node, which may be based on collected network-related measurements, performance metrics, telemetry data, and/or other features and/or data. The graph is fed to the GNN, which is used to model the network and produce an output representation of each node in the graph. The output layer of the GNN is connected to the NN, such that the output representation is fed or otherwise provided to the NN. The NN is used to optimize network energy costs and/or resource consumption based on, for example, network-related measurements, performance metrics, telemetry data, and/or other features and/or data. For example, the NN can predict the state for each NAN in the network for NES and/or energy consumption based on the output representation from the GNN. These predictions can then be used to provide NES parameters to individual NANs in the network, which instruct or otherwise cause the individual NANs to adjust one or more control parameters so that the network as a whole can realize the NES.

In some examples, the GNN and/or the NN are trained using supervised learning and reinforcement learning (RL) techniques. These learning techniques are used to identify the types of data to be collected and implemented in the wireless network, and to identify the specific energy savings mechanisms to be used to optimize the energy savings of the network. In some examples, RL defines how the GNN fits in the training process. In this case, the GNN together with collected measurements and/or other data defines a state of a Markov decision process (MDP) formulation and how the network measurement/telemetries are used to train the NN.

The GNN approaches discussed herein are scalable AI/ML solutions that can account for a variable number of UEs and/or NANs in a given network. The scalable AI/ML solutions presented herein include sparse and/or efficient NN architecture(s) for low-latency processing. The graph adjacency matrix examples provided herein is an example of a sparse NN and utilizes a network structure. The GNN approaches discussed herein also provide a data-driven network energy efficiency optimization. The term "optimization" at least in some examples refers to an act, process, or methodology of making something (e.g., a design, system, or decision) as fully perfect, functional, or effective as possible. Optimization usually includes mathematical procedures, such as finding the maximum or minimum of a function. Such functions may be "optimization functions", "objective functions", and/or any other function, method, or process, such as any of those discussed herein. The term "optimal" at least in some examples refers to a most desirable or satisfactory end, outcome, or output, and the term "optimum" at least in some examples refers to an amount or degree of something that is most favorable to some end.

Legacy modeling techniques for wireless networks are based on, for example, per node level optimization (e.g., at the individual base station or network component level). Examples of these techniques include conventional self-organizing networks (SON) functions, such as those discussed in 3GPP TS 32.500, 3GPP TS 32.522, 3GPP TS 32.541, 3GPP TS 32.551, 3GPP TS 28.213, 3GPP TS 28.627, and 3GPP TS 28.628. However, these techniques do not include network level optimization and intelligence. Additionally, making NES-related decisions at the base station/cell level may lead to violation of the QoS for the users. For example, switching off an underloaded base station/cell could lead to the overloading of one or more neighboring base stations/cells. To resolve such issues, SON coordination mechanisms need to be employed to prevent or resolve conflicts or negative influences between different SON functions and to ensure that the SON functions comply with a network operator's policies. However, such SON coordination mechanisms can result in NES parameter changes not being implemented if they conflict with other parameter changes issued by other SON functions. Additionally, the SON coordination mechanisms can be complex and consume additional resources thereby reducing the energy savings effects of energy saving SON functions. The embodiments discussed herein do not rely on coordination among individual network nodes to resolve conflicting parameter changes, and instead, coordination takes place at the network level to guarantee the continuation of services at suitable QoS levels while reducing the energy consumption of multiple network nodes.

Other legacy modeling techniques used for wireless networks involve using genetic algorithms (GA) or swarm algorithms. GA and swarm algorithms solve optimization problems every time a solution/inference is needed, and executing such algorithms can consume relatively large amounts of resources.

By contrast, the techniques in the present disclosure allow for frequent updates and low latency processing by performing NES ML model training (e.g., RL and supervised learning techniques) offline with collected network measurement/telemetries. The trained NES ML model(s) can then be put online and executed to generate inferences. Performing offline training and operating the trained model(s) online allows the solutions herein to run faster, with lower complexity, and with lower energy consumption than using the legacy techniques, and therefore, the NES ML architecture discussed herein results in better performance than existing techniques. In these ways, the embodiments discussed herein provide a data driven approach to maximize NES and network energy efficiency while maintaining quality of service (QoS) for users.

The solutions discussed herein can be specified and/or standardized by relevant standard organization (e.g., 3GPP, ETSI, O-RAN, and/or the like). Additionally or alternatively, the solutions discussed herein can be specified by suitable interface specifications between nodes, and any network AI/ML product documentation, white papers, and/or the like.

1.1. Network Architecture Aspects

FIG. 1 shows an example network deployment 100a where a user equipment (UE) 102 is connected to an RU 130 (also referred to as a "remote radio unit 130" or "RRU 130", or "a remote radio head 130" or "RRH 130") via an air interface 105, the RU 130 is connected to a distributed unit (DU) 131 via an interface 106, the DU 131 is connected to a centralized unit (CU) 132 via an interface 107, and the CU 132 is connected to one or more RAN intelligent controllers (RICs) 135 via respective interfaces 108 and a core network (CN) 142 via a backhaul interface 109. The RU 130, DU 131, CU 132, and RIC(s) 135 may be part of a radio access network (RAN), and various combinations of the RUs 130, DUs 131, CUs 132, and RIC(s) 135 may correspond to any of the NANs discussed herein (and as such, the RUs 130, DUs 131, and CUs 132 may be collectively referred to as "NANs 130" or the like). Furthermore, although the present disclosure is described in the context of cellular networks, the various embodiments discussed herein can also be applied to other types of networks, such as wireless local area networks (WLAN), wide area networks (WANs), heterogeneous mesh networks, ad-hoc networks, wireless sensor networks (WSNs), and/or the like.

A NAN is a network element in a RAN responsible for the transmission/reception of radio signals in one or more cells or coverage areas to/from a UE 102 or provides access to a network via a wired and/or wireless medium. A NAN can have an integrated antenna or may be connected to an antenna array by feeder cables or some other connection mechanism. Additionally, a NAN may include specialized digital signal processing, network function hardware, and/or compute hardware to operate as a compute node. As examples, a NAN is, and may be alternatively referred to as, a base station (e.g., evolved Node B (eNB), next generation eNB (ng-eNB), next generation Node B (gNB), and the like), access point (AP), router, switch, hub, transmission reception point (TRP), gateway device (e.g., residential gateway, edge gateway, protocol gateway, IoT gateway, IP gateways, Internet-to-Orbit (I2O) gateways, cloud gateways, and the like), a network appliance, and/or some other network access hardware.

In some examples, the deployment 100a employs a split architecture, where a RAN split into multiple functional blocks for flexibility, cost, and/or performance purposes. In a split architecture, at least the DU 131 and RU 130 are physically separated from one another. In some split architecture implementations, a switch, hub, bridge, or other network element (not shown) may aggregate multiple RUs 130 with one DU 131, wherein the DU 131, network element, and RU(s) 130 are connected by a fronthaul interface 106 (or respective interfaces 106). Two different RAN architectures are considered as examples for purposes of the present disclosure, including a centralized RAN architecture (C-RAN) (also referred to as a "cloud RAN architecture") and a distributed RAN architecture (D-RAN). These examples are discussed in more detail infra with respect to (w.r.t) FIG. 2. However, it should be noted that the embodiments discussed herein can be applied to any other RAN architecture and/or split options.

The UE 102 is a mobile or non-mobile computing device designed to communicate with a RAN via an over-the-air (OTA) connection 105 (e.g., a Uu interface in 3GPP systems). Examples of UEs 102 include, but are not limited to, smartphones, tablets, wearable devices (e.g., smartwatch, fitness tracker, smart glasses, smart clothing/fabrics, head-mounted displays, smart shoes, and/or the like), desktop computers, workstations, laptops, digital media players, in-vehicle infotainment systems, instrument clusters, head-up display (HUD) devices, onboard diagnostic devices, dashtop mobile equipment, electronic engine management systems, electronic/engine control units, embedded systems, Internet of Things (IoT) devices, sensors, microcontrollers, control modules, engine management system, network appliances, smart appliances, drones, robots, unmanned aerial vehicles (UAVs), unmanned underwater vehicles (UUV), (semi-)autonomous vehicles, electronic signage, single-board computers (SBCs), plug computers, and/or any other type of computing devices, such as any of those discussed herein.

The UE 102 can be configured to perform signal/cell measurement and reporting procedures to provide the network (e.g., the RAN) with information about the quality of one or more wireless channels and/or the communication media in general. This information can be used to optimize various aspects of the communication system, and in particular, can be used for the NES GNN aspects discussed herein. The physical signals and/or reference signals (RS) that is/are measured include demodulation reference signals (DM-RS), phase-tracking reference signals (PT-RS), positioning reference signal (PRS), channel-state information reference signal (CSI-RS), synchronization signal block (SSB), primary synchronization signal (PSS), secondary synchronization signal (SSS), sounding reference signal (SRS), and/or the like. Additionally or alternatively, the UE 102 can be configured to perform/collect signal/cell measurements of RS and/or physical channels, and provide measurement reports to one or more NANs (e.g., RUs 130 and/or DUs 131). The measurement reports include, for example, signal strength measurements, signal quality measurements, interference measurements, and/or the like. Each measurement report can be tagged with a timestamp and/or a location of the measurement (e.g., the location where the UE 102 performed/collected the measurement(s)). As examples, the measurement and reporting procedures performed by the UE 102 can include those discussed in 3GPP TS 38.211 v17.5.0 (2023 Jun. 26), 3GPP TS 38.212 v17.5.0 (2023 Mar. 30), 3GPP TS 38.213 v17.6.0 (2023 Jun. 26), 3GPP TS 38.214 v17.6.0 (2023 Jun. 26), 3GPP TS 38.215 v17.3.0 (2023 Mar. 30) ("[TS38215]"), 3GPP TS 38.101-1 v18.2.0 (2023 Jun. 30), 3GPP TS 38.104 v18.2.0 (2023 Jun. 30), 3GPP TS 38.133 v18.2.0 (2023 Jun. 30), [TS38331], and/or [O-RAN]. Examples of the types of measurements that may be collected include any of those discussed in 3GPP TS 36.214 v17.0.0 (2022 Mar. 31), [TS38215], 3GPP TS 38.314 v17.3.0 (2023 Jun. 30), 3GPP TS 28.552 v18.3.0 (2023 Jun. 27) ("[TS28552]"), 3GPP TS 32.425 v17.1.0 (2021 Jun. 24), 3GPP TS 32.401 v17.0.0 (2022 Apr. 1), and/or IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications, IEEE Std 802.11-2020, pp. 1-4379 (26 Feb. 2021) ("[IEEE80211]"). Additionally or alternatively, any of the aforementioned measurements (or combination of measurements) may be collected by one or more NANs (e.g., RUs 130, DUs, 131, and/or CUs 132) and provided to the RIC(s) 135 and/or some other compute node(s) (e.g., cloud computing service, one or more NFs in CN 142, and/or the like), and such measurements may be collected and reported using any suitable standardized performance monitoring mechanisms, such as any of those mentioned herein. As discussed in more detail infra, the collected measurement data is/are used to train an NES model and/or as inputs to a trained NES model to predict NES parameters. In any of the examples discussed herein, any suitable data collection and/or measurement mechanism(s) may be used to collect measurement data and/or observations such as, for example, data marking, sequence numbering, packet tracing, signal measurement, data sampling, and/or timestamping techniques. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a HW configuration/implementation or non-HW-specific, or may be based on various software parameters (e.g., operating system type and/or version, and the like). Various configurations may be used to define any of the data collection parameters discussed herein. Such configurations may be defined by suitable specifications/standards, such as any of those discussed herein and/or any not yet defined.

The RU 130 is a transmission/reception point (TRP) or other physical node that handles radiofrequency (RF) processing functions. The RU 130 is a network (logical) node hosting lower layers based on a lower layer functional split. For example, in 3GPP NG-RAN and/or O-RAN architectures, the RU 130 hosts low-PHY layer functions (see e.g., 3GPP TS 36.201 v17.0.0 (2022 Mar. 31), 3GPP TS 38.201 v17.0.0 (2022 Jan. 5), and/or IEEE Standard for Local and Metropolitan Area Networks: Overview and Architecture, IEEE Std 802-2014, pp. 1-74 (30 Jun. 2014) ("[IEEE802]")) and RF processing of the radio interface (e.g., interface 105) based on a lower layer functional split. The RU 130 may be similar to 3GPP's transmission/reception point (TRP) or RRH, but specifically includes the Low-PHY layer. Examples of the low-PHY functions include fast Fourier transform (FFT), inverse FFT (iFFT), CP addition, physical random access channel (PRACH) extraction, precoding, digital and beamforming, digital-to-analog conversion, in-phase and quadrature (IQ) decompression, and the like. Additionally, the RU 130 is shown as being deployed at a cell site, which refers to the location where RF and/or antenna elements are physically deployed. In this example, the cell site includes a single RU 130. However, in other implementations each cell site can include multiple RUs 130, which may allow individual cell sites to support and/or cover multiple sectors.

The DU 131 controls radio resources, such as time and frequency bands, locally in real time, and allocates resources to one or more UEs 102. The DUs 131 are network (logical) nodes hosting middle and/or lower layers of the network protocol functional split. For example, in some NG-RAN and/or O-RAN implementations, a DU 131 hosts the radio link control (RLC) layer (see e.g., 3GPP TS 36.322 v17.0.0 (2022 Apr. 15) and 3GPP TS 38.322 v17.3.0 (2023 Jun. 30)), medium access control (MAC) layer (see e.g., 3GPP TS 36.321 v17.5.0 (2023 Jun. 30), 3GPP TS 38.321 v17.5.0 (2023 Jun. 30), and/or [IEEE802]), and high-physical (PHY) layer (see e.g., 3GPP TS 36.201 v17.0.0 (2022 Mar. 31), 3GPP TS 38.201 v17.0.0 (2022 Jan. 5), and/or [IEEE802]) of the gNB or en-gNB, and its operation is at least partly controlled by the CU 132. In some implementations, a DU 131 can host a Backhaul Adaptation Protocol (BAP) layer (see e.g., 3GPP TS 38.340 v17.5.0 (2023 Jun. 30)) and/or a F1 application protocol (F1AP) layer (see e.g., 3GPP TS 38.470 v17.5.0 (2023 Jun. 29)), such as when the DU 131 is operating as an Integrated Access and Backhaul (IAB) node. In some examples, one DU 131 supports one or multiple cells (e.g., RUs 130 at one or more cell sites), and one cell (e.g., RU 130 at a cell site) is supported by only one DU 131. A DU 131 terminates the F1 interface connected with a CU 132.

The CU 132 is a central controller that can serve or otherwise connect to one or multiple DUs 131 and/or multiple RUs 130. The CU 132 is a network (logical) node hosting higher/upper layers of a network protocol functional split. For example, in the 3GPP NG-RAN and/or O-RAN architectures, the CU 132 hosts the radio resource control (RRC) layer (see e.g., 3GPP TS 36.331 v17.5.0 (2023 Jul. 4) and/or 3GPP TS 38.331 v17.5.0 (2023 Jul. 1) ("[TS38331]")), Service Data Adaptation Protocol (SDAP) layer (see e.g., 3GPP TS 37.324 v17.0.0 (2022 Apr. 13)), and/or Packet Data Convergence Protocol (PDCP) layer (see e.g., 3GPP TS 36.323 v17.2.0 (2023 Jan. 13) and/or 3GPP TS 38.323 v17.5.0 (2023 Jun. 30)) of a next generation NodeB (gNB), or hosts the RRC and PDCP protocol layers when included in or operating as an E-UTRA-NR gNB (en-gNB). Although not shown by FIG. 1, the CU 132 may include a CU-control plane (CP) entity (referred to herein as "CU-CP 132") and a CU-user plane (UP) entity (referred to herein as "CU-UP 132"). The CU-CP 132 is a logical node that hosts the RRC layer and the CP part of the PDCP layer of the CU 132 (e.g., a gNB-CU for an en-gNB or a gNB). The CU-UP 132 is a logical node hosting the UP part of the PDCP layer (e.g., for a gNB-CU 132 of an en-gNB or the gNB-CU 132 of a gNB), and the SDAP protocol layer (e.g., for the gNB-CU 132 of a gNB). In some implementations, the CU 132 operates an ML training function to perform NES ML model training and/or operates a connection management function (CMF) to perform NES inference generation as discussed infra.

Additionally, the DU 131 and CU 132 are shown as being deployed in, or otherwise part of, and edge cloud. The edge cloud includes various computing infrastructure (e.g., one or more edge compute nodes and/or the like) that is/are deployed closer to the location where data is being generated, processed, and/or consumed (e.g., at the "edge" of a network). Additionally or alternatively, the edge cloud is a location and/or a collection of compute infrastructure (e.g., cloud resource pools and/or the like) that supports virtualized RAN (vRAN) functions for one or multiple cell sites, and provides centralization of RAN functions for those sites and associated economies of scale. An edge cloud might serve a large physical area or a relatively small area that is relatively close to its cell sites, depending on implementation and/or use case. However, the cell sites served by the edge cloud must be near enough to the RUs 130 to meet network latency requirements of the DU 131 functions.

In some implementations, the CU 132, DU 131, and RU 130 are functional blocks of one or more NANs. For example, in 3GPP NG-RAN implementations, the CU 132, DU 131, and RU 130 are part of an next generation (NG)-RAN architecture, where each NAN is a gNB that includes a gNB-CU 132, one or more gNB-DUs 131, and each gNB-DU 131 includes or is connected to one or more RUs 130. In these implementations, the gNB-CU 132 is connected to each gNB-DU via respective F1 interfaces, and connected to the 5G CN (5GC) 142 via an NG interface. The gNB-CU 132 is also connected to other gNB-CUs 132 in other gNBs via respective Xn control plane (Xn-C) interfaces. Additional aspects of the NG-RAN architecture are discussed in 3GPP TS 38.401 v17.5.0 (2023 Jun. 29) ("[TS38401]"), 3GPP TS 38.410 v 17.1.0 (2022 Jun. 23), 3GPP TS 38.473 v17.5.0 (2023 Jun. 29), 3GPP TS 38.300 v17.5.0 (2023 Jun. 30) ("[TS38300]"), and [O-RAN].

The RIC(s) 135 are functional entities that optimize and/or manage the performance of a network's RAN, which can make cellular networks more flexible, efficient, and adaptable to different use cases and/or deployment scenarios through the implementation of software-defined networking (SDN) and network function virtualization (NFV) principles. Additionally, the RIC(s) 135 is/are shown as being deployed in, or otherwise part of, a regional cloud. The regional cloud is a location and/or a collection of compute infrastructure (e.g., cloud resource pools and/or the like) that supports vRAN functions for multiple cell sites in or part of multiple edge clouds, and provides high centralization of functionality. In some implementations, the sites served by the regional cloud are deployed near enough to the DUs 131 to meet network latency requirements of the CU(s) 132 and near-RT RIC. In some implementations, the RIC(s) 135 operate an ML training function to perform NES ML model training and/or operate a CMF to perform NES inference generation as discussed in more detail infra.

In O-RAN implementations (see e.g., [O-RAN]), the RIC(s) 135 can include a near-real time (RT) RIC and a non-RT RIC. The non-RT RIC is the functionality internal to a Service Management and Orchestration (SMO) in the O-RAN architecture that provides an A1 interface to the near-RT RIC (e.g., in the O-RAN architecture the A1 interface connects the non-RT RIC to the near-RT RIC). The non-RT RIC supports intelligent RAN optimization by providing policy-based guidance, AI/ML model management, and enrichment information to the near-RT RIC so that the RAN can optimize various network operating aspects such as, for example, radio resource management (RRM), traffic steering, traffic splitting, QoS/QoE optimization, massive MIMO optimization, RAN/network slicing, context-based dynamic handover, the NES optimization aspects discussed herein, and/or other functions. Additionally, the non-RT RIC can use data analytics and AI/ML training/inference to determine RAN optimization actions (e.g., NES parameters discussed infra) for which it can leverage SMO services, such as data collection and provisioning services of the O-RAN nodes as well as the O1 and O2 interfaces.

The non-RT RIC comprises two sub-functions including a non-RT RIC framework and non-RT RIC applications (rApps). The non-RT RIC Framework is the functionality internal to the SMO framework that logically terminates the A1 interface and exposes the required services to rApps through an interface internal to the SMO (e.g., the R1 interface). The rApps are modular applications (apps) that leverage the functionality exposed by the non-RT RIC framework to perform RAN optimization and/or other functions. Services exposed to rApps via the R1 interface enable the rApps to obtain information and trigger actions (e.g., policies, re-configuration, and/or the like) through the A1, O1, O2, and Open FH M-Plane related services. In some examples, individual rApps may be independent of the non-RT RIC (or a network operator and/or an owner/operator of the non-RT RIC), and may be developed or otherwise provided by third party developers. In some O-RAN implementations, one or more rApps may be designed to train the NES GNN and/or the NES FCNN as discussed herein, and/or one or more other rApps may be designed to execute the trained NES ML model to generate NES inferences/actions.

The near-RT RIC is a logical function that enables near RT control and optimization of functions and resources of E2 nodes (e.g., the DU 131, CU 132, and/or RU 130) via fine-grained data collection and actions over the E2 interface with control loops in the order of 10 milliseconds (ms) to 1 second (s). The near-RT RIC hosts one or more near-RT RIC applications (xApps) that can use the E2 interface to collect near-RT information (e.g., on a UE basis, a cell basis, component carrier basis, and/or the like) and provide value added services based on such information. As examples, the near-RT information can include the various measurements collected by individual UEs 102 and/or RAN nodes and/or telemetry/trace data collected by individual UEs 102 and/or RAN nodes. An xApp is an app designed to run on a near-RT RIC, which may include one or more microservices. At the point of on-boarding, an xApp identifies the types of data it consumes and the types it data it provides to other network nodes, if any. Additionally, individual xApps may be independent of the near-RT RIC (or a network operator and/or an owner/operator of the near-RT RIC), and may be developed or otherwise provided by third party developers. In some O-RAN implementations, one or more xApps may be designed to train the NES GNN and/or NES NN as discussed herein, and/or one or more other xApps may be designed to execute the trained NES ML model to generate NES inferences/actions. For example, an rApp may be configured to train the NES ML model, and the trained NES ML model can be deployed to a suitable xApp that operates the trained NES ML model to generate NES inferences.

The near-RT RIC control over the E2 nodes is steered via the policies and the enrichment data provided via the A1 interface from the non-RT RIC. For example, the near RT RIC may monitor, suspend/stop, override, and/or control the behavior of one or more E2 nodes based on the policies and enrichment data. In some implementations, the policies and enrichment data can include data to be used for operating the trained NES ML model to generate inferences, or the policies and enrichment data include the trained NES ML model itself. Furthermore, based on the available data, the near-RT RIC generates RAN analytics information and exposes it to Y1 consumers (e.g., NFs in CN 142, entities/elements inside or outside a PLMN, and/or the like) via a Y1 interface. In some examples, the RAN analytics data can include various NES parameters, actions, and/or cell/node statuses before and/or after NES actions are implemented based on the NES inferences.

In other implementations, the RIC(s) 135 may represent one or more edge apps that operate on or within a specific edge computing framework, such as any of those discussed herein. In a first example, the RAN is implemented according to the ETSI MEC framework (see e.g., [MEC]) wherein the RIC(s) 135 include a first MEC app and a second MEC app operating on one or more MEC hosts. In this example, the first MEC app operates in a same or similar manner as the aforementioned rApp and/or non-RT RIC, and the second MEC app operates in a same or similar manner as the aforementioned xApp and/or near-RT RIC. Additionally, the regional cloud includes one or more MEC hosts (or the MEC platforms and/or virtualization infrastructure within each of the MEC hosts), or the regional cloud includes an external cloud environment. Furthermore, the CU(s) 132 and/or DU(s) 131 can be respective MEC apps operated by the same MEC hosts that operate the RIC(s) 135 or different MEC hosts deployed closer to their associated cell sites than the MEC hosts that host the RIC(s) 135.

In a second example, the RAN is implemented according to the 3GPP edge computing framework (see e.g., [3GPPEdge]) wherein the RIC(s) 135 include a first edge application server (EAS) and a second EAS operating on or within an edge hosting environment. Here, the edge hosting environment includes compute/virtualization infrastructure in an edge data network (EDN). In this example, the first EAS operates in a same or similar manner as the aforementioned rApp and/or non-RT RIC, and the second EAS operates in a same or similar manner as the aforementioned xApp and/or near-RT RIC. Additionally, the regional cloud includes or represents the compute/virtualization infrastructure within the EDN. Furthermore, the CU(s) 132 and/or DU(s) 131 can be respective EASs operating within the same EDN or a different EDN.

In a third example, the RAN is implemented according to the 3GPP edge computing framework (see e.g., [3GPPEdge]) wherein the RIC(s) 135 include a first cloud application server (CAS) and a second CAS operating on or within a cloud hosting environment. Here, the cloud hosting environment includes compute/virtualization infrastructure in a cloud data network (CDN). In this example, the first CAS operates in a same or similar manner as the aforementioned rApp and/or non-RT RIC, and the second CAS operates in a same or similar manner as the aforementioned xApp and/or near-RT RIC. Additionally, the regional cloud includes or represents the compute/virtualization infrastructure within the CDN. Furthermore, the CU(s) 132 and/or DU(s) 131 can be respective EASs operating within an EDN that is connected to the CDN. Additional or alternative edge computing frameworks can be used in other implementations.

The CN 142 is a component of a telecommunications or computer network that performs functions related to data routing, service delivery, mobility management, Quality of Service (QoS) management, authorization, policy enforcement, network security, and/or other functions. The CN 142 serves as the backbone of the network, responsible for handling and directing data traffic between various UEs 102 via one or more RANs. For purposes of the present disclosure, the CN 142 is a 5G CN (5GC) that includes a service-based architecture (SBA) and supports network slicing, ultra-reliable low-latency communication (URLLC), and various other features. The various network functions and other aspects related to the 5GC are discussed in [TS23501] and/or other 3GPP standards. In this example, the CN 142 is shown as being deployed in, or otherwise part of, a core cloud. The core cloud is a location and/or a collection of compute infrastructure (e.g., cloud resource pools and/or the like) that supports network functions for multiple UEs 102, cell sites, and edge clouds. In some examples, the core cloud may represent a datacenter or other cloud service provider infrastructure.

Each of the edge cloud, regional cloud, and core cloud (collectively referred to as "clouds" or "cloud sites") includes functionality to support both user plane (also referred to as the "deployment plane") and control plane (also referred to as the "management plane") services. Each cloud includes a collection of resources, resource pools, and cloud services (e.g., deployment plane services, management plane services, infrastructure management services, deployment management services, and/or the like) at one or more cloud sites including software elements to manage resource provisioning, nodes, clusters, and deployments hosted on them. A resource (sometimes referred to as a "cloud resource") represents a unit of defined capabilities and characteristics within a cloud or cloud site that can be provisioned and used for providing services. Examples of cloud resources include compute resources, hardware (HW) acceleration resources, storage resources, gateway resources, and networking (e.g., "site network fabric resources"). A resource pool is a collection of resources with the same or similar capabilities and characteristics within a cloud site. In some examples, each resource pool includes a set of resources, one or more interfaces and/or network connections, and/or internal HW accelerators (see e.g., acceleration circuitry 1512 of FIG. 15). A site network fabric is a resource that connects resources (or resource pools) to other resources (or resource pools) within a cloud site. A cloud site is a set of resources (or resource pools) at a geographical location. Multiple cloud sites can be interconnected into a distributed cloud using bridging, routing, stitching, and/or other networking and/or transport layer functionality in between each cloud site. As examples, the resources and/or resource pools include some or all of the elements described infra w.r.t FIG. 15.

Each of the RUs 130, DUs 131, CUs 132, RIC(s) 135, and CN 142 are connected to one another through respective links/interfaces 106, 107, 108, and 109, which may be any suitable wireless and/or wired (e.g., fiber, copper, and the like) links or connections. Although not shown by FIG. 1, some of the interfaces may connect nodes having a same type. For example, multiple RUs 130 may be connected to one another via respective interfaces 105 and/or respective interfaces 106, multiple DUs 131 may be connected to one another via respective interfaces 106 and/or respective interfaces 107, and multiple CUs 132 may be connected to one another via respective interfaces 107 and/or respective interfaces 108. The specific access technologies used to implement the interfaces 106, 107, 108, and 109 may be based on the particular standards, frameworks, protocols, and/or implementation being used. For example, in NG-RAN implementations, the interface 107 may represent an F1 interface (e.g., including an F1-C interface between the CU-CP 132 and the DU 131 and/or an F1-U interface between the CU-UP 132 and the DU 131) and interface 108 may represent an NG interface between the CU 132 and the CN 142 (e.g., including an NG CP (NG-C) interface between the CU-CP 132 and CP elements of the CN 142 and/or an NG UP (NG-U) interface between the CU-UP 132 and the UP elements of the CN 142). Additionally, the CU-CP 132 terminates an E1 interface (not shown) connected with the CU-UP 132, and the CU-UP 132 terminates an E1 interface (not shown) connected with the CU-CP 132. O-RAN implementations include the NG-RAN interfaces discussed previously and the interface 106 represents an open fronthaul (OFH) interface between the RU 130 and DU 131, and the interface 108 represents an E2 interface and/or O1 interface between the CU 132 and the RIC(s) 135. O-RAN implementations also include an A1 interface between the non-RT RIC and near-RT RIC (not shown by FIG. 1). Additionally or alternatively, the interfaces 106, 107, and 108 may be part of an xHaul interface, where interface 106 is a fronthaul interface (e.g., between RU 130 and DU 131), interface 107 is a midhaul interface (e.g., between DU 131 and CU 132, or between two CUs 132), and interface 108 is a backhaul interface (e.g., between CU 132 and a NF such as a UPF or AMF). In these examples, the fronthaul interface 106 may be an O-RAN 7.2x Fronthaul (see e.g., [ORAN.XPSAAS]

and [ORAN.CUS]), next generation fronthaul interface (NGFI) (see e.g., *IEEE Standard for Packet-based Fronthaul Transport Networks, IEEE Standards Association*, IEEE 1914.1-2019 (21 Apr. 2020) ("[IEEE1914.1]")), Common Radio Interface (CPRI) and/or enhanced Common Radio Interface (eCPRI) (see e.g., *Common Public Radio Interface: eCPRI Interface Specification*, eCPRI Specification v2.0 (2019 May 10), *Common Public Radio Interface: Requirements for the eCPRI Transport Network*, eCPRI Transport Network v1.2 (2018 Jun. 25)), Radio over Ethernet (RoE) (see e.g., *IEEE Standard for Radio over Ethernet Encapsulations and Mappings*, IEEE STANDARDS ASSOCIATION, IEEE 1914.3-2018 (5 Oct. 2018)), a Functional Application Platform Interface (FAPI) and/or network FAPI (nFAPI), and/or the like. Additionally or alternatively, the interface 109 may be a suitable backhaul interface. For example, in NG-RAN implementations, the backhaul interface 109 may be an N2 reference point/interface (e.g., between the RAN and an Access and Mobility Management Function (AMF) in CN 142) or N3 reference point/interface (e.g., between the RAN and a user plane function (UPF) inside or outside the CN 142). Additionally or alternatively, the interfaces 106, 107, 108, and 109 can be implemented using any other RAT discussed herein.

In some implementations, a fronthaul gateway function (FHGW), hub site router (HSR), or other network element may be disposed between the DU 131 and the RU 130 (not shown by FIG. 1), where the interface between the DU 131 and the FHGW is an OFH interface, the interface between FHGW function and the RU 130 is an OFH interface or any other suitable interface (e.g., option 7, option 8, or the like) including those that do not support OFH (e.g., Option 7-2x). The FHGW may be packaged with one or more other functions (e.g., Ethernet switching and/or the like) in a physical device or appliance. In some implementations, a RAN controller may be communicatively coupled with the CU 132 and/or the DU 131.

Additionally or alternatively, the CU(s) 132, DU(s) 131, and/or RU(s) 130 may be IAB-nodes and/or IAB-donors arranged in an IAB topology. Here, IAB-nodes are RAN nodes that support 5G/NR access links/interfaces to UEs 102 and 5G/NR backhaul links/interfaces to parent nodes and child nodes, and IAB-donors are RAN nodes that provide network access to UEs 102 via a network of backhaul and access links/interfaces. Backhauling can occur via a single hop or via multiple hops. All IAB-nodes that are connected to an IAB-donor via one or multiple hops form an IAB topology with the IAB-donor as its root. In some examples, the IAB topology may be a directed acyclic graph (DAG) topology. The IAB-donor performs centralized resource, topology, and route management for the IAB topology. In these implementations, individual CUs 132 may be IAB-donor-CUs, individual DUs 131 may be IAB-DUs or IAB-donor-DUs, and individual RUs 130 may be IAB-nodes and/or IAB-mobile termination (MT). Additional IAB aspects are shown and described in [TS38300], [TS38401], and [TS23501]. In these implementations, the connection management and/or NES techniques discussed herein may include total or partial inter-donor migration (e.g., migration of an IAB-MT to a parent node underneath a different IAB-donor-DU and/or a different IAB-donor-CU, or the like).

Although the deployment 100a shows the CU 132, DU 131, RU 130, and CN 142 as separate entities, in other implementations some or all of these network nodes can be bundled, combined, or otherwise integrated with one another into a single device or element, including collapsing some internal interfaces (e.g., F1-C, F1-U, E1, E2, A1, O1, O2, and the like). At least the following implementations are possible: (i) integrating the CU 132 and the DU 131 (e.g., a CU-DU), which is connected to the RU 130 via the NGFI-I; (ii) integrating the DU 131 and the RU 130 integrated (e.g., CU-DU), which is connected to the CU 132 via NGFI-II; (iii) integrating a RAN controller and the CU 132, which is connected to the DU 131 via NGFI-II; (iv) integrating the CU 132, the DU 131, and the RU 130, which is connected to the CN 142 via backhaul interface 109; and (v) integrating the network controller (or intelligent controller), the CU 132, the DU 131, and the RU 130. Any of the aforementioned example implementations involving the CU 132 may also include integrating the CU-CP 132 and CP-UP 132.

FIG. 1 also shows various functional split options 100*b*, for both DL and UL directions. The split options 100*b* are mostly split between the CU 132 and the DU 131, but can include a split between the CU 132, DU 131, and RU 130. For each option, protocol entities on the left side of the figure are implemented by the CU 132 and the protocol entities on the right side of the figure are implemented by the DU 131 and/or RU 130. For example, the Option 2 function split includes splitting non-real time (RT) processing (e.g., RRC and PDCP layers) from RT processing (e.g., RLC, MAC, and PHY layers), where the CU 132 performs network functions of the RRC and PDCP layers, and the DU 131 performs the baseband processing functions of the RLC (including high-RLC and low-RLC), MAC (including high-MAC and low-MAC), and PHY layers. In some implementations, the PHY layer is further split between the DU 131 and the RU 130, where the DU 131 performs the high-PHY layer functions and the RU 130 handles the low-PHY layer functions. In some implementations, the low-PHY entity may be operated by the RU 130 regardless of the selected functional split option. Under the Option 2 split, the CU 132 can connect to multiple DU 131 (e.g., the CU 132 is centralized), which allows RRC and PDCP anchor change to be eliminated during a handover across DUs 131 and allows the centralized CU 132 to pool resources across several DUs 131. In these ways, the option 2 function split can improve resource efficiencies. The particular function split option used may vary depending on the service requirements and network deployment scenarios, and may be implementation specific. It should also be noted that in some implementations, all of the function split options can be selected where each protocol stack entity is operated by a respective RAN function. Other split options are possible such as those discussed in [ORAN.IPC-HRD-Opt6], [ORAN.IPC-HRD-Opt7-2], [ORAN.IPC-HRD-Opt8], [ORAN.OMAC-HRD], and [ORAN.OMC-HRD-Opt7-2].

In one example, the deployment 100*a* may implement a low level split (LLS) (also referred to as a "Lower Layer Functional Split 7-2x" or "Split Option 7-2x") that runs between the RU 130 and the DU 131 (see e.g., [ORAN.IPC-HRD-Opt7-2]; [ORAN.OMAC-HRD]; and [ORAN.OMC-HRD-Opt7-2]). Other LLS options may be used, such as, for example, the 3GPP NG-RAN functional split (see e.g., [TS38401] and 3GPP TR 38.801 v14.0.0 (2017 Apr. 3)), the Small Cell Forum for Split Option 6 (see e.g., 5G small cell architecture and product definitions: Configurations and Specifications for companies deploying small cells 2020-2025, Small Cell Forum, document 238.10.01 (5 Jul. 2020), 5G NR FR1 Reference Design: The case for a common, modular architecture for 5G NR FR1 small cell distributed radio units, Small Cell Forum, document 251.10.01 (15 Dec. 2021), and [ORAN.IPC-HRD-Opt6]), and/or O-RAN white-box hardware Split Option 8 (e.g., [ORAN.IPC-HRD-Opt8]).

FIG. 2 depicts examples of 5G RAN functional splits for the deployment 100*a* of FIG. 1, including a D-RAN 200*a* and a C-RAN 200*b*. In D-RAN 200*a*, the CU 132, DU 131, and RU 130 are collocated and/or reside at the cell site, and the CN 142 is located at a centralized site. The D-RAN 200*a* may be based on an integrated architecture where the RU 130 and the DU 131 are implemented on one platform. Additionally, each RU 130 and/or RF front end is associated with one DU 131, and they are then aggregated with a CU 132 and connected by an F1 interface.

The C-RAN 200*b* involves splitting the radio components into discrete components, which can be deployed at different locations. In some C-RAN 200*b* examples, the CU 132 operates/implements the RRC, PDCP, and SDAP layers; the DU 131 operates/implements the RLC, MAC, and high-PHY layers; and each RU 130 operates/implements respective low-PHY layers and respective RF layers. In one example C-RAN implementation, only the RU 130 is disposed at the cell site, and the DU 131, the CU 132, and the CN 142 are centralized or disposed at a central location. In another example C-RAN implementation, the RU 130 and the DU 131 are located at the cell site, and the CU 132 and the CN 142 are at the centralized site. In another example C-RAN implementation, only the RU 130 is disposed at the cell site, the DU 131 and the CU 132 are located a RAN hub site, and the CN 142 is at the centralized site.

1.2. Energy/Power Consumption Aspects

Example metrics and/or parameters for network power estimation are provided in table 1.2-1 (see e.g., López-Pérez et. al., A Survey on 5G Radio Access Network Energy Efficiency: Massive MIMO, Lean Carrier Design, Sleep Modes, and Machine Learning, arXiv:2101.11246v2 [cs.NI] (7 Oct. 2021) ("[López-Pérez]")). The parameters described in table 1.2-1 are intended as examples of parameters, and additional or alternative parameters may be used in other examples.

TABLE 1.2-1

| | | Power dissipation models | | |
| --- | --- | --- | --- | --- |
| | Deployment setting | Power Consumption Model, $P_{BS}$ | NAN power telemetries | Control parameters for energy saving |
| D-RAN 200a | MIMO Base station | $N_T \dfrac{\frac{P_{out}}{\eta_{PA}}(1 - \sigma_{feed}) + P_{RF} + P_{BB}}{(1 - \sigma_{DC})(1 - \sigma_{MS})(1 - \sigma_{cool})}$ | $N_T$: number of antennas<br>$P_{out}$: transmitter power<br>$\eta_{PA}$: PA efficiency<br>$\sigma_{feed}$: feed loss<br>$P_{RF}$: RF circuit power<br>$P_{BB}$: baseband power | $N_T$, $P_{out}$ |

TABLE 1.2-1-continued

| | | | Control |
|---|---|---|---|
| | | | parameters for |
| Deployment setting | Power Consumption Model, $P_{BS}$ | NAN power telemetries | energy saving |
| | | $\sigma_{DC}$: DC supply loss | |
| | | $\sigma_{MS}$: Main supply loss | |
| | | $\sigma_{Cool}$: cooling loss | |
| Carrier Aggregation | $\sum_{j=1}^{N_{cc}} (\delta_j P_{out,j} + B_j P_{0,j}) + P_{CP}$ | $P_{out,j}$: Transmit power for carrier j<br>$\delta_j$: transmitter efficiency for carrier j (includes losses, and PA efficiency)<br>$P_{0,j}$: Carrier j depended on circuit power<br>$B_j$: Bandwidth of carrier j<br>$P_{CP}$: Carrier independent circuit power<br>$N_{cc}$: # of component carriers | $P_{out,j}, N_{cc}$ |
| MIMO Base station with variable RF chain | $\delta P_{out} + N_{RF} P_0 + P_{CP}$ | $P_{out}$: Transmitter power<br>$\delta$: Transmitter efficiency<br>$N_{RF}$: Number of RF chains<br>$P_0$: RF chain circuit power consumption<br>$P_{CP}$: Load independent circuit power consumption | $P_{out}, N_{RF}$ |
| C-RAN 200b  Dedicated hardware | $\sum_{k=1}^{N_{VBB}} \left[ P_{VBB,k} + \sum_{j=1}^{N_{DU}} \left( P_{DU,j} + \sum_{i=1}^{N_{RU}} P_{RU,i} \right) \right]$ | $P_{VBB,K}$: $k^{th}$ Virtual baseband power dissipation<br>$P_{DU,j}$: $j^{th}$ DU power dissipation<br>$P_{RU,j}$: $i^{th}$ RU power dissipation<br>$N_{VBB}$: Number of virtual baseband units<br>$N_{DU}$: Number of DUs<br>$N_{RU}$: Number of RUs | $N_{RU}$ |
| Virtualized hardware | $P_{VBB,cool} + P_{VBB,switch} +$ $\sum_{k=1}^{N_{CPU}} \left[ P_{CPU,k}^{Cx}(\text{freq}) + P_{CPU,max}(\text{freq})\rho_{CPU,k} + \sum_{j=1}^{N_{DU}} \left( P_{DU,j} + \sum_{i=1}^{N_{RU}} P_{RU,i} \right) \right]$ | $P_{VBB,cool}$: Virtualized baseband cooling power<br>$P_{VBB,switch}$: Virtualized baseband switch power<br>$P_{CPU,k}{}^{Cx}$(freq): processor/CPU power of processor/CPU k at Cx state ∈ {idle, sleep, active}<br>$\delta_{CPU}$: slope of CPU power consumption<br>$P_{CPU,max}$(freq): maximum processor/CPU consumption at frequency freq.<br>$\rho_{CPU,k}$: load of processor/CPU k<br>$N_{CPU}$: Number of processors/CPUs (or number of cores)<br>$N_{DU}$: Number of DUs<br>$N_{RU}$: Number of RUs<br>$P_{DU,j}$: $j^{th}$ DU power dissipation<br>$P_{RU,i}$: $i^{th}$ RU power dissipation | freq<br>$N_{CPU}$<br>$N_{RU}$<br>processor state |

1.3. Energy Efficiency Metrics

Various power consumption parameters are discussed in table 1.2-1 and in [López-Pérez]. Additionally, the following energy efficiency metrics can be used for purposes of the present disclosure. In some examples, "energy efficiency" refers to a relation between a useful output and energy/power consumption. The following energy efficiency metrics are intended as example energy efficiency metrics, and additional or alternative metrics may be used in other examples, such as those discussed in ETSI ES 203 228 v1.3.1 (2020 October), 3GPP TS 21.866 v15.0,0 (2017 Jul. 12), [TS28554], and/or the like.

An example network data energy efficiency metric ($EE_{DV}$) can be expressed by equation 1.3-1. This metric is based on a ratio between the data volume (DV) and the energy consumption assessed during a given time frame, and/or may be based on data volume (DV) delivered per joule. In some examples, this metric is used for interference-limited networks.

$$EE_{DV} = \frac{DV}{EC} \qquad (1.3\text{-}1)$$

In equation 1.3-1, $EE_{DV}$ is a network data energy efficiency metric (bit/J); DV is the data volume delivered in the network (including downlink (DL) and/or uplink (UL) traffic for one or more NANs); and EC is the network energy consumption observed during a given time period to deliver such data. The unit of the $EE_{DV}$ metric is bit/J.

An example economical energy efficiency metric ($E^3$) can be expressed as shown by equation 1.3-2. This metric is based on a ratio of an effective system throughput to respective energy consumption weighted by a cost coefficient. In some examples, this metric is used for interference-limited networks.

$$E^3 = \frac{\sum_{k \in \mathcal{K}} \alpha_k R_k}{\sum_{n \in \mathcal{N}} P_{BS_n}} \qquad (1.3\text{-}2)$$

In equation 1.3-2, $E^3$ is the economical energy efficiency metric; $\alpha_k$ is the priority weight related to the k-th UE 102; and $R_k$ is user rate (or effective throughput perceived by the k-th UE 102). $\mathcal{K}$ is the set of UEs 102 in the network, $\mathcal{N}$ is set of NANs in the network, and $P_{BS_n}$ is the power consumption of the n-th NAN.

An example energy efficiency with network coverage $(EE_{CoA})$ can be expressed as shown by equation 1.3-3a. This metric is based on the area covered by the network for a given energy consumption. In some examples, this metric is used for noise-limited networks.

$$EE_{CoA} = \frac{CoA}{EC} \qquad (1.3-3a)$$

In equation 1.3-3a, $EE_{CoA}$ is the network coverage energy efficiency metric; CoA is the area covered by the network; and EC is the network energy consumption observed during a given time period. In some examples, network area (e.g., CoA) can be measured by 5 percentiles of user's rate in the network, although different percentiles can be used to measure network area. In some examples, the $EE_{CoA}$ metric has a unit of $m^2/J$.

An example energy efficiency with network coverage quality factor $(EE_{CoA_Q})$, which is based on an estimate of the quality of the network coverage area (CoA) and a measure of the amount of connection failures due to coverage issues, load congestion, and/or interference effects, can be expressed as shown by equation 1.3-3b. In some examples, this metric is used for noise-limited networks.

$$EE_{CoA_Q} = \frac{(1 - FR_{RRC})(1 - FR_{RAB_s})(1 - FR_{RAB_R})}{EC} \qquad (1.3-3b)$$

In the equation 1.3-3b, $EE_{CoA_Q}$ is the energy efficiency with network coverage quality factor; $FR_{RRC}$, $FR_{RAB_s}$ and $FR_{RAB_R}$ are the radio resource control setup failure ratio, the radio access bearer setup ratio, and radio access bearer release failure ratio, respectively; and EC is the network energy consumption observed during a given time period. The coverage quality factor $(CoA_Q)$ can be expressed by the numerator in equation 1.3-3b (e.g., $CoA_Q = (1 - FR_{RRC})(1 - FR_{RAB_s})(1 - FR_{RAB_R})$). In some examples, the $EE_{CoA_Q}$ metric has a unit of $m^2/J$ and/or a percentage.

Example energy efficiency for end-to-end (e2e) network slicing can be expressed using equation 1.3-4a, 1.3-4b, and 1.3-4c. In some examples, e2e latency refers to the amount of time to transfer a given piece of information from a source to a destination, measured at the communication interface, from the moment it is transmitted by the source to the moment it is successfully received at the destination. Specifically, equation 1.3-4a is an expression of energy efficiency for ultra reliable low latency communications (URLLC) traffic/slices based on latency $(EE_{URLLC,Lat})$, equation 1.3-4b is an expression of energy efficiency for URLLC traffic/slices based on latency and data volume $(EE_{URLLC,DV,Lat})$, and equation 1.3-4c is an expression of energy efficiency for massive machine-type communications (mMTC) traffic/slices $(EE_{mMTC})$. The $EE_{URLLC,Lat}$ metric is obtained by the inverse of the average e2e latency of a network slice divided by energy consumption for the network slice. The $EE_{URLLC,DV,Lat}$ metric is the slice data volume divided by the product between its average e2e latency and its energy consumption. The $EE_{mMTC}$ metric is obtained by the maximum number of registered subscribers (e.g., UEs 102) to the network slice divided by the energy consumption of the network slice. Energy efficiency for mMTC (or MIoT) traffic (or network slice) measures served number of user devices for a given network energy consumption.

$$EE_{URLLC,Lat} = \frac{1}{T_{e2e} \times EC_{ns}} \qquad (1.3-4a)$$

$$EE_{URLLC,DV,Lat} = \frac{DV}{T_{e2e} \times EC_{ns}} \qquad (1.3-4b)$$

$$EE_{mMTC} = \frac{|\mathcal{K}|}{EC_{ns}} \qquad (1.3-4c)$$

In equations 1.3-4a and 1.3-4b, $T_{e2e}$ is an overall and/or average e2e latency of the network or network slice (e.g., mean latency or the like); and $EC_{ns}$ is the network slice energy consumption. In equation 1.3-4c, $\mathcal{K}$ is set of served users in each time (e.g., number of UEs 102 in the network slice); and $EC_{ns}$ is the network slice energy consumption. In some examples, the $EE_{URLLC,Lat}$ metric has a unit of $(0.1$ $ms*J)^{-1}$, the $EE_{URLLC,DV,Lat}$ metric has a unit of $bit/(0.1$ $ms*J)$, and the $EE_{mMTC}$ metric has a unit of user/J.

It should be noted that the parameters listed in table 1.2-1 and the various energy efficiency metrics described herein are examples, and additional or alternative parameters and/or metrics can be used in other implementations, including any of those discussed herein. Additionally, the parameter names/labels listed in table 1.2-1 and the aforementioned metrics are examples, and other names/labels can be used to represent the listed parameters/metrics. Moreover, other types of data can be used for energy efficiency determinations, such as historical data, environmental data (e.g., data related to weather including sunshine/daylight hours, geographic features, infrastructure-related data, and/or other information about a given area/region), telemetry data, availability and/or usage of renewable energy/electricity sources, calculations or estimates of global warming potential (GWP) (e.g., carbon dioxide equivalents (CO2e) and/or greenhouse gas equivalents), availability and/or usage of backup batteries at cloud sites (e.g., sunset v. battery usage and/or the like), and/or other data/information.

1.4. GNN Aspects

As noted previously, a GNN is used for node-level prediction for NES, where a wireless network is represented as a graph that includes various NANs and UEs 102 as vertices and their connections/links as an edges between them. In other implementations, edge-level and/or graph-level tasks may be predicted. GNNs operate on existing graph structures to learn and make predictions about the nodes (vertices), edges, or the graph as a whole. Using a GNN involves representing the relevant data as a graph. A graph is a data structure that models a set of objects (referred to as "nodes" or "vertices") and their relationships or connections (referred to as "edges"). A graph can be represented as an adjacency matrix, which is a matrix where each entry/element in the matrix indicates whether there is an edge between two nodes/vertices. In some examples, an adjacency matrix has a size of N×N where N is a number of nodes/vertices in the graph. Other graph representations, such as edge lists and the like, may be used in other implementations. For purposes of the present disclosure, the term "graph" may refer to either the graph data structure itself or a graph representation, unless the context dictates otherwise. For NES, the network is represented as a graph by defining various network nodes (e.g., CN 142, CU(s) 132, DU(s) 131, RU(s) 130, and UEs 102) as vertices and their connections (e.g., interfaces 105, 107, 107, 108) as and edges.

Figure 3:
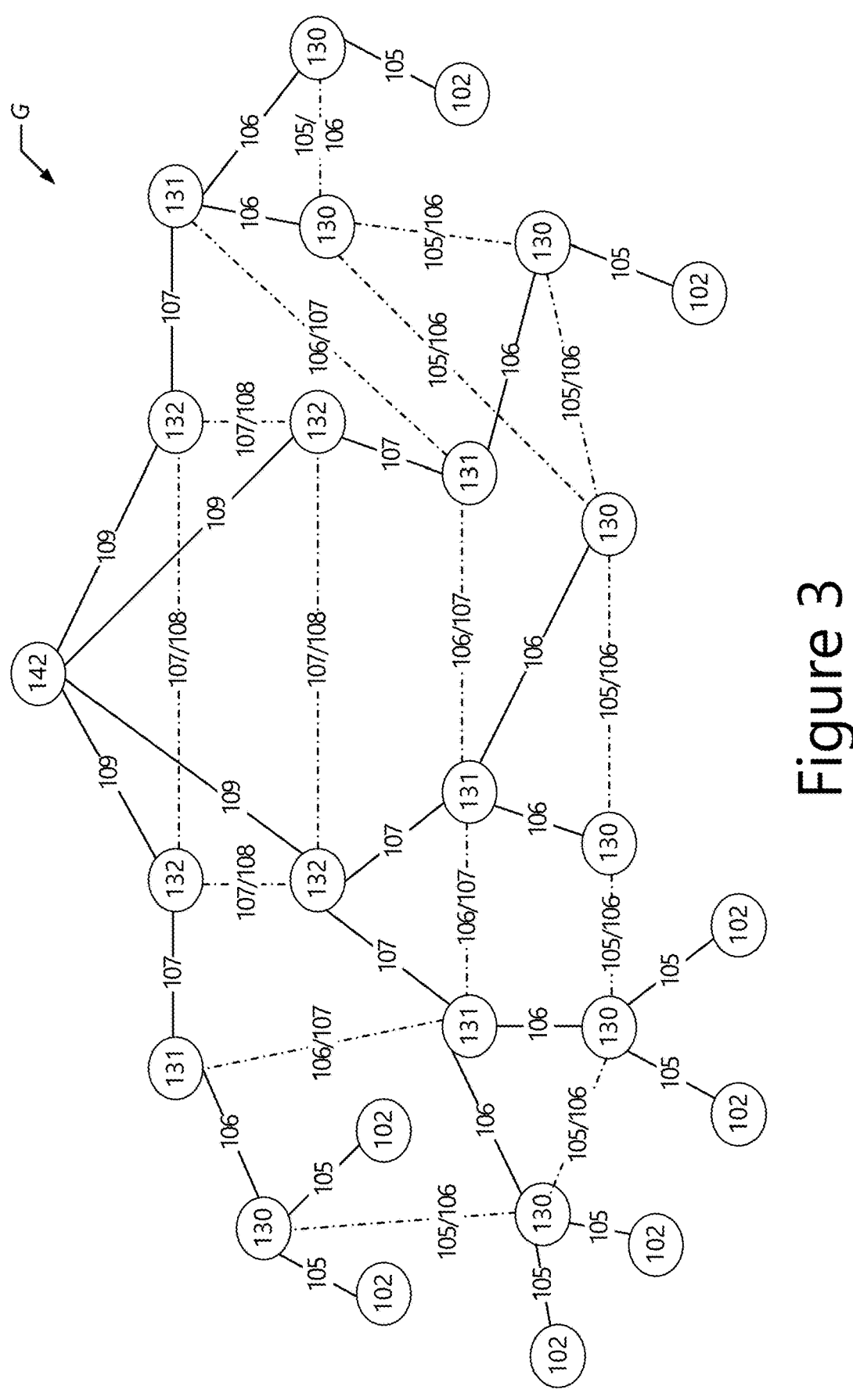
FIG. 3 depicts an example graph representation of a wireless network.

FIG. 3 shows a graph G of an example network (e.g., a D-RAN 200$a$ or a C-RAN 200$b$ in FIG. 2), wherein CN 142, CU(s) 132, DU(s) 131, RU(s) 130, and UEs 102 are represented as vertices and respective connections 105, 106, 107, 108, and 109 are represented as edges. For purposes of the following discussion, the term "network node" refers to a specific device, function, or element in a network (e.g., a CN 142, CU 132, DU 131, RU 130, or UE 102), and the term "node" or "vertex" refers to the representation of a network node in a graph. Graph G is defined as a set of vertices V and a set of edges E, which can be expressed as shown by equation 1.4-0.

$$G=(V,E), \text{ wherein:}$$

$$V=\{V_{CU}, V_{DU}, V_{RU}, V_{UE}, v_{SGC}\}$$

$$E=\{E_{UE\text{-}RU}, E_{RU\text{-}RU}, E_{RU\text{-}UE}, E_{RU\text{-}DU}, E_{DU\text{-}DU}, E_{DU\text{-}CU},$$
$$E_{CU\text{-}CU}, E_{CU\text{-}DU}, E_{CU\text{-}SGC}, E_{SGC\text{-}CU}\} \tag{1.4-0}$$

In equation 1.4-0, $V_{CU}$, $V_{DU}$, $V_{RU}$, $V_{UE}$ are vertices for CUs 132, DUs 131, RUs 130, and UEs 102, respectively; and $E_{v\text{-}u}$ is an edge between vertex v and vertex u. A directed edge connects these vertices, although undirected graphs, dynamic graphs, and/or other types of graphs can be used in other implementations. Note that the graph and/or graph representation of the RAN architecture is virtual, and does not necessarily represent physical connectivity between vertices.

In some implementations, an edge is provided between the same type of vertices (e.g., dashed lines in FIG. 3) based on the location/proximity of the vertices that they are serving. For example, an edge may exist between two RUs 130 if the two RUs 130 are relatively close to each other (e.g., within some predefined or configured distance), and/or an edge may exist between two DUs 131 if the two DUs 131 have serving areas next to each other and/or if they are proximate to each other (e.g., within some predefined or configured distance). The same or similar aspects may be applied to the CUs 130. Additionally, in the graph/hierarchy, an edge may exist between a UE 102 and its serving RU(s) 130, an edge may exist between each RU 130 and their connected DU 131, an edge may be provided between each DU 131 and its connected CU 130, an edge may be provided between each CU 130 and its connected 5GC 142. In the example of FIG. 3, the dashed lines represent edges between the same type of vertex (e.g., between a same type of network node) and the solid lines represent edges between nodes in their hierarchy (e.g., between different types of network nodes).

The graph G can be generated using any suitable graph algorithm or graph drawing algorithm such as, for example, a tree drawing algorithm, a force-directed graph drawing algorithm, a spectral layout algorithm, and/or any other graph drawing algorithm or technique, such as those discussed in Roberto Tamassia, Ed., Handbook of Graph Drawing and Visualization, CRC Press (24 Jun. 2013).

Next, using a GNN involves defining or determining node features. These features can represent information about the nodes/vertices. For the NES implementations, the node features include collected network measurements, performance metrics, telemetry data, and/or the like, such as any of those w.r.t table 1.2-1 and/or table 1.5-1 infra. In some implementations, edge features may also be defined for individual edges. It should be noted that each vertex has its own collected network telemetries and measurements. Where $K_{UE}$ is a number of UEs 102, $K_{RU}$ is a number RUs 130, $K_{DU}$ is a number of DUs 131, and $K_{CU}$ is a number of CUs 132, a vertex feature vector can be expressed as follows:

$$x_v^{UE} \in \mathbb{R}^{F_{UE} \times 1}, v \in V_{UE}; x_v^{RU} \in \mathbb{R}^{F_{RU} \times 1}, v \in V_{RU};$$

$$x_v^{DU} \in \mathbb{R}^{F_{DU} \times 1}, v \in V_{DU}; \text{and } x_v^{CU} \in \mathbb{R}^{F_{CU} \times 1}, v \in V_{CU}$$

for UEs 102, RU(s) 130, DU(s) 131, and CU(s) 132, respectively. Then, with a GN function g, a state of vertices can be expressed by equation 1.4-1.

$$\hat{y}_v = g(G, x_v^{UE}, x_v^{RU}, x_v^{DU}, x_v^{CU}; W, B, \forall v), v \in V \tag{1.4-1}$$

As given in table 1.2-1, some control parameters that have direct impact of network energy consumption can be predicted. Examples of such control parameters include radiof-requency (RF) chain on-off; power back-off at power amplifier (PA); a number of component carriers (CCs); output power control per CC; sleep mode functions and/or switching off functions; processor power state optimization; processor performance state optimization; and virtualization optimization.

The RF chain on-off parameter includes shutting down individual RF chains, such as MIMO RF chains. The power consumption of an antenna unit is about 90% of the total power consumption of a NAN. Therefore, the prediction value for each NAN can be based on the number of antennas $\hat{y}_v \in \{1, \ldots N_T\}$ where antenna $N_T$ is the maximum number of antennas at an RU 130. Depending on the RF architecture, the number of RF chains can be different than the number of antennas (e.g., each antenna can be a passive component). For example, an individual RF chain of an RU 130 can be connected to one or multiple antenna elements. In some implementations, the prediction of the number of RF chains is based on $\hat{y}_v \in \{1, \ldots N_{RF}\}$, where v is a vertex of an RU 130 in graph G, $N_{RF}$ is a number of RF chains at the RU 130, and $\hat{y}_v$ is a number between 1 and $N_{RF}$.

The power back-off at PA parameter involves reducing (or "backing off") the power at a PA of an RF chain. Depending on network coverage and/or NAN load, the power back-off can save power dissipation at a PA, which is usually the most power-hungry component of an RU 130 without impacting RU 130 antenna configuration. For this case, the prediction of output power at each RU 130 is expressed as $\hat{y}_v = P_{out}$, where v is a vertex of an RU 130 in graph G, and $P_{out}$ is the predicted power for a given PA.

The number of CCs parameter involves shutting off or otherwise reducing the number of CCs provided by a given cell. Depending on network load, some of the CCs can be switched off. In some implementations, the predicted number of energy efficient CCs can be predicted is expressed as $\hat{y}_v = N_{CC}$, where v is a vertex of RU 130 or DU 131 in graph G, and $N_{CC}$ is the number CCs for a given cell. A number of beams parameter can also be predicted in a same or similar manner as the number of CCs parameter.

The output power control per CC parameter involves adjusting the power used to provide individual CCs. As mentioned previously, reducing output power will reduce power dissipation at the PA. In this case, each CC has a dedicated PA, which means that the power output per CC can be predicted as: $\hat{y}_v=[P_{out,1}, \ldots, P_{out,N_{CC}}]$, where $P_{out}$ and $N_{CC}$ are the same as described previously. An output power per beam parameter can also be predicted in a same or similar manner as the output power control per CC parameter.

The sleep mode functions/switching off functions parameter involves shutting off individual baseband processors and/or other components at individual RUs 130 and/or DUs 131, or placing such baseband processors and/or components in a sleep mode. Depending on data traffic levels, some NANs and/or some of the components of individual NANs can be put in a sleep mode. During the sleep mode, some of the workloads can be transferred from shut off/sleep mode elements to adjacent cells/RUs 130 and/or DUs 131 or to other elements/components within an individual RU 130 or DU 131. In this case, the prediction can be based on the number of active RUs 130 per DU 131, which may be expressed as: $\hat{y}_v \in \{1, \ldots N_{RU}\}$, where $N_{RU}$ is the number of active RUs 130. This prediction can be extended as vector of duration of sleep time. In this case, the prediction vector is $\hat{y}_v=\mu_i$ where $\mu_i$ is a sleep duration in a desired time unit (e.g., seconds, milliseconds, and/or the like) at an $i^{th}$ RU 130 of a v-th DU 131; wherein v is a vertex of the RU 130 or DU 131 in the graph G.

The processor power state optimization involves idling individual processor cores in a sleep state or otherwise reducing the power consumed by processors or individual cores of a processor. In some examples, the processor power states may be [ACPI] "Cx states", which are processor power consumption and thermal management states (sometimes referred to as "idle states") individual cores of a multi-core processor can be in and are meant to save power while the processor or cores are not executing any instructions. There can be many Cx states, including a C0 state (active state) where the processor or core is fully turned on, a C1 state (idle state or non-executing power state) where the processor or core has a lowest latency, C2 state (non-executing power state with improved power savings over C1), and C3 (non-executing power state with improved power savings over C1 and C2). Additional or alternative Cx states can be defined for different types of processors, for example, were C1 is an auto halt state where a core clock is turned off, C2 is a stop clock state where core and bus clocks are turned off, C3 is a deep sleep state where a clock generator is turned off and/or L1/L2 caches are flushed, C4 is a deep sleep state where voltages (VCC) is/are reduced, C6 is a deep sleep state where the processor or core internal voltages are reduced to any value including 0V (also referred to as deep power down state), C7 is a deep sleep state per C6 and where LLC may be flushed, and C8 is a deep sleep state per C6/C7 and where LLC must be flushed. In some cases, the latency to resume to active work may increase based on the mode of the Cx state, which means that the prediction of Cx state can be a relatively important factor for energy saving. In this case, the Cx state prediction can be expressed as:

$$\hat{y}_v = P^{Cx}_{CPU,k}(freq),$$

which represents processor or core power of processor/core (CPU) k at processor power state $Cx \in \{idle, sleep, active\}$, and freq is the processor frequency of the processor/core (CPU) k. In other implementations, $Cx \in \{C1, \ldots, Cn\}$ where n is a highest number Cx state. Here, v is a vertex representing a CU 132 or a DU 131 in the graph G.

The processor performance state optimization involves adjusting the power consumption and capability states of individual processors or individual cores of a processor within the active/executing states. In some examples, the processor performance states may be [ACPI] device and processor performance states ("Px states"), which are power consumption and capability states within the active/executing states (e.g., C0 for processors and D0 for devices). For example, different Px states may cause individual processors or individual cores to operate at different frequencies. Reducing processor/core frequency to reduce power consumption can be an important factor for energy saving. When traffic demand is low, power consumption can be reduced by reducing power. Here, we can consider or $\hat{y}_v=freq$ where freq is processor/core (CPU) processing frequency at a virtualized baseband processor. Here, parameters $$P^{Cx}_{CPU,k}(freq)$$

and $P_{CPU,max}(freq)$ in table 1.2-1 can be considered, and v is a vertex representing a CU 132 or a DU 131 in the graph G.

In addition or alternatively to using the Cx states and/or the Px states discussed previously, other processor states, such as processor sleeping states (e.g., "states" in ACPI/UEFI-based systems) and/or any others discussed in [ACPI], can be used in a same or similar manner as discussed previously w.r.t the Cx states and/or the Px states. Various aspects of the Cx, Px, and Sx states are discussed in Advanced Configuration and Power Interface (ACPI), Release 6.5, UEFI FORUM, INC. (29 Aug. 2022) ("[ACPI]"). Although various embodiments are described herein in terms of ACPI/UEFI-based processor states, other processor states defined by other suitable standards can be used, such as those discussed in advanced power management (APM) specifications, Open Firmware (IEEE 1275) specifications, device tree specifications, Intel® Power Management Framework (PMF) specifications, RISC-V Power Management specifications and/or RISC-V platform specifications, and/or other suitable standards.

Virtualization optimization involves optimizing aspects of virtualization technologies being used. Virtualization technologies include virtual machines (VMs) and/or virtualization containers operating on the HW infrastructure of an individual NAN or a cloud site. Virtualization techniques enable containerized applications to run on the same compute resources. An energy efficient NAN 130 can be implemented on shared compute resources. In this case, the prediction value can be number of processors/cores (CPUs) required for the network operations, for example, $\hat{y}_v=\{1, \ldots, N_{CPU}\}$ where $N_{CPU}$ is the maximum number of processors/cores (CPUs) at the VMs and/or virtual BBU. Here, v is a vertex representing a CU 132 or a DU 131 in the graph G.

In embodiments, an L layer GNN (e.g., a GCN and/or the like) is used to predict the values of $\hat{y}_v$, which may represent any of the control parameters mentioned previously. It should be noted that a value of $\hat{y}_v$ may be predicted for each desired or selected control parameter. For example, a first $\hat{y}_v$ value may be a prediction for the RF chain on-off parameter, a second $\hat{y}_v$ value may be a prediction for the power back-off at PA parameter, and so forth. The L layer GNN may have an architecture/topology that is the same or similar as the NN 500 of FIG. 5 (discussed infra). The L layer GNN learns a suitable representation of graph data (sometimes referred to as "representation learning") and/or performs an optimizable transformation on some or all attributes of the graph G (e.g., nodes, edges, global-context, and/or the like) that preserves graph symmetries (e.g., permutation invariances). Using the information about the graph G, including the node (vertex) features and the edges stored in an adjacency matrix, the L layer GNN outputs a new representation (referred to as "embeddings") for each of the nodes/vertices at each epoch or iteration. The GNN learns new embeddings for some or all of the graph attributes. The embeddings contain structural and feature information of other nodes in the graph. These embeddings can be used to perform or generate inferences or predictions. The initial embedding values of vertex v are shown by equation 1.4-2.

$$h_v^{(0)} = x_v^{UE}, v \in V_{UE} \tag{1.4-2}$$
$$h_v^{(0)} = x_v^{RU}, v \in V_{RU}$$
$$h_v^{(0)} = x_v^{DU}, v \in V_{DU}$$
$$h_v^{(0)} = x_v^{CU}, v \in V_{CU}$$
$$h_{5GC}^{(0)} = 0$$

Edge conditioned NNs (or edge-conditioned filters) can be used, for example, where an edge in $E_{UE\text{-}RU}$, $E_{RU\text{-}RU}$, $E_{RU\text{-}EU}$, $E_{RU\text{-}DU}$, $E_{DU\text{-}DU}$, $E_{DU\text{-}CU}$, $E_{CU\text{-}CU}$, $E_{CU\text{-}DU}$, $E_{CU\text{-}5GC}$, $E_{5GC\text{-}CU}$, has an NN weight $W_{UE\text{-}RU}$, $W_{RU\text{-}RU}$, $W_{RU\text{-}EU}$, $W_{RU\text{-}DU}$, $W_{DU\text{-}DU}$, $W_{DU\text{-}CU}$, $W_{CU\text{-}CU}$, $W_{CU\text{-}DU}$, $W_{CU\text{-}5GC}$, $W_{5GC\text{-}CU}$, respectively. The hidden features of GNN layer l can be obtained embedding(s) as shown by equations 1.4-3a to 1.4-3e.

connected RU 130; $\mathcal{N}_{v\text{-}DU}$ where $v \in V_{RU}$, $v \in V_{CU}$, or $v \in V_{DU}$ is a set of neighboring vertices from vertex v to the connected DU 131; $\mathcal{N}_{v\text{-}CU}$ where $v_{5GC}$, $v \in V_{CU}$, or $v \in V_{DU}$, is a set of neighboring vertices from vertex v to the connected CU 132; and $\mathcal{N}_{5GC\text{-}CU}$ is set of neighboring vertices from a 5GC vertex (e.g., vertex representing CN 142). These neighboring vertices are defined according to graph G=(V, E). Self-edge NN weights $$B_{UE}^{(l)}, B_{RU}^{(l)}, B_{DU}^{(l)}, B_{CU}^{(l)}, B_{5GC}^{(l)}$$

for UE 102, RU 130, DU 131, CU 132, and 5GC 142 vertices, respectively, are also considered. The aforementioned convolution operation(s) can also involve message passing as shown in FIG. 4.

Figure 4:
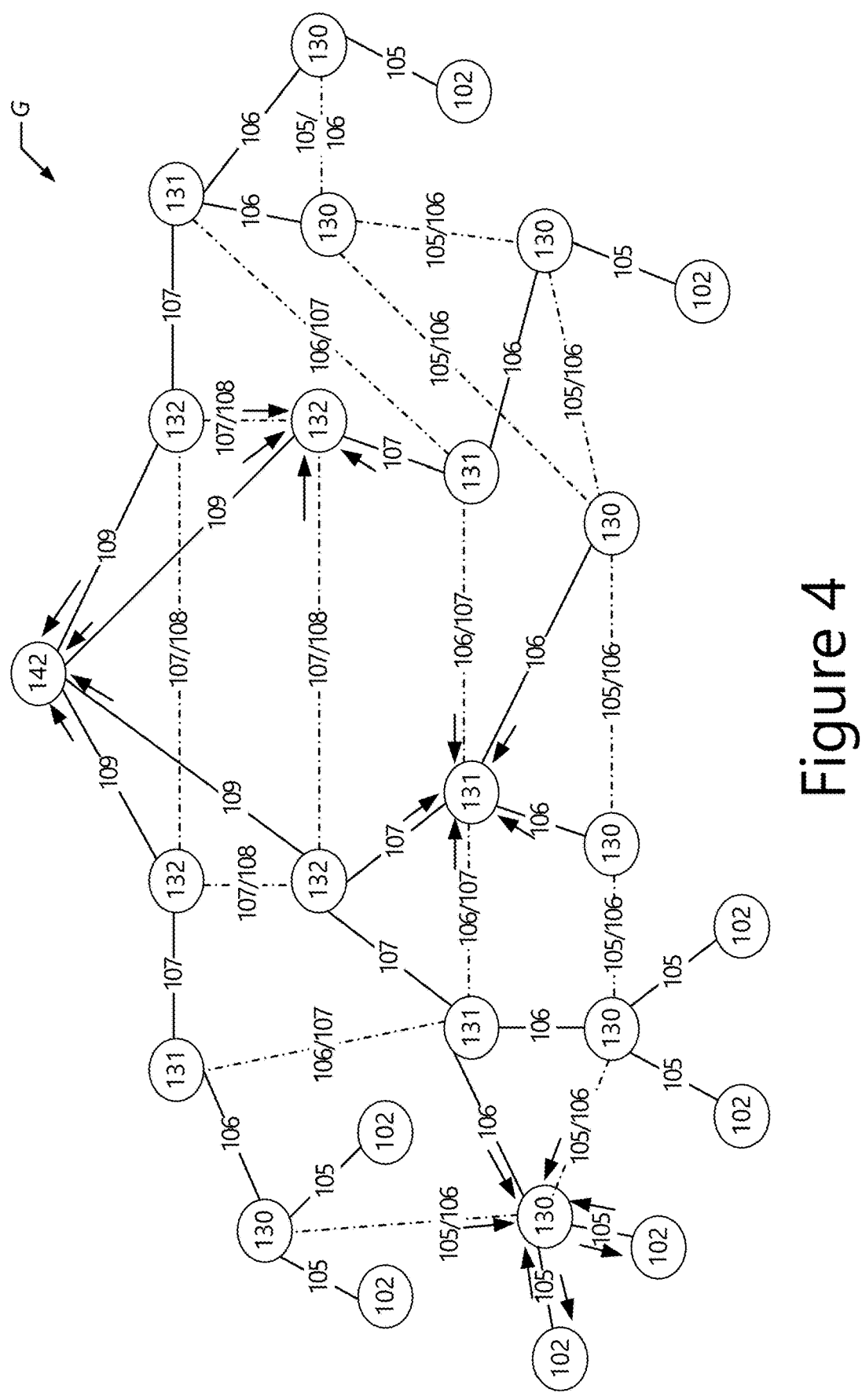
FIG. 4 depicts an example of message massing over the graph network of FIG. 3.

FIG. 4 shows an example of message passing over the graph G. Message passing allows information to flow between nodes in the graph G. Message passing allows neighboring nodes to exchange information and influence each other's embeddings. At each layer l of the L layer GNN, individual nodes aggregate information from their neighboring nodes. Neighboring nodes may be nodes that are one hop away from an ego node, although in other implementations the number of hops from an ego node to be considered a "neighbor" can be predetermined or configured. In FIG. 4, the arrows represent messages being passed to a node from its neighboring nodes. Note that not all nodes are shown as being receiving messages for the sake of clarity.

Message passing may occur iteratively, where in each iteration, one or more nodes send messages to their neighboring nodes, and these messages are aggregated to update the node embeddings. The message passing can involve the $$h_v^{(l)} = f^{(l)}\left(\frac{W_{UE\text{-}RU}^{(l)}\sum_{u \in N_{v\text{-}RU}} h_u^{(l-1)}}{|\mathcal{N}_{v\text{-}RU}|} + B_{UE}^{(l)} h_v^{(l-1)}\right), v \in V_{UE} \tag{1.4-3a}$$

$$h_v^{(l)} = f^{(l)}\left(\frac{W_{RU\text{-}DU}^{(l)}\sum_{u \in N_{v\text{-}DU}} h_u^{(l-1)}}{|\mathcal{N}_{v\text{-}DU}|} + \frac{W_{RU\text{-}RU}^{(l)}\sum_{u \in N_{v\text{-}RU}} h_u^{(l-1)}}{|\mathcal{N}_{v\text{-}RU}|} + \frac{W_{RU\text{-}UE}^{(l)}\sum_{u \in N_{v\text{-}UE}} h_u^{(l-1)}}{|\mathcal{N}_{v\text{-}UE}|} + B_{RU}^{(l)} h_v^{(l-1)}\right), \tag{1.4-3b}$$
$$v \in V_{RU}$$

$$h_v^{(l)} = f^{(l)}\left(\frac{W_{DU\text{-}CU}^{(l)}\sum_{u \in N_{v\text{-}CU}} h_u^{(k-1)}}{|\mathcal{N}_{v\text{-}CU}|} + \frac{W_{DU\text{-}DU}^{(l)}\sum_{u \in N_{v\text{-}DU}} h_u^{(l-1)}}{|\mathcal{N}_{v\text{-}DU}|} + \frac{W_{DU\text{-}RU}^{(l)}\sum_{u \in N_{v\text{-}RU}} h_u^{(l-1)}}{|\mathcal{N}_{v\text{-}RU}|} + B_{DU}^{(l)} h_v^{(l-1)}\right), \tag{1.4-3c}$$
$$v \in V_{DU}$$

$$h_v^{(l)} = f^{(l)}\left(\frac{W_{DU\text{-}CU}^{(k)}\sum_{u \in N_{v\text{-}CU}} h_u^{(l-1)}}{|\mathcal{N}_{v\text{-}CU}|} + \frac{W_{CU\text{-}CU}^{(l)}\sum_{u \in N_{v\text{-}CU}} h_u^{(l-1)}}{|\mathcal{N}_{v\text{-}CU}|} + \frac{W_{CU\text{-}5GC}^{(l)}\sum_{u \in N_{v\text{-}5GC}} h_u^{(l-1)}}{|\mathcal{N}_{v\text{-}5GC}|} + B_{CU}^{(l)} h_v^{(l-1)}\right), \tag{1.4-3d}$$
$$v \in V_{CU}$$

$$h_{5GC}^{(l)} = f^{(l)}\left(\frac{W_{5GC\text{-}CU}^{(l)}\sum_{u \in N_{5GC\text{-}CU}} h_u^{(l-1)}}{|\mathcal{N}_{5GC\text{-}CU}|} + B_{5GC}^{(l)} h_v^{(l-1)}\right) \tag{1.4-3e}$$

In equations 1.4-3a to 1.4-3e, $\mathcal{N}_{v\text{-}UE}$ where $v \in V_{UE}$ or $v \in V_{RU}$ is a set of neighboring vertices from vertex v to the connected UE 102; $\mathcal{N}_{v\text{-}RU}$ where $v \in V_{UE}$, $v \in V_{RU}$, or $v \in V_{DU}$ is a set of neighboring vertices from vertex v to the following operations: First, each node gathers information (e.g., embeddings or messages) from its neighbor. Second, the collected/gathered information is aggregated or otherwise combined with the node's own feature vector/embeddings to update its own embeddings, which may be done using some aggregation function. Examples of such aggregation functions include mean aggregation (e.g., averaging neighbors' embeddings), sum aggregation (summing neighbors' embeddings), maximum aggregation (e.g., selecting a maximum value among the collected embeddings), attention-based aggregation (weighted sum of neighbors' embeddings), mean pooling, max pooling, or weighted aggregation. Additionally or alternatively, the aggregation may involve equations 1.4-3a to 1.4-3e discussed supra. The aggregated information is then used to update the node's own feature representation. Third, the updated embeddings are used as the node representations for the next iteration. Additionally or alternatively, the pooled messages are passed through an update function, which may be a done using a neural network layer (e.g., a Gated Recurrent Unit, LSTM, a feed forward NN, fully-connected NN (FCNN), multilayer perceptron (MLP), and/or the like). The message passing may be performed in an iterative fashion where the aforementioned operations are repeated for a number of iterations/epochs or until convergence to allow nodes to gather information from their neighbors and refine their representations. Additional aspects of message passing are discussed in Gilmer et al., Neural Message Passing for Quantum Chemistry, Proceedings of the 34th Int'l Conference on Machine Learning, PROCEEDINGS OF MACHINE LEARN-ING RESEARCH (PMLR), vol. 70, pp. 1263-1272 (August 2017).

The GNN uses a separate fully connected NN (FCNN) on the components of the graph G. The FCNN may be an MLP and/or may be some other type of NN, which may have an architecture/topology that is the same or similar as the NN 500 of FIG. 5. The FCNN may be referred to as a GNN layer. In some implementations, the last (output) layer of the GNN is the FCNN. Additionally or alternatively, the FCNN can comprise multiple task-specific layers of the GNN. In other implementations, an interconnection means is used to connect the last (output) layer of the GNN to a first (input) layer of the FCNN, which can include APIs, web services, AI/ML pipeline, workflow management platform, middleware, firmware, drivers, software glue, and/or using some other protocol or communication means, such as any of those discussed herein. Additionally or alternatively, the predictions produced by the GNN and the FCNN can be combined using a suitable ensemble learning technique.

For each node in the graph, the FCNN outputs a learned node-vector (or learned node embedding). This may also be done for each edge and/or for a global-context, if used. Here, the FCNN is used to predict node output. The predicted node output (e.g., the data output by the FCNN) may include one or more NES parameters. The NES parameters indicate various control parameters and/or operational aspects of respective NANs to be adjusted to realize or achieve NES in the network. As examples, an NES parameter can include a predicted state, level, adjustment amount, scaling factor, value, variable, parameter, data, policy, configuration, and/or other aspects for corresponding control parameter, such as the example control parameters mentioned previously. Additionally or alternatively, the NES parameters can include goals or desired states/values for measurements/metrics, such as those listed in table 1.5-1, infra. In either case, the NES parameters may include one or more predicted $\hat{y}_v$ values for respective network nodes (e.g., a first predicted $\hat{y}_v$ value of a first control parameter, and so forth, for one or more network nodes under consideration). The FCNN is defined per vertex type (e.g., UE 102, RU 130, DU 131, and CU 132) as shown by equation 1.4-4.

$$\hat{y}_v = DNN_{UE}(h_v^{(L)}), v \in V_{UE} \qquad (1.4\text{-}4)$$

$$\hat{y}_v = DNN_{RU}(h_v^{(L)}), v \in V_{RU}$$

$$\hat{y}_v = DNN_{DU}(h_v^{(L)}), v \in V_{DU}$$

$$\hat{y}_v = DNN_{CU}(h_v^{(L)}), v \in V_{CU}$$

In equation 1.4-3, each DNN(.) is an FCNN with output dimensions that depend on the control parameters discussed herein, such as $N_{RF}$, freq, $P_{out}$, and/or the like. Here, the FCNN maps the output(s) of the GNN to respective $\hat{y}_v$.

Figure 5:
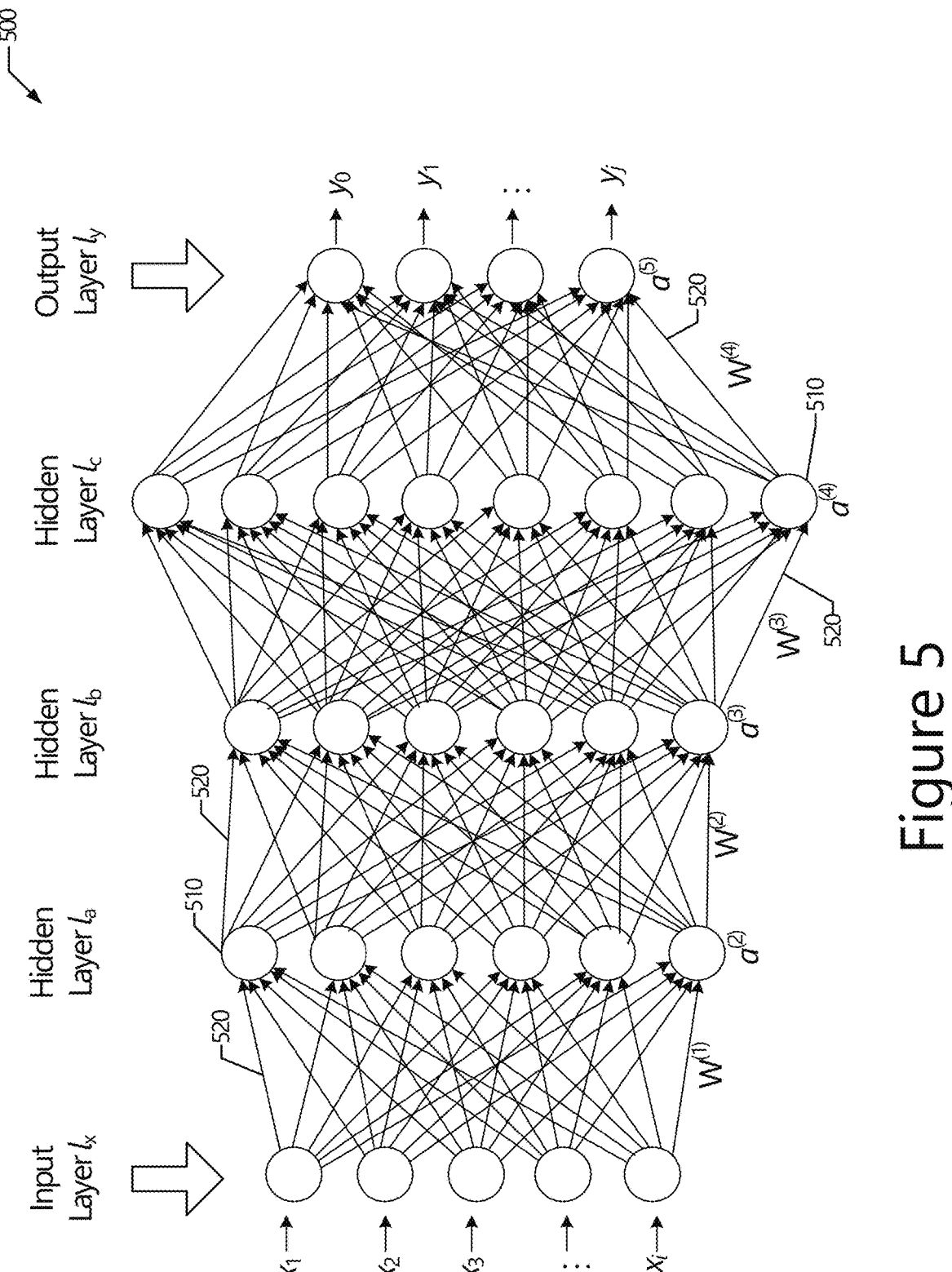
FIG. 5 illustrates an example neural network architecture.

FIG. 5 illustrates an example neural network (NN) 500, which may be suitable for use as the GNN and/or the FCNN discussed previously, or any other GNN or FCNN discussed herein. Additionally or alternatively, the NN 500 can have some other type of topology (or combination of topologies), such as a feed forward NN (FFN), deep FNN (DFF), convolutional NN (CNN), deep CNN (DCN), deconvolutional NN (DNN), autoencoder, encoder-decoder networks, a deep belief NN, a perception NN, multi-layer perceptron (MLP), recurrent NN (RNN) (e.g., including Long Short Term Memory (LSTM) algorithm, gated recurrent unit (GRU), echo state network (ESN), and the like), spiking NN (SNN), deep stacking network (DSN), Markov chain, perception NN, generative adversarial network (GAN), transformers, stochastic NNs (e.g., Bayesian Network (BN), Bayesian belief network (BBN), a Bayesian NN (BNN), Deep BNN (DBNN), Dynamic BN (DBN), and the like), probabilistic graphical model (PGM), unsupervised learning NNs (e.g., Boltzmann machine, restricted Boltzmann machine (RBM), deep belief network, convolutional deep belief network (CDBN), sigmoid belief network, Hopfield NN, Helmholtz machine, variational autoencoder (VAE), self-organizing map (SOM) NN, adaptive resonance theory (ART) NN, and/or the like), Linear Dynamical System (LDS), Switching LDS (SLDS), Optical NNs (ONNs), GNNs (e.g., GCNs including spectral-based and spatial-based, graph attention NNs, gated graph sequence NNs, spatial-temporal GNNs, graph autoencoders (GAEs), and/or the like), an NN for reinforcement learning (RL) and/or deep RL (DRL), attention and/or self-attention mechanisms, and/or the like. NNs 500 are usually used for supervised learning, but can be used for unsupervised learning and/or RL.

The NN 500 may encompass a variety of ML techniques where a collection of connected artificial neurons 510 that (loosely) model neurons in a biological brain that transmit signals to other neurons/nodes 510. The neurons 510 may also be referred to as nodes 510, processing elements (PEs) 510, or the like. The connections 520 (or edges 520) between the nodes 510 are (loosely) modeled on synapses of a biological brain and convey the signals between nodes 510. Note that not all neurons 510 and edges 520 are labeled in FIG. 5 for the sake of clarity. It should also be noted that the edges 520 may not be the same as the edges of graph G discussed previously.

Each neuron 510 has one or more inputs and produces an output, which can be sent to one or more other neurons 510 (the inputs and outputs may be referred to as "signals"). Inputs to the neurons 510 of the input layer $1_x$ can be feature values of a sample of external data (e.g., input variables $x_i$). The input variables $x_i$ can be set as a vector containing relevant data (e.g., observations, ML features, and the like). In the context of ML, an "ML feature" (or simply "feature") is an individual measureable property or characteristic of a phenomenon being observed. Features are usually represented using numbers/numerals (e.g., integers), strings, variables, ordinals, real-values, categories, and/or the like. Additionally or alternatively, ML features are individual variables, which may be independent variables, based on observable phenomenon that can be quantified and recorded. ML models use one or more features to make predictions or inferences. In some implementations, new features can be derived from old features.

The inputs to hidden units 510 of the hidden layers $1_a$, $1_b$, and $1_c$ may be based on the outputs of other neurons 510. The outputs of the final output neurons 510 of the output layer $1_y$ (e.g., output variables $y_j$) include inferences. For purposes of the present disclosure, the term "inference" refers to the process of using an AI/ML model(s) to generate predictions, decisions, data analytics, assessments, actions, policies, configurations, and/or other data used to accomplish a desired/configured task. The inferences may be based on training data during a training phase, or based on new, unseen data (e.g., "input inference data") during an inference phase. The output variables $y_j$ may be in the form of inferences and/or vector(s) containing the relevant data (e.g., determinations, inferences, predictions, assessments, and/or the like).

Neurons 510 may have a threshold such that a signal is sent only if the aggregate signal crosses that threshold. A node 510 may include an activation function, which defines the output of that node 510 given an input or set of inputs. Additionally or alternatively, a node 510 may include a propagation function that computes the input to a neuron 510 from the outputs of its predecessor neurons 510 and their connections 520 as a weighted sum. A bias term can also be added to the result of the propagation function. The NN 500 also includes connections 520, some of which provide the output of at least one neuron 510 as an input to at least another neuron 510. Each connection 520 may be assigned a weight that represents its relative importance. The weights may also be adjusted as learning proceeds. The weight increases or decreases the strength of the signal at a connection 520.

The neurons 510 can be aggregated or grouped into one or more layers 1 where different layers 1 may perform different transformations on their inputs. In FIG. 5, the NN 500 comprises an input layer $1_x$, one or more hidden layers $1_a$, $1_b$, and $1_c$, and an output layer $1_y$ (where a, b, c, x, and y may be numbers), where each layer 1 comprises one or more neurons 510. Signals travel from the first layer (e.g., the input layer $1_1$), to the last layer (e.g., the output layer $1_y$), possibly after traversing the hidden layers $1_a$, $1_b$, and $1_c$ multiple times. In FIG. 5, the input layer $1_a$ receives data of input variables $x_i$ (where i=1, . . . , p, where p is a number). Hidden layers $1_a$, $1_b$, and $1_c$ processes the inputs $x_i$, and eventually, output layer $1_y$ provides output variables $y_j$ (where j=1, . . . , p', where p' is a number that is the same or different than p). In the example of FIG. 5, for simplicity of illustration, there are only three hidden layers $1_a$, $1_b$, and $1_c$ in the NN 500, however, the NN 500 may include many more (or fewer) hidden layers $1_a$, $1_b$, and $1_c$ than are shown.

In GNN implementations, the input variables $x_i$ can include any of the network measurements, metrics, and/or telemetries discussed herein (see e.g., tables 1.2-1 and 1.5-1) and the output variables may correspond to the $\hat{y}_v$ values discussed previously. Additionally, individual neurons 510 may represent one or more nodes in the graph G, and connections 520 may represent respective edges in graph G. Additionally or alternatively, the one or more layers 1 may include the aforementioned NN weights matrix (e.g., including each of the NN weights $W_{UE-RU}$, $W_{RU-RU}$, $W_{RU-EU}$, $W_{RU-DU}$, $W_{DU-DU}$, $W_{DU-CU}$, $W_{CU-CU}$, $W_{CU-DU}$, $W_{CU-5GC}$, $W_{5GC-CU}$) and the aforementioned self-edge NN weight matrix (e.g., including self-edge NN weights $$B_{UE}^{(l)}, B_{RU}^{(l)}, B_{DU}^{(l)}, B_{CU}^{(l)}, B_{5GC}^{(l)}).$$

1.5. Training Aspects

ML model training (or simply "training") involves running training data (or a training dataset) through an ML model, deriving associated inferences from the training data, and adjusting the parameterization of that ML model based on the computed inferences. Here, the training data has a known label or result. The training data is a subset of data that is used to teach the ML model to make inferences by exposing the model to various examples and their corresponding outcomes. In essence, a training dataset is the material from which the ML model learns.

The parameterization of the ML model refers to adjusting one or more model parameters of the ML model, which include values, characteristics, and/or properties that are learnt during training, or is a configuration variable that is internal to the model and whose value can be estimated from the given data. Model parameters are usually required by a model when making predictions, and their values define the skill of the model on a particular problem. Examples of such model parameters include weights, biases, coefficients, constraints, vectors, and/or the like. Examples of model parameters for GNNs include node embeddings, edge embeddings, learnable aggregation function parameters, pooling function parameters, regularization parameters, and/or the like.

In some implementations, one or more CU(s) 132 train the NES ML models discussed herein. In one example, the CU 132 trains the NES ML model, and the trained the NES ML model is deployed to one or more other network nodes (e.g., one or more DUs 131) that operates the NES ML model to generate or otherwise produce inferences (e.g., NES parameters) as discussed herein. In another example, a first CU 132 trains an NES ML model and the first CU 132, one or more second CUs 132, and/or one or more DUs 131 operate respective copies/versions of the trained NES ML model to generate inferences (e.g., NES parameters) as discussed herein. In another example, a first CU 132 trains the GNN of the NES ML model and a second CU 132 trains the FCNN of the NES ML model, and the first CU 132, the second CU 132, one or more third CUs 132, and/or one or more DUs 131 operate respective copies/versions of the trained NES ML model to generate inferences (e.g., NES parameters) as discussed herein. Other configurations and arrangements are possible in other implementations.

In other implementations, one or more RIC(s) 135 train the NES ML models discussed herein. In one example, RIC(s) 135 train the NES ML model, and the trained NES ML model is deployed to one or more other network nodes (e.g., one or more CUs 132 and/or one or more DUs 131) that operate the NES ML model to generate inferences (e.g., NES parameters) as discussed herein. In another example, a first RIC 135 trains an NES ML model and a second RIC 135 operates the NES ML model to generate NES inferences as discussed herein. In this example, the first RIC 135 is a non-RT RIC and the second RIC 135 is a near-RT RIC. In another example, a first RIC 135 trains the GNN model of the NES ML model, a second RIC 135 trains the NN model of the NES ML model, and a third RIC 135 and/or other network node(s) (e.g., CU(s) 132 and/or DU(s) 131) operates the NES ML model to generate NES inferences as discussed herein. In this example, the first, second, and third RICs 135 are any combination of non-RT RICs and near-RT RICs. Other configurations and arrangements are possible in other implementations.

Additionally or alternatively, the training of the NES ML models discussed herein may be performed using the AI/ML management framework discussed in 3GPP TS 28.104 v18.0.1 (2023 Jun. 22), 3GPP TS 28.105 v18.0.0 (2023 Jun. 22), and 3GPP TS 28.533 v17.3.0 (2023 Mar. 30) (collectively referred to as "[3GPP-AI/ML]"). Additionally or alternatively, the training of the NES ML models discussed herein may be performed using the model Training logical function (MTLF) of a Network Data Analytics Function (NWDAF) as discussed in 3GPP TS 23.288 v18.2.0 (2023 Jun. 21) ("[TS23288]") and [TS23501]. Additionally or alternatively, the training of the NES ML models discussed herein may be performed using any of the edge computing frameworks discussed herein.

In either of the aforementioned implementations, the NES ML model may be trained using supervised learning. Supervised learning is an ML technique that aims to learn a function or train an ML model that produces an output given a labeled dataset (referred to as "training data"). For supervised learning in this case, the optimal classification or regression solution may be known. Examples of optimization criteria are shown by equation 1.5-1.

$$\min_{\forall W, \forall B}\left(\sum_{v \in V_{UE}} \text{Loss}(y_v - \hat{y}_v) + \sum_{v \in V_{RU}} \text{Loss}(y_v - \hat{y}_v) + \sum_{v \in V_{DU}} \text{Loss}(y_v - \hat{y}_v) + \sum_{v \in V_{CU}} \text{Loss}(y_v - \hat{y}_v)\right) \quad (1.5\text{-}1)$$

In equation 1.5-1, the

"$\min_{\forall W, \forall B}$"

is a minimum function that returns a smallest (minimum) value among a set of values or elements for all ($\forall$) NN layers W and all weights B; and "Loss( )" is a loss function (or cost function) that quantifies the error or discrepancy between the predicted values generated by the NES ML model and the actual target values (ground truth) for a given set of input data. The value calculated by the loss function may be referred to as a "loss", "error", or "cost".

Additionally or alternatively, the NES ML model may be trained using reinforcement learning (RL) and/or deep RL (DRL) techniques. In these implementations, the weights of the GNN and/or the FCNN are learned using RL/DRL. RL is a goal-oriented learning technique based on interaction with an environment, where an agent aims to optimize a long-term objective by interacting with the environment based on a trial and error process. An example of an RL architecture is shown by FIG. 6.

FIG. 6 shows an RL architecture 600, which includes an agent 610 and an environment 620. The agent 610 (e.g., software agent, AI agent, AI/ML decision entity, inference engine, ML training function, and/or the like) is the learner and decision maker, and the environment 620 comprises everything outside the agent 610 that the agent 610 interacts with. The environment 620 is typically stated in the form of an MDP, which may be described using dynamic programming techniques. An MDP is a discrete-time stochastic control process that provides a mathematical framework for modeling decision making in situations where outcomes are partly random and partly under the control of a decision maker.

RL is a goal-oriented learning based on interaction with environment. RL is an ML paradigm concerned with how software agents (or AI agents) ought to take actions in an environment in order to maximize a numerical reward signal. In general, RL involves an agent taking actions in an environment that is/are interpreted into a reward and a representation of a state, which is then fed back into the agent. In RL, an agent aims to optimize a long-term objective by interacting with the environment based on a trial and error process. In many RL algorithms, the agent receives a reward in the next time interval (or epoch, iteration, stage, phase, and/or the like) to evaluate its previous action. Examples of RL algorithms include Markov decision processes (MDPs), Markov chains, Q-learning, multi-armed bandit learning, temporal difference learning, and deep RL.

The agent 610 and environment 620 continually interact with one another, wherein the agent 610 selects actions A to be performed and the environment 620 responds to these Actions and presents new situations (or states S) to the agent 610. The action A comprises all possible actions, tasks, moves, and/or the like, that the agent 610 can take for a particular context. The state S is a current situation such as a complete description of a system, a unique configuration of information in a program or machine, a snapshot of a measure of various conditions in a system, and/or the like.

In some implementations, the agent 610 selects an action A to take based on a policy $\pi$. The policy $\pi$ is a strategy that the agent 610 employs to determine next action A based on the current state S. The environment 620 also gives rise to rewards R, which are numerical values that the agent 610 seeks to maximize over time through its choice of actions.

The environment 620 starts by sending a state $S_t$ to the agent 610. In some implementations, the environment 620 also sends an initial a reward $R_t$ to the agent 610 with the state $S_t$. The agent 610, based on its knowledge, takes an action $A_t$ in response to that state $S_t$, (and reward $R_t$, if any). The action $A_t$ is fed back to the environment 620, and the environment 620 sends a state-reward pair including a next state $S_{t+1}$ and reward $R_{t+1}$ to the agent 610 based on the action $A_t$. The agent 610 will update its knowledge with the reward $R_{t+1}$ returned by the environment 620 to evaluate its previous action(s). The process repeats until the environment 620 sends a terminal state S, which ends the process or episode. Additionally or alternatively, the agent 610 may take a particular action A to optimize a value V. The value V an expected long-term return with discount, as opposed to the short-term reward R. $V\pi(S)$ is defined as the expected long-term return of the current state S under policy $\pi$.

Q-learning is a model-free RL algorithm that learns the value of an action in a particular state. Q-learning does not require a model of an environment 620, and can handle problems with stochastic transitions and rewards without requiring adaptations. The "Q" in Q-learning refers to the function that the algorithm computes, which is the expected reward(s) for an action A taken in a given state S. In Q-learning, a Q-value is computed using the state $S_t$ and the action $A_t$ time t using the function $Q(S_t, A_t)$. $Q(S_t, A_t)$ is the long-term return of a current state S taking action A under policy $\pi$. For any finite MDP (FMDP), Q-learning finds an optimal policy $\pi$ in the sense of maximizing the expected value of the total reward over any and all successive intervals/iterations, starting from the current state S. Additionally, examples of value-based deep RL include Deep Q-Network (DQN), Double DQN, and Dueling DQN. DQN is formed by substituting the Q-function of the Q-learning by an NN, such as a convolutional neural network (CNN). Examples of DQN for connection management is discussed in U.S. application Ser. No. 17/561,563 and Orhan et al., Connection Management xAPP for O-RAN RIC: A Graph Neural Network and Reinforcement Learning Approach, arXiv:2110.07525v2 [cs.IT] (20 Oct. 2021).

Some RL-based implementations use contextual bandit per vertex type. In these implementations, the MDP formulation has a single states S given as: Graph G=(V, E), and input features $$x_v^{UE} \in \mathbb{R}^{F_{UE} \times 1}, v \in V_{UE}, x_v^{RU} \in \mathbb{R}^{F_{RU} \times 1}, v \in V_{RU},,$$

$$x_v^{DU} \in \mathbb{R}^{F_{DU} \times 1}, v \in V_{DU},, \text{ and } x_v^{CU} \in \mathbb{R}^{F_{CU} \times 1}, v \in V_{CU}.$$

For the action A, it can be assumed that predicted values $\hat{y}_v$ for a vertex are the action to optimize network energy efficiency/NES. The reward R and/or the reward functions are based on the energy efficiency metrics discussed supra in section 1.3. Additional or alternative RL-based implementations are discussed in U.S. application Ser. No. 17/483,208 filed on 23 Sep. 2023.

Table 1.5-1 shows examples of network parameters (e.g., measurements, metrics, and/or telemetries) that can be used as inputs for training any of the example implementations discussed herein. The parameters listed in table 1.5-1 are examples, and additional or alternative parameters can be used in other implementations, including any of those included in table 1.2-1 and/or others discussed herein. Additionally, the parameter names/labels listed in table 1.5-1 are examples, and other names/labels can be used to represent the listed parameters. Moreover, other types of data can be used for training and/or inference determination, such as historical data, environmental data (e.g., data related to weather including sunshine/daylight hours, geographic features, infrastructure-related data, and/or other information about a given area/region), telemetry data, availability and/or usage of renewable energy/electricity sources, calculations or estimates of GWP (e.g., CO2e and/or greenhouse gas equivalents), availability and/or usage of backup batteries at cloud sites (e.g., sunset vs. battery usage and/or the like), and/or other data/information. Furthermore, it should be appreciated that the same or similar types of parameters and/or other features/data used for training the NES ML model(s) can also be used as inputs to the trained NES ML model(s) for inference determination/generation.

TABLE 1.5-1

| Parameter | Description |
|---|---|
| $\eta_{PA}$ | PA efficiency |
| $\sigma_{feed}$ | feed loss |
| $P_{RF}$ | RF circuit power |
| $P_{BB}$ | Baseband power |
| $\sigma_{DC}$ | Direct current (DC) supply loss |
| $\sigma_{MS}$ | Main supply loss (e.g., alternating current (AC) supply loss) |
| $\sigma_{Cool}$ | Cooling loss |
| $\sigma_{RES}$ | Renewable energy source (RES) supply loss |
| $N_{RES}$ | Number of RESs available to a network node |
| $T_{RES}$ | Types of available RESs to a network node |

TABLE 1.5-1-continued

| Parameter | Description |
|---|---|
| $R_{RES\text{-}NES}$ | RES to non-RES (NES) ratio |
| $\delta_j$ | Transmitter efficiency for carrier j (includes losses, and PA efficiency) |
| $B_j$ | Bandwidth of carrier j |
| $P_{CP}$ | Carrier independent circuit power |
| $N_{cc}$ | Number of component carriers |
| $\delta$ | Transmitter efficiency |
| $P_0$ | RF chain circuit power consumption |
| $P_{CP}$ | Load independent circuit power consumption |
| $P_{VBB,k}$ | $k^{th}$ Virtual baseband power dissipation |
| $P_{DU,j}$ | $j^{th}$ DU power dissipation |
| $P_{RU,i}$ | $i^{th}$ RU power dissipation |
| $N_{VBB}$ | Number of virtual baseband units |
| $P_{VBB,cool}$ | Virtualized baseband cooling power |
| $P_{VBB,switch}$ | Virtualized baseband switch power |
| $P_{CBU,k}^{Cx}$ (freq) | Processor or core (CPU) power of processor/core (CPU) k at Cx state $\in$ {idle, sleep, active} |
| $\delta_{CPU}$ | slope of processor/core (CPU) power consumption |
| $P_{CPU,k}^{Cx}$ (freq) | maximum processor/core (CPU) consumption at frequency freq |
| $\rho_{CPU,k}$ | Load of processor/core (CPU) k |
| $N_{CPU}$ | Number of processors or processor cores |
| $P_{DU,j}$ | $j^{th}$ DU power dissipation |
| $P_{RU,i}$ | $i^{th}$ RU power dissipation |
| $DV_{UE}$ | Data volume per user (see e.g., [TS28552]) |
| $DV_{NAN}$ | Data volume per cell or NAN (see e.g., [TS28552]) |
| Thp | Average throughput (see e.g., [TS28552]) |
| UPT | Use perceived throughput |
| UR | User rate (see e.g., [TS28552]) |
| $FR_{RRC}$ | Radio resource control setup failure ratio |
| $FR_{RABS}$ | Radio access bearer setup ratio |
| $FR_{RABR}$ | Radio access bearer release failure ratio |
| $N_{RLF}$ | Number of radio link failures (RLFs) |
| $N_{beam}$ | Number of beam failures |
| $N_{PDUS}$ | Number of PDU session setup failures (see e.g., [TS28552], 3GPP TS 38.415, and 3GPP TS 38.413) |
| $N_{QoSS}$ | Number of QoS flow setup failures (see e.g., [TS28552]) |
| $N_{UE}$ | Number (or average number) of users/UEs |
| $BW_{NAN}$ | Bandwidth utilization of cell/NAN |
| $BW_{UE}$ | Bandwidth utilization of user/UE |

1.6. Inference Aspects

Once trained, the NES ML model (e.g., GNN+FCNN) can be used to make predictions on new data (e.g., newly collected measurements, metrics, telemetry data, and/or the like). The learned representations of nodes and edges allows the GNN to generalize to new graph structures and/or make predictions for nodes or edges, and the trained FCNN can generate inferences (NES parameters) indicating specific control parameters to be adjusted to achieve NES for the network as a whole.

FIG. 7 shows an example process 700 for operating a trained NES ML model for generating NES inferences. Process 700 may be performed by a suitable compute node (e.g., RIC(s) 135, CU(s) 132, DU(s) 131, one or more NFs in CN 142, edge compute node, cloud compute node or cluster, and/or any other compute node(s) discussed herein). Process 700 begins at operation 701 where the compute node collects network measurements and/or telemetry data of network nodes. At operation 702, the compute node runs, executes, or otherwise operates the NES ML model for NES optimization. The NES ML model may be operated according to process 800 of FIG. 8. The inferences output by the NES ML model may be predicted NES parameters that can be used to adjust various control parameters at individual network nodes. These NES parameters are sent to individual network nodes at operation 703, which may cause the individual network nodes (NANs) to adjust their respective control parameters accordingly. It should be noted that the change in control parameters can require handing over some or all UEs 102 being served by a NAN to other beams/cells/CCs provided by the same or different NANs, such as when the NES parameters indicate that one or more RF chains should be shut down and/or indicate that a NAN should be shut down or placed in a sleep state. In these cases, the NANs can perform suitable procedures, such as cell (re) selection, beam switching, handover (HO), conditional HO (CHO), conditional PSCell addition or change (CPAC), roaming/seamless roaming, session transfer, network disconnection/detachment, contention resolution, and/or other relevant procedures in response to receipt of the NAN parameters prior to adjusting the relevant control parameters.

At operation 704, the compute node measures network performance based on the NES parameters being implemented in the relevant network nodes. Process 700 can then be repeated on a periodic basis and/or in response to some trigger event(s) or condition(s). In embodiments, asynchronous per node GNN inferencing per vertex in the graph of the network is performed. The time period for generating inferences for each vertex may be long enough to allow the network adjust its connectivity based on the NES parameters/actions generated from a previous iteration/epoch.

FIG. 8 depicts an example GNN-based NES process 800, which may be performed by a suitable compute node (e.g., RIC(s) 135, CU(s) 132, DU(s) 131, one or more NFs in CN 142, edge compute node, cloud compute node or cluster, and/or any other compute node(s) discussed herein). Process 800 begins at operation 801 where the compute node identifies a set of network nodes in a wireless network and generates a graph of the wireless network where each network node in the network is represented as a vertex and connections between the network nodes are represented as edges (see e.g., FIGS. 3-4). In some examples, the wireless network is a 5G/NR cellular network, and the network nodes include a set of UEs 102, a set of RUs 130, a set of DUs 131, and a set of CUs 132. Additionally or alternatively, the set of network nodes can include a set of NFs in a CN 142, a set of AFs or application servers inside or outside the CN 142, and/or other entities/elements associated with the CN 142 or the wireless network. At operation 802, the compute node inputs the graph to a GNN, which outputs node embeddings and/or edge embeddings. At operation 803, the compute node inputs the embeddings to an FCNN, which predicts optimized energy consumption of individual nodes and/or the wireless network as a whole. At operation 804, the compute node generates NES parameters based on the predictions from the FCNN, wherein the NES parameters are used by individual network nodes to adjust one or more control parameters. In some embodiments, the predictions themselves may be in the form of NES parameters. Additionally or alternatively, the compute node generates the NES parameters by transforming, transcoding, translating, and/or performing other processing operations on the output from the FCNN. After operation 804, the process ends or returns to process 700.

Figure 9:
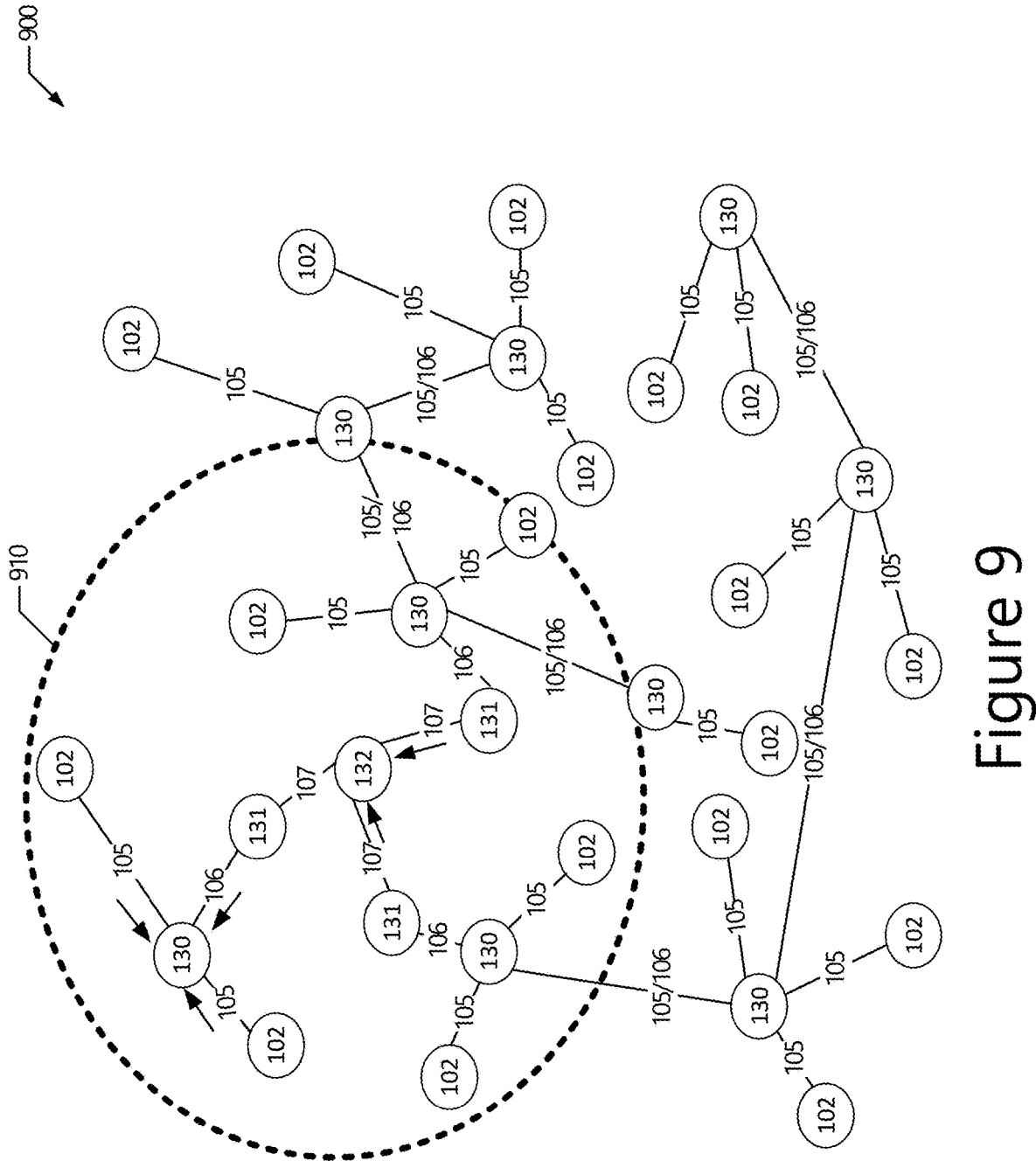
FIG. 9 depicts an example of GNN inference in a local network with local network measurement/telemetries to speed up AI computation using the graph network of FIG. 3.

FIG. 9 shows an example network 900 wherein NES inference is performed within a local network 910 using local network measurements, metrics, and/or telemetries to speed up AI/ML computation. In FIG. 9, the dashed circle represents the local network 910 for the graph 900. Due to the locality of network operation, NES inference is produced for a local graph (e.g., a graph of local network 910) when the computational complexity is relatively large to run such computations for a larger network 900. Here, each NES inference may be run or produced for the local graph in the same or similar manner as discussed previously. In some implementations, if there are multiple local inferences for multiple local networks, individual processor cores per NES inference can be used to reduce latency of the computations.

1.7. Computational Costs

Performing offline training allows the computational costs of training (e.g., using RL and/or supervised learning) to have little to no impacts on radio network operation. The computational costs related to generating NES inferences is scaled with the number of nodes in the network such as, for example, the number of UEs 102 and the number of NANs (e.g., the number of RUs 130, number of DUs 131, and/or number of CUs 132), and the amount of collected data (e.g., the number of measurements and telemetry data collected). The computational costs can be expressed by equation 1.7-1.

$$O(L|V_{UE}|F^2 + L|V_{RU}|F^2 + L|V_{DU}|F^2 + L|V_{CU}|F^2) \qquad (1.7\text{-}1)$$

In equation 1.7-1, F is the dimension of the NN (e.g., GNN and/or FCNN); L is the number of GNN layers and/or FCNN layers; and $|V_{UE}|$, $|V_{RU}|$, $|V_{DU}|$, $|V_{CU}|$ are the number of UEs 102, RUs 130, DUs 131, and CUs 132 in the network, respectively. The dimension of the radio network depends on implementation. However, it is expected that the network will have more than 1000 devices, in some implementations.

2. NES with Heterogeneous GNN Aspects

As mentioned previously, when parts of the network are not loaded fully, there arises opportunities for reducing energy consumption, for example, by strategically turning off NANs, putting NANs into a sleep state, and/or the like. However, this is a complex problem to model and optimize using conventional techniques. AI/ML-based approaches can be used to maximize NES and/or network energy efficiency.

Current wireless network deployment (e.g., base station positioning) takes user traffic modelling into account. For instance, a commercial space will have more indoor base stations for capacity, whereas more rural areas would be served by macrocell base stations. However, networks often operate assuming that the traffic is closer to peak traffic, and as a result, they end up over-provisioning resources. This results in significant compromises on energy efficiency of the network. Additionally, conventional networks rely on scheduling and physical layer (PHY) scheduling and transmission techniques to improve energy efficiency such as lean carrier design, sleep modes at symbol, carrier and channel level, optimization of massive MIMO (see e.g., [López-Pérez] and Hasan et al., Green Cellular Networks: A Survey, Some Research Issues and Challenges, arXiv:1108.5493v3 [cs.NI] (24 Sep. 2011)).

Existing/current solutions to save energy in wireless networks do not consider network level dynamics and do not take into account historical data available to make intelligent, data-driven decisions. Additionally, existing networks tend to rely on PHY transmission techniques and scheduling to conserve energy, which usually require extensive changes to existing standards and do not usually have a high return on investment for NES. The present disclosure provides NES solutions that use traffic and network aware AI/ML techniques that adjust control parameters of individual NANs, including turning NANs off and/or placing NANs in sleep states, when they have low utilization, as well as handover of UEs to other neighboring NANs during periods of low traffic and/or when a NAN experiences low loading.

The AI/ML techniques discussed herein treat a network as a heterogeneous graph with different kinds of nodes and edges, all of which have their own unique semantic information. Attention-based mechanisms are employed to capture the influence and importance of nodes to each other. Additionally, the user information per cell is summarized and then the cell-to-cell network graphs are processed using a graph attention network to obtain scores per cell. The AI/ML techniques discussed herein consider data traffic and network level information to signal which NANs can be turned off. The solutions discussed herein are scalable such that they are applicable for variable numbers of users, NANs, and/or other network nodes/elements. The solutions discussed herein are applicable to already deployed networks and do not require any major changes to existing standards. The solutions discussed herein can also accommodate different kinds of cells (e.g., macrocells and small cells), and preserves their relevant semantic information. The AI/ML architectures provided herein is/are lean and results in low processing times, while reducing overall network energy consumption.

2.1. Example Heterogeneous Network

Figure 10:
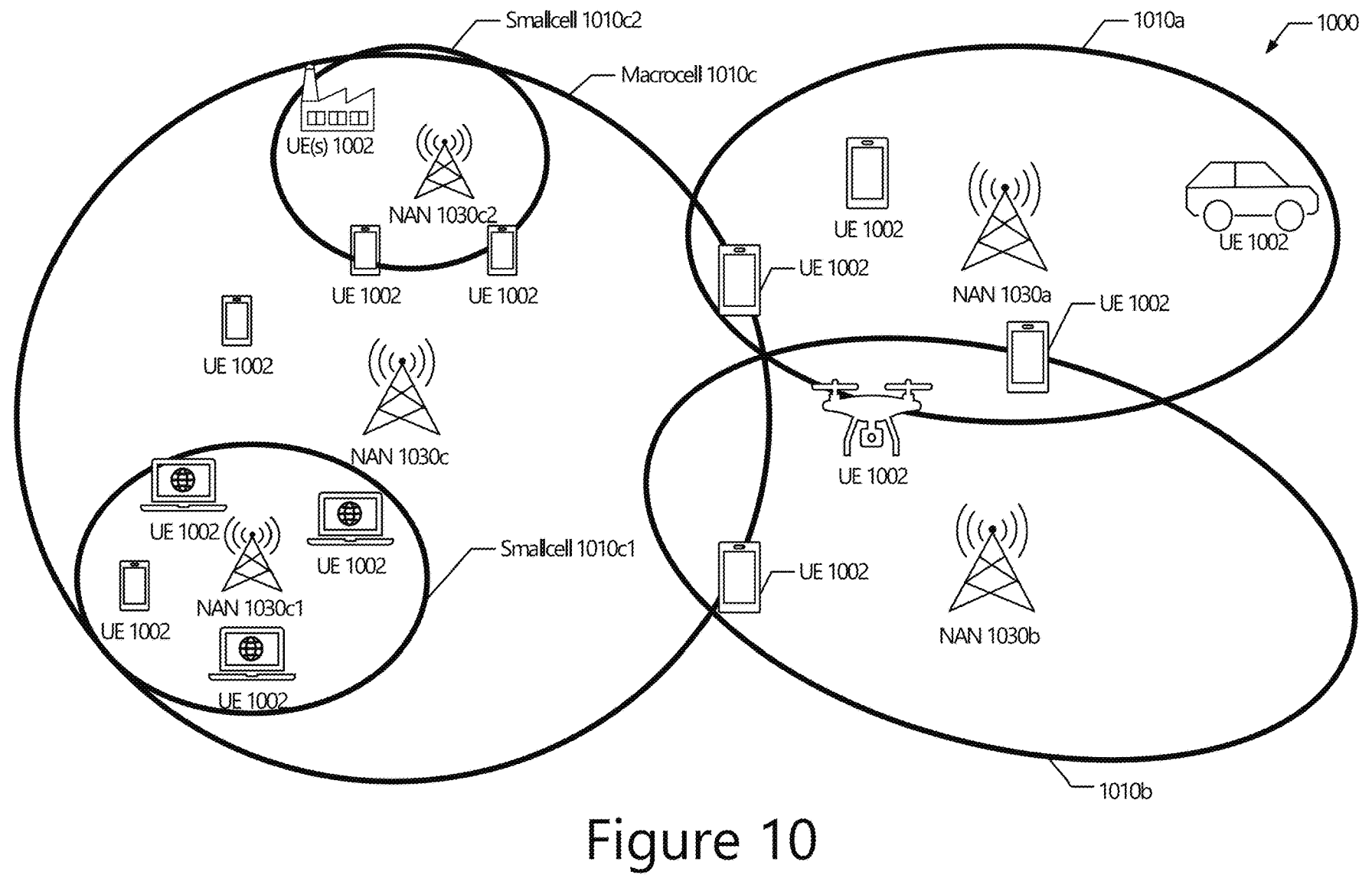

FIG. 10 example network 1000 including various NANs 1030 (e.g., each of which may be the same or similar as the NANs discussed previously w.r.t FIG. 1) and different kinds of UEs 1002 (e.g., each of which may be the same or similar as the UE 102 of FIG. 1). For purposes of the present disclosure, the term "user" may be used interchangeably with the terms "UE", "client", and the like, even though these terms may refer to different concepts. Each NAN 1030 provides one or more cells. A cell is a geographic area covered by a NAN 1030 in which the NAN 1030 provides network connectivity/services to one or more UEs 1002. A cell may also refer to a radio network object that can be uniquely identified by a UE 1002 from an identifier (e.g., a cell ID or the like) that is broadcasted over a geographical area from a NAN 1030. For purposes of the present disclosure, the term "cell" may be used interchangeably with the terms "NAN", "RAN node", "base station", and the like, even though these terms refer to different concepts.

In this example, the NANs 1030 can be classified as macrocell (MC) NANs 1030 or smallcell (SC) NANs 1030. The MC NANs 1030 provide respective macrocells 1010, such as MC 1010a being provided by NAN 1030a, MC 1010b being provided by NAN 1030b, and MC 1010c being provided by NAN 1030c. An MC 1010 is a cell that provides radio coverage to a relatively large area of a RAN, at least in comparison to SCs 1010. The MC NANs 1030 may be implemented as relatively tall radio towers/masts, mounted on roofs or other existing structures (e.g., at a height of 10 to 70 meters).

The SC NANs 1030 provide respective SCs 1010, such as SC 1010c1 being provided by NAN 1030c1 and SC 1010c2 being provided by NAN 1030c2. Here, the SCs 1011 may be 5G SCs, femtocells, picocells, microcells, WLAN coverage areas (e.g., provided by a WLAN access point), and/or the like. A SC 1010 is a cell that provides radio coverage to a relatively small area of a RAN, at least in comparison to MCs 1010. Additionally or alternatively, SCs 1010 have smaller coverage areas, smaller user capacity, and/or higher bandwidth compared to MCs 1010. The SC NANs 1030 may be implemented as relatively small devices, for example, femtocell NANs 1030 may be the size of a residential gateway or router, and picocell NANs 1030 may be a device with similar dimensions as a ream of A4 paper. Additionally, the SC NANs 1030 may be low-power NANs in comparison with MC NANs 1030. The coverage areas/distances for individual cells 1010 may depend on signaling frequency and bandwidth, transmit power, as well as physical obstructions in a given area.

In some examples, the RAN nodes 1030 are some combination of CUs, DUs, and/or RUs (e.g., some combination of CUs 132, DUs 131, and/or RUs 130 discussed w.r.t FIGS. 1-7). Additionally or alternatively, the RAN nodes 1030 can be IAB-nodes and/or IAB-donors as discussed previously. Additionally or alternatively, some or all of the RAN nodes 1030 can be WiMAX base stations, WiFi access points, some other type of base station(s) implementing other RAT(s), and/or any combination of NANs of different RAT types. Additionally or alternatively, some or all of the RAN nodes 1030 can be implemented as gateway devices, network appliances (e.g., switches, routers, hubs, firewalls, and/or the like), application servers, edge compute nodes, cloud compute nodes or clusters, data aggregators, and/or other types of network nodes. Although not shown by FIG. 10, the NANs 1030 may be connected to one another and with a CN 142 using any suitable connection mechanism, such as any of those discussed herein. In any of the aforementioned examples, the connections or links between the network nodes may be based on the underlying RAT(s) employed by those nodes.

Network 1000 can be considered a heterogeneous wireless network with different kinds of NANs 1030, cells 1010, and UEs 1002 (users). For example, the cells 1010 can be provided by MC NANs 1030 or SC NANs 1030 of varying types, sizes, and/or the like. In some implementations, the NANs 1030 can employ a split architecture as discussed previously w.r.t FIGS. 1-9. Additionally, the network 1000 includes various types/kinds of UEs 1002, such as, for example, smartphones, laptops, tablets, computer-assisted or autonomous driving (CA/AD) vehicles, drones, UAVs, robots, IoT devices, smart appliances, machines in smart factories, and/or the like and/or any other type of UE/clients/terminals, such as any of those discussed herein. The different NANs 1030/cells 1010 and UEs 1002 have varying power levels, capabilities, and/or features. Furthermore, although FIG. 10 does not show specific connections between the network nodes, various types of connections can be involved in network 1000, such as connections between a single UE 1002 and a single NAN 1030, between a single UE 1002 and multiple NANs 1030 (e.g., dual connectivity, CA, multi-TRP operation, and/or the like), between different NANs 1030, and/or between different UEs 1002 (e.g., sidelink connections). The connections can also include different physical channels, physical signals, bandwidth parts (BWPs), beams, and/or other aspects.

2.2. Network Modeling Aspects

The network 1000 is modeled as a graph with different types of nodes/vertices as summarized by table 2.2-1, and different types of edges as summarized by table 2.2-2. The graph may be the same or similar as graph G described previously. The nodes/vertices represent different network nodes (e.g., UEs 1002 and NANs 1030) and the edges represent the connections between individual UEs 1002 and NANs 1030. It should be noted that the connections can be between UEs 1002 and NANs 1030, but could also include direct/sidelink connections between different UEs 1002. In the following examples, the MCs 1010 and SCs 1010 are separated in order to capture the different features they contain. For purposes of the present disclosure, the different UEs 1002 are modeled as one kind of node for ease of explanation and for the sake of brevity. However, it should be noted that the various example implementations discussed herein can be extended to accommodate different types and kinds of UEs 1002, and as such, the different types of UEs 1002 can be modeled separately in order to capture the different features they contain.

TABLE 2.2-1

| Nodes | |
|---|---|
| Node/Parameter | Description |
| $\mathcal{B}$ | Set of MCs (both on and off) |
| $\|\mathcal{B}\| = B$ | Cardinality of set $\mathcal{B}$ |
| $\mathcal{H}$ | Set of SCs (both on and off) |
| $\|\mathcal{H}\| = H$ | Cardinality of set $\mathcal{H}$ |
| $\mathcal{U}$ | Set of UEs (active + inactive) |
| $\|\mathcal{U}\| = U$ | Cardinality of set $\mathcal{U}$ |

TABLE 2.2-2

| Edges | |
|---|---|
| Edge Type | Description |
| MC-MC | edge (link) between two MCs |
| MC-SC | edge (link) between an SC and a MC |
| SC-SC | edge (link) between two SCs |
| user-primary cell | edge (link) between a user and a primary cell. A "primary cell" at least in some examples is a cell with a best/highest signal strength (e.g., RSRP, RSRQ, and/or the like) to user. It can potentially be 'switched off' and it can be an SC or MC. Additionally or alternatively, a "primary cell" can be a primary cell (PCell) in CA or DC operation. |
| user-secondary cell | edge (link) between a user and a secondary cell. A "secondary cell" at least in some examples is a cell with a second best/highest signal strength (e.g., RSRP, RSRQ, and/or the like) to user. Additionally or alternatively, a "secondary cell" can be a secondary cell (SCell), a primary secondary cell (PSCell), or special cell (SpCell) in CA or DC operation. |
| user-tertiary cell | edge (link) between a user and a tertiary cell. A "tertiary cell" at least in some examples is defined as the cell with a third a best/highest signal strength (e.g., RSRP, RSRQ, and/or the like) to user. It can potentially be 'switched off' and it can be an SC or MC. Additionally or alternatively, a "tertiary cell" can be an SCell, a PSCell, or SpCell in CA or DC operation different than the "secondary cell". |

As shown by table 2.2-2, there are two categories of edges, including edges between two cell-type nodes (e.g., NANs 1030) and edges between a cell-type node and a UE-type node. The edges between different cell-type nodes may be referred to here as "cell edges". Although the nodes and the cell edges may have different semantic meanings, in the final graph involving only cell-type nodes (e.g., after summarizing the UE information), the cell edges can be treated similarly. Additionally, the edges between a cell-type nodes and UE-type nodes may be referred to herein as "user edges" or the like. Although the end node types in each of these edges may seem similar, the user edges have important semantic information and are treated in different ways as discussed infra.

2.3. Node Features

The various types of node features that can be used in the graph/GNN can include the following features.

UE features ($f_{u_i} \in R^{n_u}$) can include, for example, signal strength or quality measurements (e.g., RSRP, RSRQ, SNR, SINR, BLER, and/or other measurements such as any of those discussed herein) to primary cell, secondary cell, and tertiary cell. UE features can also include traffic data (e.g., past/historic traffic as well as any known/predicted future requirements), QoS requirements, throughput (e.g., average, maximum, minimum, and/or the like), percentage of time that a UE 1002 is in an active state and/or connected state, and/or any other measurements or metrics such as any of those discussed herein.

SC features ($f_{h_j} \in R^{n_s}$) can include, for example, SC operational state (e.g., ON state, OFF state, sleep state, and/or the like), transmit power, number of UEs served (e.g., can be "0" if the cell is off), peak users, average number of users, traffic data (e.g., past/historic traffic as well as any known/predicted future requirements), DL and UL throughput (e.g., average, peak and current), physical resource block (PRB) utilization, variances of relevant quantities, resources reserved for 'idle' state users which can be dependent on historical data, function of features related to parent MC such as cell load, total number of UEs served and the like to capture coverage and capacity dependencies, and/or any other measurements or metrics such as any of those discussed herein.

MC features ($f_{b_i} \in R^{n_b}$) can include, for example, MC state (e.g., ON state, OFF state, sleep state, and/or the like), transmit power, number of UEs served (e.g., can be "0" if the cell is off), peak users, average number of users, cell load, traffic data (e.g., past/historic traffic as well as any known/predicted future requirements), DL and UL throughput (e.g., average, peak and current), PRB utilization, variances of relevant quantity, resources reserved for 'idle' state users which can be dependent on historical data, and/or any other measurements or metrics such as any of those discussed herein.

Edge features: for the current formulation, the edges do not have any explicit features except to depict connectivity. However, in other implementations, edge features can become relevant, and in such implementations, edge features can include the same or different aspects as discussed previously.

2.4. GNN Formulation

Figure 11:
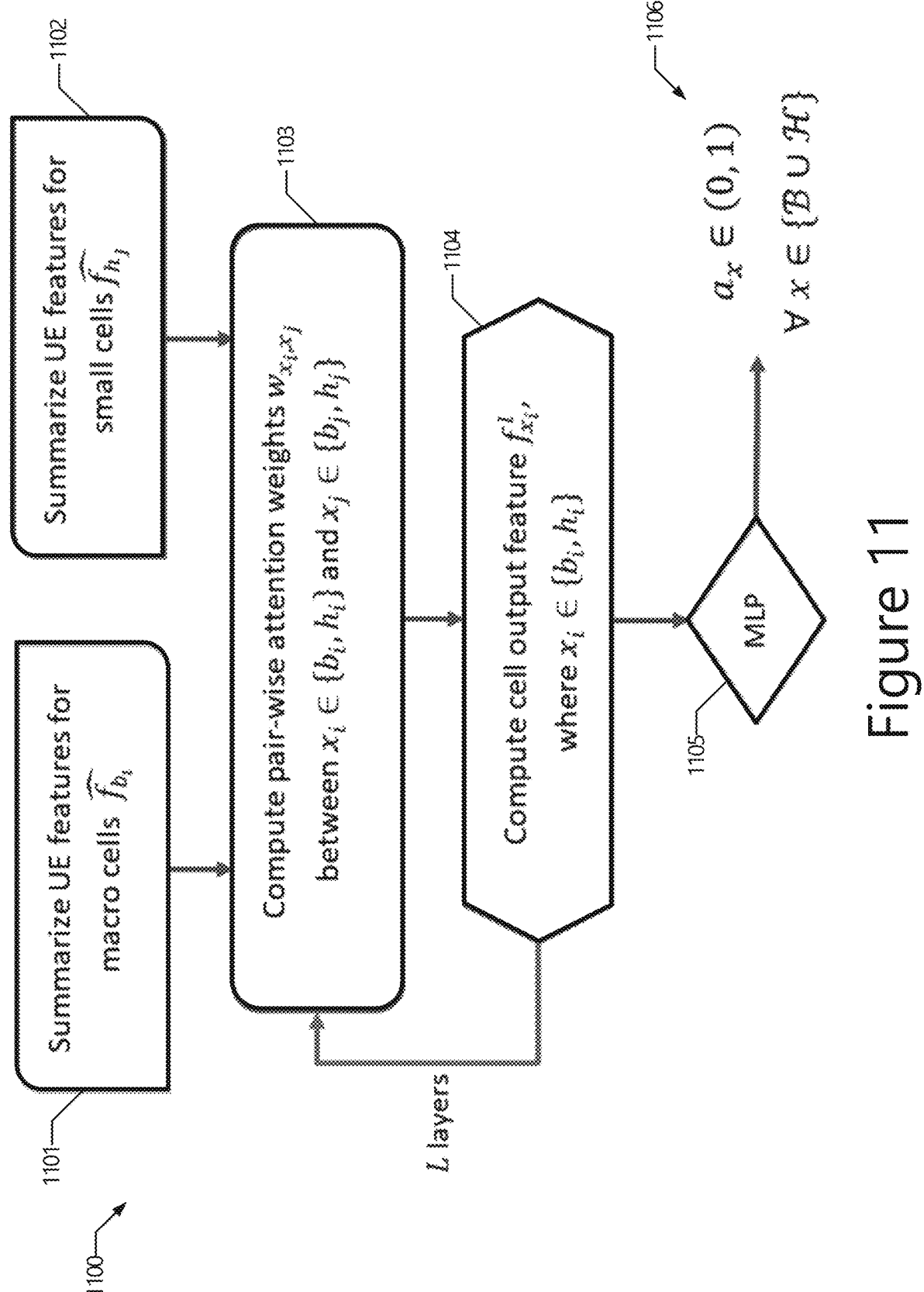
FIG. 11 depicts an example energy saving process.

FIG. 11 shows an example GNN formulation process 1100, which may be performed by a suitable compute node (e.g., RIC(s) 135, CU(s) 132, DU(s) 131, NANs 1030, one or more NFs in CN 142, edge compute node, cloud compute node or cluster, and/or any other compute node(s) discussed herein). Process 1100 is an energy saving (ES)/NES process that uses UE data and cell data to formulate a GNN. Process 1100 begins at operation 1101 where the compute node abstracts or summarizes the UE features for the various MCs 1010 ($\bar{f_{b_i}}$) and/or at operation 1102 where the compute node abstracts or summarizes the UE features for the various SCs

1010 ($\widetilde{f}_{h_i}$). Operations 1101 and 1102 may be performed sequentially (in any order) or simultaneously. At operation 1103, the abstracted UE features are combined or merged, and provided to the GNN where pair-wise attention weights ($W_{x_i x_j}$ between $x_i \in \{b_i, h_i\}$ and $x_j \in \{b_j, h_j\}$) are computed. At operation 1104, the compute node (operating the GNN) computes a cell output feature $$\left(f_{x_i}^l, \right.$$

where $x_i \in \{b_i, h_i\}$). Operations 1103 and 1104 are performed for each of the L layers of the GNN. At the end of this processing, the GNN includes a collection of cells abstractions of the merged users. At operation 1105, the cell output features are provided to an FCNN, which may be an MLP, DNN, or some other NN. At operation 1106, the FCNN predicts NES parameters score for each cell 1010 (e.g., $a_x \in (0,1)$, $\forall x \in \{\mathcal{B} \cup \mathcal{H}\}$).

The GNN formulation process 1100 has two parts. In a first part (1101, 1102), UE data is summarized per cell to capture an overall understanding of the users relevant to each cell. These users include those that are not served by the cell 1010, but are in the vicinity of the cell 1010. In the second part (1103, 1104, 1105), once the summarization of UE data is done, then the compute node (or GNN) proceeds with cell-to-cell interaction (1103, 1104, 1105) to finally output a score for each cell indicating whether to turn it on, turn it off, or perform some other action (1106). In this example, the output is a score for each cell that indicates whether the cell is to be on (e.g., when the score is close to 1) or to be off (e.g., when the score is close to 0). In other implementations, the MLP may provide an adjustment amount or scaling factor to be applied to various control parameters, such as those discussed previously.

2.4.1. Summarization/Abstraction of UE Data at Cells

Figure 12:
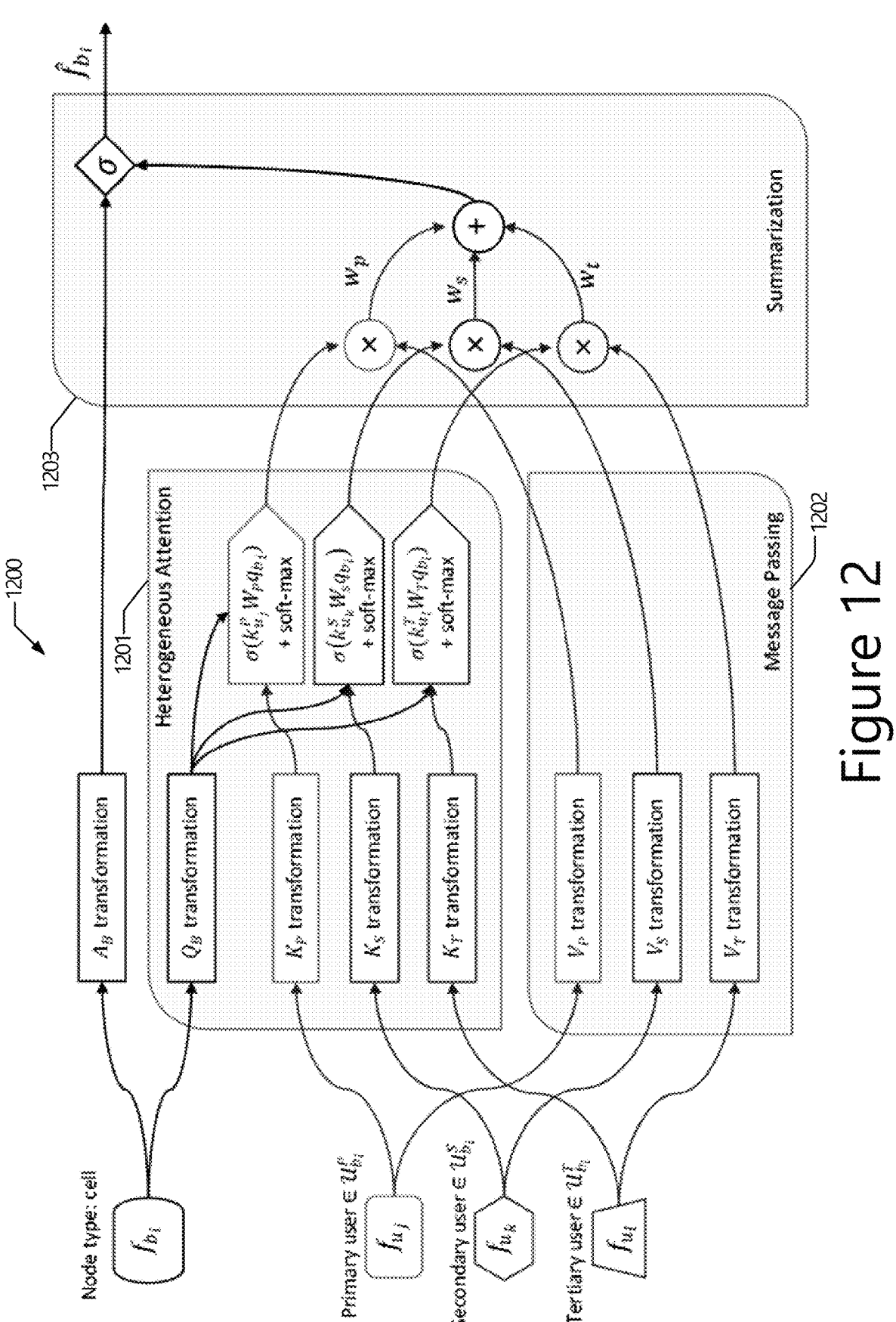
FIG. 12 depicts an example data summarization of different cells.

FIG. 12 shows an example UE summarization process 1200, which may correspond to summarization operations 1101 and 1102 of process 1100 discussed previously. Process 1200 can be used to summarize UE data at each cell, where the cell node can either be a MC or a SC. In some examples, the process of summarization is the same in both types of cells. In various implementations, the MC summarization (1101) and SC summarization (1102) are treated separately since the main cell node has different features, which results in different matrices. The difference stems from the fact that the cell nodes have different features, and therefore, the computations need to take these differences into consideration. Although the example of FIG. 13 and the following discussion are related to the summarization/abstraction process for MCs, the same process is applied for SCs as well.

The cell summarization process 1200 includes a heterogeneous attention mechanism 1201, message passing mechanism 1202, and summarization (abstraction) mechanism 1203, each of which is described infra. Each of these mechanisms 1201, 1202, 1203 may be implemented as respective NNs, objective functions, and/or using some other AI/ML techniques.

2.4.2. Macrocell Summarization/Abstraction

For every cell MC $b_i$, a set of UE nodes is defined as shown by table 2.4.2-1. Note that the different kinds of cell-type edges and UE-node edges are being invoked.

TABLE 2.4.2-1

| UE nodes | |
|---|---|
| Parameter | Description |
| $\mathcal{U}_{b_i}^P$ | the set of users associated with cell $b_i$ in a 'primary' fashion |
| $\mathcal{U}_{b_i}^S$ | (e.g., where cell $b_i$ is a primary cell) |
| | the set of users associated with cell $b_i$ in a 'secondary' fashion (e.g., where cell $b_i$ is a secondary cell) |
| $\mathcal{U}_{b_i}^T$ | the set of users associated with cell $b_i$ in a 'tertiary' fashion |
| 1 | |
| | (e.g., where cell $b_i$ is a tertiary cell) |

Furthermore, a set of node features are also determined or defined (see e.g., section 2.3, supra), which are summarized by table 2.4.2-2.

TABLE 2.4.2-2

| node features | |
|---|---|
| Parameter | Description |
| $f_{b_i}$ | features of cell $b_i$ |
| $f_{u_j}$ | features of user(s) in $\mathcal{U}_{b_i}^P$ |
| $f_{u_k}$ | features of user(s) in $\mathcal{U}_{b_i}^S$ |
| $f_{u_l}$ | features of user(s) in $\mathcal{U}_{b_i}^T$ |

2.4.2.1. Heterogeneous Attention Computation

The heterogeneous attention mechanism 1201 uses AI/ML techniques that mimic cognitive attention, which enhances important parts of a dataset, and can be implemented using dot-product attention, multi-head attention, self-attention, and/or some other attention mechanism(s). The heterogeneous attention mechanism 1201 calculates attention scores. Since the nodes have different features that do not correspond in a one-to-one fashion, they may be projected onto another space through linear transformations. Each of the transformations are mathematical operation(s) that is/are applied to input data to produce a new representation of that data. After the linear transformation is accomplished, attention scores for each UE node is/are computed.

Specifically, MC-node features $f_{b_i}$ (or SC-node features $f_{h_i}$ when repeated for SCs) and UE-node features (see table 2.4.2-2) are input to the heterogeneous attention mechanism 1201. The input features may be in the form of embedding vectors or some other data structure. These embeddings are then linearly transformed into three sets of vectors: a query vector via query transformation (e.g., $Q_B$ transformation in FIG. 12), key vectors via key transformations (e.g., $K_P$, $K_S$, and $K_T$ transformations in FIG. 12), and value vectors via value transformations (e.g., $V_P$, $V_S$, and $V_T$ transformations in FIG. 12, which are discussed infra w.r.t the message passing mechanism 1202 in section 2.4.2.2). These transformations are often parameterized, wherein the attention network 1201 learns the weights for these linear transformations during training. The query vector is/are used to determine what parts of the input should be attended to, the key vectors are used to provide context and help compute the attention scores, and the value vectors contain the information that will be used to create the output representation.

The projections through the linear transformations can include projecting cell features onto another space (see equation 2.4.2.1-1); projecting UE features of the users that are in $$\mathcal{U}_{b_i}^{p}$$

onto another space (see equation 2.4.2.1-2); projecting UE features of the users that are in $$\mathcal{U}_{b_i}^{s}$$

onto another space (see equation 2.4.2.1-3); and projecting UE features of the users that are in $$\mathcal{U}_{b_i}^{T}$$

onto another space (see equation 2.4.2.1-4).

$$q_{b_i} = Q_B \cdot f_{b_i}, \text{ where } Q_B \in R^{m_b \times n_b}; \text{ thus, } q_{b_i} \in R^{m_b} \qquad (2.4.2.1\text{-}1)$$

$$k_{u_j}^{p} = K_P \cdot f_{u_j}, \text{ where } K_P \in R^{m_u^p \times n_u}; \text{ thus, } k_{u_j}^{p} \in R^{m_u^p} \qquad (2.4.2.1\text{-}2)$$

$$k_{u_k}^{s} = K_S \cdot f_{u_k}, \text{ where } K_S \in R^{m_u^s \times n_u}; \text{ thus, } k_{u_k}^{s} \in R^{m_u^s} \qquad (2.4.2.1\text{-}3)$$

$$k_{u_l}^{t} = K_T \cdot f_{u_l}, \text{ where } K_T \in R^{m_u^t \times n_u}; \text{ thus, } k_{u_l}^{t} \in R^{m_u^t} \qquad (2.4.2.1\text{-}4)$$

Next, attention mechanism(s) compute scores for each feature in the input sequence (e.g., the aforementioned projections $$q_{b_i}, k_{u_j}^{p}, k_{u_k}^{s}, \text{ and } k_{u_l}^{t}$$

based on the similarity between the query vectors and the key vectors. Specifically, the query vector $q_{b_i}$ is compared via dot product with each of the key vectors $$k_{u_j}^{p}, k_{u_k}^{s}, \text{ and } k_{u_l}^{t}.$$

Here, attention scores are computed for all users with respect to cell $b_i$, including: primary user $u_j$ (see equation 2.4.2.1-5); secondary user $u_k$ (see equation 2.4.2.1-6); and tertiary user $u_l$ (see equation 2.4.2.1-7).

$$\sigma\left[\left(k_{u_j}^{p}\right)^{T} \cdot W_P \cdot q_{b_i}\right], \text{ where } W_P \in R^{m_u^p \times m_b} \qquad (2.4.2.1\text{-}5)$$

$$\sigma\left[\left(k_{u_k}^{s}\right)^{T} \cdot W_S \cdot q_{b_i}\right], \text{ where } W_S \in R^{m_u^s \times m_b} \qquad (2.4.2.1\text{-}6)$$

$$\sigma\left[\left(k_{u_l}^{t}\right)^{T} \cdot W_T \cdot q_{b_i}\right], \text{ where } W_T \in R^{m_u^t \times m_b} \qquad (2.4.2.1\text{-}7)$$

In equations 2.4.2.1-5, 2.4.2.1-6, and 2.4.2.1-7, $\sigma(.)$ is potentially a non-linear operator, $W_P$ is a weight matrix for a primary linear transformation, $W_S$ is a weight matrix for a secondary linear transformation, $W_T$ is a weight matrix for a tertiary linear transformation, and $(.)^{T}$ represents transposition. The attention scores reflect how much attention each cell should receive from each other user feature $f_{u_j}, f_{u_k}, f_{u_l}$ in their respective vectors. When the attention scores are computed for all users $((\alpha_{u_i}^{x})$ where $x \in \{p, s, t\})$, the attention scores are normalized within each group $$(\mathcal{U}_{b_i}^{p}, \mathcal{U}_{b_i}^{s} \text{ and } \mathcal{U}_{b_i}^{T}).$$

In some examples, the attention scores are calculated (and/or normalized) using a softmax function, which transforms the raw scores (or logits) into probabilities or a probability distribution. The output of the softmax functions are provided to the summarization mechanism 1203. In some examples, the output of each softmax function may be a vector with probabilities whose sum is 1.

2.4.2.2. Message Passing Computation

The message passing mechanism 1202 computes value vectors via value transformations (e.g., $V_P$, $V_S$, and $V_T$ transformations in FIG. 12), which involves computing features that lead to cell-features for each user as shown by equation 2.4.2.2-1.

$$\hat{f}_{u_i} = V_x \cdot f_{u_i}, \text{ where:} \qquad (2.4.2.2\text{-}1)$$

$$V_x = V_P, \text{ if user is in } \mathcal{U}_{b_i}^{p}$$

$$V_x = V_S, \text{ if user is in } \mathcal{U}_{b_i}^{s}$$

$$V_x = V_T, \text{ if user is in } \mathcal{U}_{b_i}^{T}$$

These features are combined with the attention scores (computed by the heterogeneous attention mechanism 1201) to compute the UE summary feature per cell as described infra. This may be done through the summarization mechanism 1203. Here, each value vector is multiplied with its corresponding attention score, which effectively amplifies the signal for the most important features and diminishes the signal for less important features. The hidden features of cell $b_i$ can be computed as shown by equation 2.4.2.2-2.

$$\hat{f}_{b_i} = \sigma\left[w_P\left(\sum_{u_j \in \mathcal{U}_{b_i}^{p}} \alpha_j^{p} \cdot \hat{f}_{u_j}\right) + w_s\left(\sum_{u_k \in \mathcal{U}_{b_i}^{s}} \alpha_{u_k}^{s} \cdot \hat{f}_{u_k}\right) + w_t\left(\sum_{u_l \in \mathcal{U}_{b_i}^{T}} \alpha_{u_l}^{t} \cdot \hat{f}_{u_l}\right) + A_B \cdot f_{b_i}\right] \qquad (2.4.2.2\text{-}2)$$

In equation 2.4.2.2-1, $$\alpha_j^{p}$$

is the attention score for user $u_j$ to primary cell; $\hat{f}_{u_j}$ is a set of features for user $u_j$;

$$\alpha_{u_k}^{s}$$

US 12,672,072 B2

43 is the attention score for user $u_k$ to secondary cell; $\widetilde{f_{u_k}}$ is a set of features for user $u_k$;

$$\alpha_{u_l}^t$$

5 is the attention score for user $u_l$ to tertiary cell, $\widetilde{f_{u_l}}$ is a set of features for user $u_l$; $w_p$, $w_s$, and $w_t$ are trainable scalar weights; $A_B$ is a trainable matrix; and $\sigma(.)$ is potentially a non-linear operator.

2.4.2.3. Smallcell Summarization/Abstraction

For summarization at SCs, the aforementioned operations described for the MC 1010 are repeated for each SC 1010. The trainable matrices are not shared between the MCs 1010 and SCs 1010 since the features are not the same between MCs 1010 and SCs 1010. However, the hidden features of the SCs, which include the summary of the UEs 1002 connected to the SC 1010, ultimately will have the same or similar dimensions as the MC and they will be treated similarly in the next operations.

2.4.3. Cell Level Combining

After the UE feature summarization is completed at every cell (1101, 1102), a graph is constructed to include the cell-type nodes only. The cell-to-cell graph is constructed based on location or any other relevant data. It should be noted that at least in some examples, not all cell nodes are connected to each other.

Figure 13:
FIG. 13 depicts an example network graph.

FIG. 13 shows an example cell-to-cell graph 1300, which includes cells 1310, where each cell 1310 has a cell boundary 1311 around a NAN (cell-node) 1330 that serves or otherwise provides the cell 1310, although not all cell boundaries 1311 are labeled in FIG. 13 for the sake of clarity. The UEs (UE-nodes) 1302 within a cell boundary 1311 are provided network connectivity by the corresponding NAN 1330. The NANs 1330 may be the same or similar as the NANs 1030 of FIG. 10 and/or the NANs discussed previously w.r.t FIGS. 1-9, and the UEs 1302 may be the same or similar as the UEs 1002 of FIG. 10 and/or UEs 102 of FIG. 1.

In graph 1300 a link between two cell nodes are present only if the distance between the nodes is less than a distance $d_{max}$. The distance $d_{max}$ may be predefined, configured, or learned using a suitable ML technique. The input features of the nodes (node-level features) are the summarization features computed previously (1101, 1102). Once the summarization is accomplished, a Graph Attention Network (GAN) (see e.g., Veličković et al., *Graph Attention Networks*, INTERNATIONAL CONFERENCE ON LEARNING REPRESENTATIONS (4 Feb. 2018)).

FIG. 14 shows an example process 1400 for construction a GAN, which may be performed by a suitable compute node (e.g., RIC(s) 135, CU(s) 132, DU(s) 131, NANs 1030, one or more NFs in CN 142, edge compute node, cloud compute node or cluster, and/or any other compute node(s) discussed herein). Process 1400 includes the following operations at each layer of the GNN: At operation 1401, the compute node calculates 'pairwise' attention scores between two cells (both MCs and SCs) that have an edge connecting them (e.g., using any of the three cell-type to cell-type edges; see e.g., table 2.2-2 supra) according to equation 2.4.3-1.

$$e_{x_i x_j} = \sigma\left(\vec{a}\left[Wf_{x_i}^l \big\| Wf_{x_j}^l\right]\right)$$ (2.4.3-1)

44

In equation 2.4.3-1, $\sigma$ is a non-linear operator (or transformation), $\vec{a}$ is a learnable weight vector, W is a weight matrix that is applied to every set of node features, $$f_{x_i}^l$$

is a set of node features for node $x_i$, $$f_{x_j}^l$$

is a set of node features for node $x_j$, $\|$ is a concatenation operation, $e_{x_i x_j}$ is the pairwise attention score (or attention coefficient) that represents or indicates the importance of node $x_i$ to node $x_j$ wherein $x_i \in \{b_i, h_i\}$ and $x_j \in \{b_j, h_j\}$, l is a layer of the GNN (e.g., l=1, . . . , L); and for the first layer, $$l = 1, f_{x_i}^l = \widetilde{f_{x_i}}.$$

At operation 1402, the compute node calculates pairwise weight(s) according to equation 2.4.3-2.

$$w_{x_i x_j} = \text{softmax}(e_{x_i x_j}) \text{ over all } x_j \in \mathcal{B} \cup \mathcal{H}$$ (2.4.32)

In equation 2.4.3-2, $w_{x_i x_j}$ is a pairwise weight for node $x_i$ and node $x_j$, and "softmax( )" is a softmax function that normalizes the coefficients $e_{x_i x_j}$. At operation 1403, the compute node calculates output feature(s) of each cell as shown by equation 2.4.3-3.

$$f_{x_i}^l = \sigma\left(\sum_{x_j \in \mathcal{B} \cup \mathcal{H}} w_{x_i x_j} \cdot V \cdot \widetilde{f_{x_i}}\right)$$ (2.4.3-3)

In equation 2.4.3-3, $\sigma$ is a non-linear operator (or transformation), $w_{x_i x_j}$ is the pairwise weight calculated in operation 1402, V is the number of nodes in the graph, and $\widetilde{f_{x_j}}$ is the summarized feature(s) for node $x_j$. At operation 1404, the compute node determines if there are any additional/remaining layers L in the GNN to be processed, and if so, the compute node loops back to perform operation 1401. At the final layer L of the GNN, the compute node proceeds to operation 1405 where the output features of each node is sent through an MLP (or some other type of NN) to obtain a score for each cell-type node (e.g., in the range [0, 1], or some other type of NES parameter(s)).

3. Example Device, Systems, and Configurations

As alluded to previously, the various network (graph) modeling and NES ML model (GNN+FCNN/MLP) aspects can be used to implement an intelligent connection management solution for wireless networks. This intelligent connection management solution can be embodied as a connection management function (CMF) that is configured to manage the association of UEs 102, 1002, 1302 with cells 1010 and/or NANs 130, 1030, 1330 to improve throughput and cell coverage, provide load balancing among network nodes, and enhance/improve NES in the network as a whole. For purposes of the present disclosure, the "CMF" may refer to the untrained NES ML model, the trained NES ML model, or both, unless the context dictates otherwise.

In some example implementations, the CMF is implemented as a network function (NF) in a CN 142 of a mobile network operator (MNO). In these implementations, the CMF can be a standalone NF (e.g., an NF that is separate from other NFs in the CN 142), or the CMF can be part of an already existing NF in the CN 142. In other implementations, the CMF is an NF that operates within an NG-RAN (e.g., as part of the CU 132 or DU 131 as discussed previously). In some implementations, the CMF can have a split architecture wherein a first CMF operates within the NG-RAN and a second CMF operates as an NF in the CN 142. In any of these implementations, the CMF may operate the trained NES ML model to generate inferences (NES parameters) as discussed herein, and may interface with other NFs in the CN 142 to train the NES ML model, such as the NWDAF containing MTLF (see e.g., [TS23288] and [TS23501]) and/or an ML training function management service as part of the 3GPP AI/ML management framework (see e.g., [3GPP-AI/ML]).

In some example implementations, the CMF is implemented or otherwise operates as part of an edge system and/or edge network that employs one or more edge computing technologies (ECTs) (also referred to as an "edge computing framework" or the like). The edge system includes a collection of edge compute nodes (also referred to as "edge hosts" or "edge servers") and edge management systems necessary to run edge computing applications (also referred to as "edge apps" or the like) within an operator network or a subset of an operator network. In these implementations, the CMF is implemented as one or more edge apps based on the underlying ECT. The edge servers are physical computer systems that may include an edge platform and/or virtualization infrastructure (VI), and provide compute, acceleration, storage, and network resources to edge computing applications (see e.g., discussion of cloud sites w.r.t FIG. 1, supra). Each of the edge servers are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to UEs 102, 1002. The VI of the edge compute nodes provide virtualized environments and virtualized resources for the edge hosts, and the edge computing applications may run as VMs and/or application containers on top of the VI. An example edge system/platform is the Intel® Smart Edge Open™ framework (see e.g., Intel® Smart Edge Open Developer Guide, release 23.01 (30 Sep. 2022)).

In some example implementations, the ECT is and/or operates according to the O-RAN framework, wherein the CMF is implemented as rApp(s) and/or xApp(s). Various aspects of the O-RAN framework and O-RAN architecture are described in O-RAN Working Group 1 (Use Cases and Overall Architecture): O-RAN Architecture Description, O-RAN ALLIANCE WG1, O-RAN Architecture Description v08.00, R003 (March 2023); O-RAN Working Group 1 Slicing Architecture, O-RAN ALLIANCE WG1, Slicing Architecture Technical Specification v09.00, R003 (March 2023); O-RAN Working Group 1 Use Cases Detailed Specification Architecture, v10.00, R003 (March 2023); O-RAN Working Group 2 (Non-RT RIC and A1 interface WG) A1 interface: General Aspects and Principles, v03.01, R003 (March 2023); O-RAN Working Group 2 (Non-RT RIC and A1 interface WG) A1 interface: Type Definitions, v05.00, R003 (March 2023); O-RAN Working Group 2 (Non-RT RIC and A1 interface WG) A1 interface: Transport Protocol, v02.01, R003 (March 2023); O-RAN Working Group 2 AI/ML workflow description and requirements v01.03 O-RAN ALLIANCE WG2 (October 2021); O-RAN Working Group 2 (Non-RT RIC and A1 interface WG): R1 interface: General Aspects and Principles 4.0, v04.00, R003 (March 2023); O-RAN Working Group 2 (Non-RT RIC and A1 interface WG): Non-RT RIC Architecture v3.00, R003 (June 2023); O-RAN Working Group 3 Near-Real-time RAN Intelligent Controller Architecture & E2 General Aspects and Principles, v03.01, R003 (March 2023); O-RAN Working Group 3, Near-Real-time Intelligent Controller, E2 Application Protocol (E2AP), v03.00, R003 (June 2023); O-RAN Working Group 3 Near-Real-time Intelligent Controller E2 Service Model (E2SM), v03.01, R003 (June 2023); O-RAN Working Group 3 Near-Real-time Intelligent Controller E2 Service Model (E2SM) KPM, v03.00, R003 (March 2023); O-RAN Working Group 3 Near-Real-time Intelligent Controller E2 Service Model (E2SM), Cell Configuration and Control, v01.01, R003 (March 2023); O-RAN Working Group 3 Near-Real-time Intelligent Controller E2 Service Model (E2SM) RAN Function Network Interface (NI) v01.00 (February 2020); O-RAN Working Group 3 Near-Real-time Intelligent Controller E2 Service Model (E2SM) RAN Control v03.00, R003 (June 2023); O-RAN Working Group 3 (Near-Real-time RAN Intelligent Controller and E2 Interface Working Group): Near-RT RIC Architecture, v04.00, R003 (March 2023); O-RAN Working Group 4 (Open Fronthaul Interfaces WG) Control, User and Synchronization Plane Specification, v12.00, R003 (June 2023) ("[ORAN.CUS]"); O-RAN Fronthaul Working Group 4 Cooperative Transport Interface Transport Control Plane Specification, v04.00, R003 (June 2023); O-RAN Fronthaul Working Group 4 Cooperative Transport Interface Transport Management Plane Specification, v12.00, R003 (June 2023); O-RAN Alliance Working Group 5 O1 Interface specification for O-CU-UP and O-CU-CP v05.00, R003 (June 2023); O-RAN Alliance Working Group 5 O1 Interface specification for O-DU, v07.00, R003 (June 2023); O-RAN Working Group 6 (Cloudification and Orchestration) Cloud Architecture and Deployment Scenarios for O-RAN Virtualized RAN v04.00 (October 2022); O-RAN Cloud Platform Reference Designs, v02.00, O-RAN ALLIANCE WG6 (February 2021); O-RAN Working Group 6, O2 Interface General Aspects and Principles, v04.00, R003 (June 2023); O-RAN Working Group 6 (Cloudification and Orchestration Work Group): O-RAN Acceleration Abstraction Layer General Aspects and Principles, v06.00, R003 (June 2023); O-RAN Working Group 6: O-Cloud Notification API Specification for Event Consumers, v03.00 (October 2022); O-RAN White Box Hardware Working Group Hardware Reference Design Specification for Indoor Pico Cell with Fronthaul Split Option 6 v02.00, O-RAN ALLIANCE WG7 (October 2021) ("[ORAN.IPC-HRD-Opt6]"); O-RAN WG7 Hardware Reference Design Specification for Indoor Picocell (FR1) with Split Architecture Option 7-2 v03.00, O-RAN ALLIANCE WG7 (October 2021) ("[ORAN.IPC-HRD-Opt7-2]"); O-RAN WG7 Hardware Reference Design Specification for Indoor Picocell (FR1) with Split Architecture Option 8 v03.00 (October 2021) ("[ORAN.IPC-HRD-Opt8]"); O-RAN White Box Hardware Working Group Hardware Reference Design Specification for Outdoor Micro Cell with Split Architecture Option 7.2 v04.00, R003 (June 2023) ("[ORAN.OMC-HRD-Opt7-2]"); O-RAN White Box Hardware Working Group Hardware Reference Design Specification for Outdoor Macrocell with Split Architecture Option 7.2, v02.00, R003 (March 2023) ("[ORAN.OMAC-HRD]"); O-RAN Open X-haul Transport Working Group Management interfaces for Transport Network Elements, v05.00, R003 (March 2023); O-RAN Open Transport Working Group 9 Xhaul Packet Switched Architectures and Solutions, v05.00, R003 (June 2023) ("[ORAN.XPSAAS]"); O-RAN Open X-haul Transport Working Group Synchronization Architecture and Solution Specification, v03.00 (October 2022); O-RAN Open Xhaul Transport WG9 WDM-based Fronthaul Transport, v03.00, R003 (March 2023); O-RAN Operations and Maintenance Architecture, v09.00, R003 (June 2023); and O-RAN Operations and Maintenance Interface Specification, v10.00, R003 (June 2023) (collectively referred to as "[O-RAN]"); and/or as discussed in '285 and '757.

In other example implementations, the ECT is and/or operates according to the multi-access edge computing (MEC) framework, wherein the CMF is implemented as one or more MEC apps. Various aspects of the MEC framework are described in ETSI GR MEC 001 v3.1.1 (2022 January), ETSI GS MEC 003 v3.1.1 (2022 March), ETSI GS MEC 009 v3.1.1 (2021 June), ETSI GS MEC 010-1 v1.1.1 (2017 October), ETSI GS MEC 010-2 v2.2.1 (2022 February), ETSI GS MEC 011 v2.2.1 (2020 December), ETSI GS MEC 012 V2.2.1 (2022 February), ETSI GS MEC 013 V2.2.1 (2022 January), ETSI GS MEC 014 v2.1.1 (2021 March), ETSI GS MEC 015 v2.1.1 (2020 June), ETSI GS MEC 016 v2.2.1 (2020 April), ETSI GS MEC 021 v2.2.1 (2022 February), ETSI GR MEC 024 v2.1.1 (2019 November), ETSI GS MEC 028 V2.2.1 (2021 July), ETSI GS MEC 029 v2.2.1 (2022 January), ETSI MEC GS 030 v2.1.1 (2020 April), and ETSI GR MEC 031 v2.1.1 (2020 October) (collectively referred to herein as "[MEC]").

In other example implementations, the ECT is and/or operates according to the 3GPP System Architecture for enabling Edge Applications, wherein the CMF is implemented as one or more edge application servers (EAS), edge enabler servers (EES), and/or edge configuration servers (ECS) in an edge data network (EDN), or cloud application server(s) (CAS) and/or cloud configuration servers (CCS) in an cloud data network (CDN). Various aspects of the 3GPP edge computing framework are described in 3GPP TS 23.222 v18.2.0 (2023 Jun. 21), 3GPP TS 23.434 v18.5.0 (2023 Jun. 21), 3GPP TS 23.501 v18.2.2 (2023 Jul. 7) ("[TS23501]"), 3GPP TS 23.502 v18.2.0 (2023 Jun. 29), 3GPP TS 23.548 v18.2.0 (2023-06-22), 3GPP TS 23.558 v18.3.0 (2023 Jun. 21), 3GPP TS 23.682 v18.0.0 (2023-03-31), 3GPP TS 28.532 v17.5.2 (2023 Jul. 5) ("[TS28532]"), 3GPP TS 28.533 v17.3.0 (2023 Mar. 30), 3GPP TS 28.535 v17.7.0 (2023 Jun. 22), 3GPP TS 28.536 v17.5.0 (2023 Mar. 30), 3GPP TS 28.538 v18.3.0 (2023 Jun. 22), 3GPP TS 28.541 v18.4.1 (2023 Jun. 30), 3GPP TS 28.545 v17.0.0 (2021 Jun. 24), 3GPP TS 28.550 v18.1.0 (2023 Mar. 30), 3GPP TS 28.554 v18.2.0 (2023 Jun. 22) ("[TS28554]"), 3GPP TS 28.622 v18.3.0 (2023 Jun. 22), 3GPP TS 29.122 v18.2.0 (2023 Jun. 26), 3GPP TS 29.222 v18.2.0 (2023 Jun. 26), 3GPP TS 29.522 v18.2.0 (2023 Jun. 27), 3GPP TS 33.122 v18.0.0 (2023 Jun. 22) (collectively referred to as "[3GPPEdge]").

In other example implementations, the ECT is and/or operates according to the Multi-Access Management Services (MAMS) framework, wherein the CMF is implemented as a Client Connection Manager (CCM) or a Network Connection Manager (NCM). Various aspects of the MAMS framework are described in Kanugovi et al., Multi-Access Management Services (MAMS), INTERNET ENGINEERING TASK FORCE (IETF), Request for Comments (RFC) 8743 (March 2020).

It should be understood that the aforementioned edge computing frameworks/ECTs and service deployment examples are only illustrative examples of ECTs/frameworks, and that the present disclosure may be applicable to many other or additional edge computing/networking technologies in various combinations and layouts, including any of those described in any suitable standards, specification, product/developer documentation, and/or reference guides. Examples of such ECTs/edge networking technologies include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be applicable to the present disclosure.

In addition or alternatively to the various examples mentioned herein, the connection management techniques and technologies discussed herein, including the training of the NES ML models and/or execution of the trained NES ML models, can be applied to various network topologies, different types of RATs, and/or networks including various types of communicating nodes.

In some example implementations, a network can comprise a set of autonomous or semi-autonomous nodes 102, 1002 (e.g., robots, cobots, drones, unmanned aerial vehicles (UAVs), autonomous driving vehicles (AVs), Internet of Things (IoT) devices, autonomous sensors, bot nets, and/or the like) where the (semi-)autonomous nodes 102, 1002 organize the communications amongst themselves. As examples, the environment in which the (semi-)autonomous nodes 102, 1002 can be a smart home, a smart factory, a smart city, among many other examples. In these implementations, one of the (semi-)autonomous nodes 102, 1002 takes the role of (or operates/executes) the CMF aspects discussed herein. Alternatively, a suitable NAN 130, 1030, 1330, aggregator, gateway device, network appliance, or some other entity/element takes the role of (or operates/executes) the CMF aspects discussed herein. In these examples, the connections or links between the (semi-)autonomous nodes 102, 1002 may be cellular links (e.g., 5G/NR, LTE, WiMAX, and/or any other RATs discussed herein), WLAN links (e.g., WiFi, and/or any other RATs discussed herein), vehicle-to-everything (V2X) links/connections (e.g., cellular V2X, ITS-G5, DSRC, and/or the like), short-range and/or wireless personal area network (WPAN) technologies (e.g., Bluetooth, Bluetooth Low Energy (BLE), ZigBee, WiFi-direct, and/or any other RATs discussed herein), and/or any other suitable access technology or RATs, such as any of those discussed herein.

In some example implementations, a network can comprise a set of servers, a set of hardware accelerators (e.g., one or more accelerator pools), and switch fabric (or simply "fabric") in one or more data centers or some other facility that may be spread across one or more geographic locations. Here, the "fabric" is an interconnect (IX) technology that carries on-chip communications between different functional components of an individual processor(s), and/or an IX technology that carries communications between different functional components of a computing device, a system, and/or network. In these implementations, a network/interface controller of the fabric (e.g., a SmartNIC, Intelligent Fabric Processor (IFP), Infinity Fabric (IF), and/or the like) at least one of the servers, or at least one of accelerators takes the role of (or operates/executes) the CMF aspects discussed herein. In these examples, the connections or links can be the IX channels/lanes of the underlying IX technology, or channels/connections of the network access technology, used to connect the servers and accelerators, such as any of the IX technologies discussed herein and/or any of the application layer, transport layer, network layer, and/or link layer technologies discussed herein.

In some example implementations, a network can comprise a set of virtual machines (VMs) (e.g., a virtual network), and at least one of the VMs, a VM manager (VMM) and/or hypervisor, or a virtual switch (vSwitch) takes the role of (or operates/executes) the CMF aspects discussed herein. In these examples, the connections or links can be any suitable virtual or physical connection mechanism(s) used to connect the VMs in the (virtual) network. In some example implementations, a network can comprise a set of virtualization containers (e.g., a virtual network), and at least one of the containers or a container orchestrator takes the role of (or operates/executes) the CMF aspects discussed herein. In these examples, the connections or links can be any suitable virtual or physical connection mechanism(s) used to connect the containers in the (virtual) network, such as any of the application layer, transport layer, network layer, and/or link layer technologies discussed herein.

Figure 15:
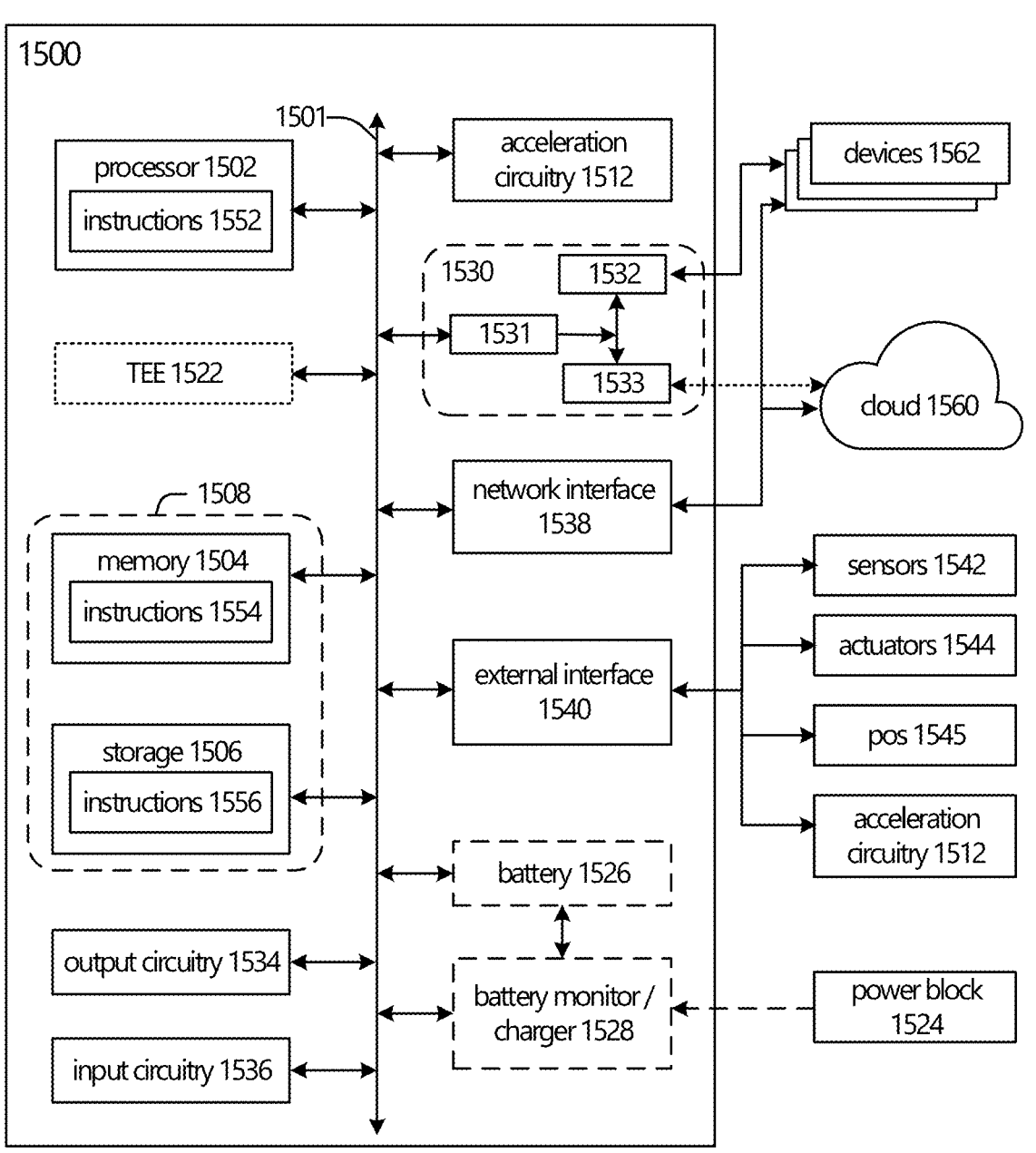
FIG. 15 depicts an example compute node.

FIG. 15 illustrates an example of components that may be present in an compute node 1500 for implementing the techniques (e.g., operations, processes, methods, and methodologies) described herein. The compute node 1500 provides a closer view of the respective components of node 1500 when implemented as or as part of a computing device (e.g., as a mobile device, a base station, server, gateway, and/or the like). The compute node 1500 may include any combinations of the hardware or logical components referenced herein, and may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the compute node 1500, or as components otherwise incorporated within a chassis of a larger system. The compute node 1500 may be embodied as a type of device, appliance, computer, or other "thing" capable of communicating with other components, devices, systems, and/or networks. For example, compute node 1500 may be embodied as a mobile compute device (e.g., smartphone, laptop, tablet, wearable device, drone, robot, and/or the like), a smart appliance, an in-vehicle compute system (e.g., a navigation system), a NAN, an edge compute node, cloud compute node, and/or other device or system capable of performing the described functions. In some examples, the compute node 1500 may correspond to any of the UEs 102, 1002, 1302; NANs 130, 1030, 1330; RIC(s) 135; NFs in CN 142; and/or any other component, device, and/or system discussed herein.

The compute node 1500 includes processing circuitry 1502 (or "processor circuitry 1502") in the form of one or more processors. The processor circuitry 1502 includes circuitry capable of sequentially and automatically carrying out a sequence of arithmetic or logical operations, or recording, storing, and/or transferring digital data. The processor circuitry 1502 includes circuitry and/or HW elements such as, for example, one or more processor cores and one or more of cache memory, low drop-out voltage regulators (LDOs), interrupt controllers, serial interfaces such as SPI, I$^2$C or universal programmable serial interface circuit, crystal oscillator(s), real time clock, timer-counters including interval and watchdog timers, general purpose I/O, memory card controllers, MIPI interfaces, JTAG test access ports, temperature sensors, and/or other hardware elements. The processors (or individual cores) 1502 is/are configured to execute instructions (e.g., instructions 1552 and/or instructions 1554, 1556 stored in the memory 1504 and/or storage 1506) to enable various applications run on the node 1500 and/or to provide a specific services to a user of the compute node 1500 or other devices/systems. As examples, the processor circuitry 1502 may be or include, for example, one or more processor cores (CPUs), application processors, graphics processing units (GPUs), RISC processors, Acorn RISC Machine (ARM) processors, CISC processors, one or more DSPs, FPGAs, PLDs, one or more ASICs, baseband processors, radio-frequency integrated circuits (RFIC), baseband processors, microprocessors or controllers, multi-core processor, multithreaded processor, ultra-low voltage processors, embedded processors, data processing unit (DPU), an Infrastructure Processing Unit (IPU), network processing unit (NPU), xPU, and/or any other known processing elements, or any suitable combination thereof. Additionally or alternatively, the processor(s) 1502 may be special-purpose processor(s)/controller(s) configured (or configurable) to operate according to the various examples discussed herein. One or more of the processor(s) 1502 may be implemented as part of a system on a chip (SoC), System-in-Package (SiP), a multi-chip package (MCP), and/or the like, in which the processor(s) 1502 and other components are formed into a single integrated circuit, or a single package.

The processor(s) 1502 may communicate with system memory 1504 over an interconnect (IX) 1501. Any number of memory devices (and any combination of memory devices) may be used to provide for a given amount of system memory 1504, such as any type of volatile, non-volatile, semi-volatile memory, and/or any combination thereof. Examples of such memory devices include, but are not limited to random access memory (RAM), static RAM (SRAM), dynamic RAM (DRAM), synchronous DRAM (SDRAM), magnetoresistive RAM (MRAM), conductive bridge Random Access Memory (CB-RAM), spin transfer torque (STT)-MRAM, phase change RAM (PRAM), core memory, dual inline memory modules (DIMMs), microDIMMs, MiniDIMMs, block addressable memory device(s) (e.g., those based on NAND or NOR technologies (e.g., single-level cell (SLC), Multi-Level Cell (MLC), Quad-Level Cell (QLC), Tri-Level Cell (TLC), or some other NAND), read-only memory (ROM), programmable ROM (PROM), erasable PROM (EPROM), electrically EPROM (EEPROM), flash memory, non-volatile RAM (NVRAM), solid-state storage, magnetic disk storage mediums, optical storage mediums, memory devices that use chalcogenide glass, multi-threshold level NAND flash memory, NOR flash memory, single or multi-level Phase Change Memory (PCM) and/or phase change memory with a switch (PCMS), NVM devices that use chalcogenide phase change material (e.g., chalcogenide glass), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, and/or a combination of any of the aforementioned memory devices, and/or other memory.

To provide for persistent storage of information, such as data, applications, OSs and so forth, a storage device 1506 can be coupled to the processor 1502 via the IX 1501. As examples, the storage circuitry 1506 can be implemented using hard disk drive (HDD), micro-HDD, solid-state disk drive (SSDD), and/or high-speed electrically erasable memory or flash memory. Other devices that may be used for the storage 1506 include flash memory cards (e.g., SD cards, microSD cards, eXtreme Digital (XD) picture cards, and the like) and/or USB flash drives. Additionally or alternatively, any of the technologies used for the memory circuitry 1504 can also be used for implementing the storage circuitry 1506.

The instructions 1554, 1556 provided via the memory 1504 and/or the storage 1506 may be embodied as a computer-readable medium (NTCRM) 1508 including code to direct the processor 1502 to perform various operations, tasks, processes, and/or the like, as discussed herein. The processor 1502 may access the NTCRM 1508 over the IX 1501. For purposes of the present disclosure, the terms "machine-readable medium", "computer-usable media", "computer-readable medium", and the like refer to any medium that can contain, store, communicate, propagate, encode, and/or transport instructions (or data to create such instructions) and/or other data or data structures for use by or in connection with such instructions. Additionally, the terms "machine-readable medium", "computer-usable media", "computer-readable medium", and the like refer to both transitory (non-tangible) and non-transitory (tangible) forms of machine-readable media, computer usable media, computer readable media, and the like. The terms "non-transitory computer-readable medium", "tangible machine-readable medium", and the like refer to any tangible device, machine, article of manufacture, and/or any other concrete structure capable of recording and/or storing data, and exclude propagating signals and transmission media.

In some examples, the instructions embodied by a machine-readable medium are transmitted and/or received over a communications network using a transmission medium via a network interface utilizing any one of a number of communication protocols, such as any of those discussed herein. A machine-readable medium may be provided by a memory device 1504, storage device 1506, and/or other apparatus capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry 1502 into the instructions to implement any of the operations discussed herein. For example, deriving the instructions from the information (e.g., processing by the processing circuitry 1502) may include: compiling (e.g., from source code, object code, and/or the like), interpreting, loading, organizing (e.g., dynamically or statically linking), encoding, decoding, encrypting, unencrypting, packaging, unpackaging, or otherwise manipulating the information into the instructions. Additionally or alternatively, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, and/or the like) on one or several remote servers. The source code packages may be encrypted when in transit over a network and decrypted, uncompressed, assembled (e.g., linked) if necessary, and compiled or interpreted (e.g., into a library, stand-alone executable, and/or the like) at a local machine, and executed by the local machine.

In some examples, the instructions 1552, 1554, and/or 1556 represent a CMF as discussed herein (e.g., a trained or untrained NES ML model). The instructions 1552, 1554, 1556 may be embodied or otherwise in the form of software, firmware, or hardware commands to implement the techniques described herein. Computer program code (e.g., instructions 1552, 1554, 1556) for carrying out operations of the present disclosure (e.g., computational logic and/or instructions 1552, 1554, 1556) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP-.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code 1552, 1554, 1556 for carrying out operations of the present disclosure may also be written in any combination of the programming languages discussed herein. The program code may execute entirely on the system 1500, partly on the system 1500, as a stand-alone software package, partly on the system 1500 and partly on a remote computer or entirely on the remote computer or server. In the latter scenario, the remote computer may be connected to the system 1500 through any type of network, including a LAN or WAN, or the connection may be made to an external computer (e.g., through the Internet using an Internet Service Provider (ISP)). Although the instructions 1552, 1554, 1556 are shown as code blocks, any of the code blocks may be replaced with hardwired circuits, for example, built into an ASIC, FPGA memory blocks, and/or the like.

In some examples, the instructions 1552, 1554, and/or 1556 represent one or more operating systems (OS) that act as an intermediary between computer hardware and various software applications. The OS may include one or more drivers that operate to control particular devices that are embedded in the compute node 1500, attached to the compute node 1500, and/or otherwise communicatively coupled with the compute node 1500. The OS performs some or all of the following functionality: HW management, process and task management, memory management, file system management, device and driver management, user interface aspects (e.g., command-line interface (CLI), a graphical user interface (GUI), and/or the like), security and access control, networking and communication, and error handling and recovery. Example OSs include consumer-based operating systems (e.g., desktop OS, mobile OS, and/or the like), embedded OS, multithreading OS, network OS, virtualization OS, hypervisor, real-time OS (RTOS), and/or the like. Additionally or alternatively, the instructions 1552, 1554, and/or 1556 represent one or more virtual machines (VMs) and/or isolated user-space instances, such as virtualization containers, partitions, virtual environments (VEs), and/or the like.

The TEE 1522 operates as a protected area accessible to the processor circuitry 1502 to enable secure access to data and secure execution of instructions. In some embodiments, the TEE 1522 may be a physical hardware device that is separate from other components of the system 1500 such as a secure-embedded controller, a dedicated SoC, or a tamper-resistant chipset or microcontroller with embedded processing devices and memory devices. Additionally or alternatively, the TEE 1522 may be implemented as secure enclaves (or "enclaves"), which are isolated regions of code and/or data within the processor and/or memory/storage circuitry of the compute node 1500. Other aspects of security hardening, hardware roots-of-trust, and trusted or protected operations may be implemented in the device 1500 through the TEE 1522 and the processor circuitry 1502.

The compute node 1500 can include or be coupled to acceleration circuitry 1512, which may be disposed inside the compute node 1500 and/or outside the compute node 1500. The acceleration circuitry 1512 may be embodied by one or more hardware accelerators, neural compute sticks, neuromorphic hardware, FPGAs, GPUs, SoCs (including programmable SoCs), digital signal processors, dedicated ASICs, programmable ASICs, PLDs (e.g., CPLDs and/or HCPLDs), DPUs, IPUs, NPUs, vision processing units (VPUs), tensor processing units (TPUs), NN processing units (NPUs), and/or other forms of specialized processors or circuitry designed to accomplish one or more specialized tasks. Additionally or alternatively, the acceleration circuitry 1512 is embodied as one or more xPUs. In some examples, an xPU is formed from, or otherwise comprises a multi-chip package including multiple chips stacked like tiles, where the stack of chips includes any of the types of processor(s) discussed herein in any suitable combination. Additionally or alternatively, an xPU is implemented by a heterogeneous computing system including multiple types of processor circuitry (e.g., any of those discussed herein in any suitable combination) and application programming interface(s) (API(s)) that may assign computing task(s) to whichever one(s) of the multiple types of the processing circuitry is/are best suited to execute the computing task(s). In any of these implementations, the tasks may include AI/ML tasks (e.g., training, inferencing/prediction, classification, and the like), visual data processing, network data processing, infrastructure function management, object detection, rule analysis, or the like.

In some implementations, the acceleration circuitry 1512 is configured or specifically tailored to train any of the NES ML models discussed herein. Additionally or alternatively, the acceleration circuitry 1512 is configured or specifically tailored to operate a trained NES ML model as discussed herein. In some examples, the compute node 1500 includes multiple HW accelerators 1512, each of which is configured or specially tailored to perform specific tasks. For example, the compute node 1500 can include or be connected to a first HW accelerator 1512 configured or specifically tailored to train an NES GNN model as discussed herein, a second HW accelerator 1512 configured or specifically tailored to train an NES NN model as discussed herein, and/or a third HW accelerator 1512 configured or specifically tailored to operate a trained NES ML model as discussed herein.

The compute node 1500 includes various interfaces and/or interface circuitry. For purposes of the present disclosure, the term "interface circuitry" at least in some examples refers to, is part of, or includes circuitry that enables the exchange of information between two or more components, devices, systems, or networks. The term "interface circuitry" at least in some examples refers to one or more hardware interfaces, for example, buses, I/O interfaces, peripheral component interfaces, network interface cards, radio transceivers, and/or the like. In the example of FIG. 15, the term "interface circuitry" may refer to the interconnect (IX) 1501, the communication circuitry 1530, the network interface 1538, and/or the external interface 1540.

The IX 1501 allows various components of the compute node 1500 to communicate with one another. The IX 1501 may represent any suitable type of connection or interface such as, for example, metal or metal alloys (e.g., copper, aluminum, and/or the like), fiber, and/or the like. The IX 1501 may include any number of IX, fabric, and/or interface technologies, including instruction set architecture (ISA), extended ISA (eISA), Inter-Integrated Circuit (I²C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX technology, RapidIO™ IX, Coherent Accelerator Processor Interface (CAPI), OpenCAPI, cache coherent interconnect for accelerators (CCIX), Gen-Z Consortium IXs, Hyper-Transport IXs, NVLink provided by NVIDIA®, a Time-Trigger Protocol (TTP) system, a FlexRay system, PROFI-BUS, ARM® Advanced eXtensible Interface (AXI), ARM® Advanced Microcontroller Bus Architecture (AMBA) IX, HyperTransport, Infinity Fabric (IF), and/or any number of other IX technologies. The IX 1501 may be a proprietary bus, for example, used in a SoC based system.

The communication circuitry 1530 allows the compute node 1500 to communicate with one or more external devices (e.g., one or more connected devices 1562) and/or with one or more networks (e.g., cloud 1560). The cloud 1560 provides access to a scalable and elastic pool of shareable computing resources with self-service provisioning and administration on-demand, which may be provided without active management by users. The cloud 1560 provides cloud computing services and/or resources via a defined interface (e.g., API(s), web services, network access, and/or the like). The cloud 1560 may represent any of the networks and/or clouds discussed herein (e.g., the edge cloud and/or regional cloud of FIG. 1). Additionally or alternatively, the cloud 1560 represents one or more cell sites (see e.g., FIG. 1). The connected devices 1562 may represent other compute node(s) 1500, such as one or more UEs 102, 1002, 1302; one or more NANs 130, 1030, 1330; edge compute nodes, cloud compute nodes, application servers, and/or the like.

The communication circuitry 1530 is a hardware element, or collection of hardware elements, used to communicate over a network and/or with other devices. Communication circuitry 1530 includes modem circuitry 1531 may interface with application circuitry of compute node 1500 (e.g., a combination of processor circuitry 1502 and CRM 1508) for generation and processing of baseband signals and for controlling operations of the transceivers (TRx) 1532 and 1533. The modem circuitry 1531 may handle various radio control functions that enable communication with one or more external devices via the TRxs 1532 and 1533 according to one or more wireless communication protocols and/or RATs. The modem circuitry 1531 may include circuitry such as, but not limited to, one or more single-core or multi-core processors (e.g., one or more baseband processors) or control logic to process baseband signals received from a receive signal path of the TRxs 1532, 1533, and to generate baseband signals to be provided to the TRxs 1532, 1533 via a transmit signal path. The modem circuitry 1531 may implement a real-time OS (RTOS) to manage resources of the modem circuitry 1531, schedule tasks, perform the various radio control functions, process the transmit/receive signal paths, and the like. The TRx 1532, 1533 include various hardware elements such as, for example, switches, filters, amplifiers, antenna elements, and/or other elements to facilitate over-the-air (OTA) communications.

The TRx 1532 and 1533 may be or include any number of radios (or RF circuitry) compatible with any number of RATs. In some implementations, TRx 1532 is used to communicate using a first RAT and the TRx 1533 is used to communicate using a second RAT. For example, the first RAT of TRx 1532 may be a short-range communications RAT (e.g., IEEE 802.15.4 based protocols, Bluetooth® and/or Bluetooth® low energy (BLE), ZigBee®, WiFi-direct, among many others, including any of those mentioned herein) and the second RAT of TRx 1533 may be a longer-range communications RAT (e.g., cellular, WiFi®, Worldwide Interoperability for Microwave Access (WiMAX) (IEEE 802.16), and/or the like). Additionally or alternatively, the TRx 1532 comprises wireless local area network (WLAN) radio circuitry and the first RAT is WiFi® and/or some other RAT based on any [IEEE802] standards (e.g., [IEEE80211], IEEE 802.16, and/or the like), and the TRx 1533 is a cellular radio circuitry and the second RAT is any suitable 3GPP-based RAT (e.g., 5G/NR, LTE, UTRA, GPRS, and/or the like). In some implementations, the TRx 1532 and TRx 1533 operate according to the same RAT. Additionally, the aspects described herein are not limited to the previously mentioned RATs, but may be used with any number of other transceivers that implement any other RATs, such as any of those mentioned herein.

The network interface 1538 may be included to provide wired communication with nodes of the cloud 1560 and/or to one or more other devices 1562. The wired communication may be provided using any suitable wire-based communication protocols, such as Ethernet, Controller Area Network (CAN), Local Interconnect Network (LIN), DeviceNet, ControlNet, Data Highway+, or PROFINET, among many others. In some examples, multiple network interfaces 1538 may be included to enable connecting to additional or alternative networks, for example, a first network interface 1538 providing communications to the cloud 1560 over Ethernet and a second network interface 1538 providing communications to other devices 1562 over another type of network. In some implementations, the network interface 1538 is a network interface controller (NIC), such as an Ethernet controller (e.g., a Gigabit Ethernet Controller or the like), a SmartNIC, Intelligent Fabric Processor(s) (IFP(s)), and/or the like. A SmartNIC, at least in some examples, is or includes a NIC, network adapter, and/or a network adapter card with programmable hardware accelerators and network connectivity (e.g., Ethernet and/or the like) that can offload various tasks or workloads from other compute nodes or compute platforms such as servers, application processors, and/or the like and accelerate those tasks or workloads. In some implementations, the network interface 1538 is an IPU, which in some examples refers to an advanced networking device with hardened accelerators and network connectivity (e.g., Ethernet and/or the like) that accelerates and manages infrastructure functions using tightly coupled, dedicated, programmable cores. An IPU offers full infrastructure offload and provides an extra layer of security by serving as a control point of a host for running infrastructure applications. An IPU is capable of offloading an entire infrastructure stack from the host and can control how the host attaches to the infrastructure. A SmartNIC has similar networking and offload capabilities as an IPU, but remains under the control of the host as a peripheral device.

The external interface 1540 is used to connect peripheral devices and/or additional subsystems to the compute node 1500. In some implementations, the interface 1540 can include one or more input/output (I/O) controllers. Examples of such I/O controllers include integrated memory controller (IMC), memory management unit (MMU), input-output MMU (IOMMU), sensor hub, General Purpose I/O (GPIO) controller, PCIe endpoint (EP) device, direct media interface (DMI) controller, Intel® Flexible Display Interface (FDI) controller(s), VGA interface controller(s), Peripheral Component Interconnect Express (PCIe) controller(s), universal serial bus (USB) controller(s), eXtensible Host Controller Interface (xHCI) controller(s), Enhanced Host Controller Interface (EHCI) controller(s), Serial Peripheral Interface (SPI) controller(s), Direct Memory Access (DMA) controller(s), hard drive controllers (e.g., Serial AT Attachment (SATA) host bus adapters/controllers, Intel® Rapid Storage Technology (RST), and/or the like), Advanced Host Controller Interface (AHCI), a Low Pin Count (LPC) interface (bridge function), Advanced Programmable Interrupt Controller(s) (APIC), audio controller(s), SMBus host interface controller(s), UART controller(s), and/or the like. Some of these controllers may be part of, or otherwise applicable to the memory circuitry 1504, storage circuitry 1506, and/or IX 1501 as well. The devices connected to the compute node 1500 via external interface 1540 can include sensors 1542, actuators 1544, positioning circuitry 1545, and/or acceleration circuitry 1512.

The sensor circuitry 1542 includes devices, modules, or subsystems whose purpose is to detect events or changes in its environment, and send the information (sensor data) about the detected events to some other a device, module, subsystem, and/or the like. Individual sensors 1542 may be exteroceptive sensors (e.g., sensors that capture and/or measure environmental phenomena and/external states), proprioceptive sensors (e.g., sensors that capture and/or measure internal states of the compute node 1500 and/or individual components of the compute node 1500), and/or exproprioceptive sensors (e.g., sensors that capture, measure, or correlate internal states and external states). Examples of such sensors 1542 include, inter alia, inertia measurement units (IMU) comprising accelerometers, gyroscopes, and/or magnetometers; microelectromechanical systems (MEMS)

or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 1500); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 1544 allow the compute node 1500 to change its state, position, and/or orientation, or move or control a mechanism or system. The actuators 1544 comprise electrical and/or mechanical devices for moving or controlling a mechanism or system, and converts energy (e.g., electric current or moving air and/or liquid) into some kind of motion. As examples, the actuators 1544 can be or include any number and combination of the following: soft actuators (e.g., actuators that changes its shape in response to a stimuli such as, for example, mechanical, thermal, magnetic, and/or electrical stimuli), hydraulic actuators, pneumatic actuators, mechanical actuators, electromechanical actuators (EMAs), microelectromechanical actuators, electrohydraulic actuators, linear actuators, linear motors, rotary motors, DC motors, stepper motors, servomechanisms, electromechanical switches, electromechanical relays (EMRs), power switches, valve actuators, piezoelectric actuators and/or biomorphs, thermal biomorphs, solid state actuators, solid state relays (SSRs), shape-memory alloy-based actuators, electroactive polymer-based actuators, relay driver integrated circuits (ICs), solenoids, impactive actuators/mechanisms (e.g., jaws, claws, tweezers, clamps, hooks, mechanical fingers, humaniform dexterous robotic hands, and/or other gripper mechanisms that physically grasp by direct impact upon an object), propulsion actuators/mechanisms (e.g., wheels, axles, thrusters, propellers, engines, motors (e.g., those discussed previously), clutches, and the like), projectile actuators/mechanisms (e.g., mechanisms that shoot or propel objects or elements), and/or audible sound generators, visual warning devices, and/or other like electromechanical components. Additionally or alternatively, the actuators 1544 can include virtual instrumentation and/or virtualized actuator devices. Additionally or alternatively, the actuators 1544 can include various controller and/or components of the compute node 1500 (or components thereof) such as, for example, host controllers, cooling element controllers, baseboard management controller (BMC), platform controller hub (PCH), uncore components (e.g., shared last level cache (LLC) cache, caching agent (Cbo), integrated memory controller (IMC), home agent (HA), power control unit (PCU), configuration agent (Ubox), integrated I/O controller (IIO), and interconnect (IX) link interfaces and/or controllers), and/or any other components such as any of those discussed herein. The compute node 1500 may be configured to operate one or more actuators 1544 based on one or more captured events, instructions, control signals, and/or configurations received from a service provider, client device, and/or other components of the compute node 1500. Additionally or alternatively, the actuators 1544 are used to change the operational state (e.g., on/off, zoom or focus, and/or the like), position, and/or orientation of the sensors 1542.

The positioning circuitry (pos) 1545 includes circuitry to receive and decode signals transmitted/broadcasted by a positioning network of a navigation satellite system (NSS).

An NSS provides autonomous geo-spatial positioning with global or regional coverage. Augmentation systems are NSS that provide regional coverage to augment the navigation systems with global coverage. For purposes of the present disclosure, the term "NSS" may encompass or refer to global, regional, and/or augmentation satellite systems. Examples of NSS include global NSS (GNSS) (e.g., Global Positioning System (GPS), the European Union's Galileo system, Russia's Global Navigation System (GLONASS), China's BeiDou NSS (BDS), and/or the like), regional NSS (e.g., Indian Regional Navigation Satellite System (IRNSS) or Navigation with Indian Constellation (NavIC), Japan's Quasi-Zenith Satellite System (QZSS), France's Doppler Orbitography and Radio-positioning Integrated by Satellite (DORIS), and/or the like), Space Based Augmentation System (SBAS) (e.g., Wide Area Augmentation System (WAAS), European Geostationary Navigation Overlay Service (EGNOS), Multi-Functional Satellite Augmentation System (MSAS), GPS Aided Geo Augmented Navigation (GAGAN), or the like. The pos 1545 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the pos 1545 may include a Micro-Technology for Positioning, Navigation, and Timing (Micro-PNT) IC that uses a master timing clock to perform position tracking/estimation without GNSS assistance. The pos 1545 may also be part of, or interact with, the communication circuitry 1530 to communicate with the nodes and components of the positioning network. The pos 1545 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the pos 1545 is, or includes an INS, which is a system or device that uses sensor circuitry 1542 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the platform 1500 without the need for external references.

In some examples, various input/output (I/O) devices may be present within or connected to, the compute node 1500, which are referred to as input circuitry 1536 and output circuitry 1534 in FIG. 15. The input circuitry 1536 and output circuitry 1534 include one or more user interfaces designed to enable user interaction with the platform 1500 and/or peripheral component interfaces designed to enable peripheral component interaction with the platform 1500. Input circuitry 1536 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1534 may be included to show information or otherwise convey information, such as sensor readings, actuator position(s), or other like information. Data and/or graphics may be displayed on one or more user interface components of the output circuitry 1534. Output circuitry 1534 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, and/or the like), with the output of characters, graphics, multimedia objects, and the like being generated or produced from the operation of the platform 1500. The output circuitry 1534 may also include speakers or other audio emitting devices, printer(s), and/or the like. Additionally or alternatively, the sensor circuitry 1542 may be used as the input circuitry 1534 (e.g., an image capture device, motion capture device, or the like) and one or more actuators 1544 may be used as the output device circuitry 1534 (e.g., an actuator to provide haptic feedback or the like). In another example, the output circuitry 1534 and/or input circuitry 1536 can include near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, and/or the like. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1526 may power the compute node 1500, although, in examples in which the compute node 1500 is mounted in a fixed location, it may have a power supply coupled to an electrical grid, or the battery may be used as a backup or for temporary capabilities. The battery 1526 may be a lithium ion battery, or a metal-air battery, such as a zinc-air battery, an aluminum-air battery, a lithium-air battery, and the like. A battery monitor/charger 1528 may be included in the compute node 1500 to track the state of charge (SoCh) of the battery 1526, state of health (SoH), state of function (SoF), and/or other status information and/or parameters of the battery 1526. The battery monitor/charger 1528 may communicate the status information to the processor 1502 over the IX 1501. The battery monitor/charger 1528 may include a battery monitoring IC, a power monitoring IC (PMIC), and/or the like. The battery monitor/charger 1528 may also include an analog-to-digital (ADC) converter that enables the processor 1502 to directly monitor the voltage of the battery 1526 or the current flow from the battery 1526. The battery parameters may be used to determine actions that the compute node 1500 may perform, such as transmission frequency, network operation, sensing/sampling frequency, entering/exiting a sleep state or active state for energy savings purposes, and/or the like.

A power block 1524 or other power supply coupled to a power grid may be coupled with the compute node 1500, or the battery monitor/charger 1528 to charge the battery 1526. In some examples, the power block 1524 may be replaced with, or otherwise include, a wireless power receiver to obtain the power wirelessly, for example, through a loop antenna, induction coil, LC circuits or resonant circuits, and/or the like. A wireless battery charging circuit may be included in the battery monitor/charger 1528. The specific charging circuits may be selected based on the size of the battery 1526, and/or the current required. The charging may be performed according to a suitable standard, such as Airfuel Alliance® standards, Mange Charge standards, SAE J2954, the Qi wireless charging standard, Open Dots, among many others.

The example of FIG. 15 is intended to depict a high-level view of components of a varying device, subsystem, or arrangement of an edge computing node. However, in other implementations, some of the components shown may be omitted, additional components may be present, and/or a different arrangement of the components shown may occur in other implementations. Additionally or alternatively, some of the depicted components may be combined into a single component, package, or other element, and/or some of the depicted components may be further divided into separate discrete elements. Further, these arrangements are usable in a variety of use cases and environments, including those discussed herein.

4. EXAMPLE IMPLEMENTATIONS

Additional examples of the presently described methods, devices, systems, and networks discussed herein include the following, non-limiting implementations. Each of the following non-limiting examples may stand on its own or may be combined in any permutation or combination with any one or more of the other examples provided below or throughout the present disclosure.

Example 1 includes a method for network energy savings (NES) in a network, comprising: operating an NES GNN model to predict, for a plurality of network nodes in a wireless network based on a graph of the wireless network, at least one NES parameter that indicates a control parameter to be adjusted for NES in the wireless network; and sending data related to the predicted at least one NES parameter to at least one network node of the plurality of network nodes, wherein the data is to cause the at least one network node to adjust the control parameter according to the at least one NES parameter.

Example 2a includes the method of example 1 and/or some other example(s) herein, wherein the method includes: generating the graph for use by the NES GNN model. Example 2b includes the method of example 1 and/or some other example(s) herein, wherein the method includes: generating the graph; and feeding the graph to the NES GNN model.

Example 3 includes the method of examples 2a-2b and/or some other example(s) herein, wherein the method includes: generating the graph based on the plurality of network nodes and connections between individual network nodes of the plurality of network nodes.

Example 4 includes the method of examples 1-3 and/or some other example(s) herein, wherein the graph includes a set of vertices and a set of edges, wherein individual vertices in the set of vertices represents a corresponding network node in the wireless network, and individual edges in the set of edges represents a corresponding connection between two network nodes in the wireless network.

Example 5 includes the method of example 4 and/or some other example(s) herein, wherein the graph includes a set of feature vectors, individual feature vectors in the set of feature vectors includes collected data for a corresponding network node of the plurality of network nodes.

Example 6 includes the method of example 5 and/or some other example(s) herein, wherein operating the NES GNN model includes: determining embeddings for an individual vertex in the set of vertices based on respective feature vectors of one or more vertices that are neighbors of the individual vertex; and generating a new representation of the wireless network based on the determined embeddings.

Example 7a includes the method of example 6 and/or some other example(s) herein, wherein the collected data for the corresponding network node is selected from a group comprising: power amplifier data, radiofrequency (RF) circuit energy consumption data, RF chain circuit energy consumption data, power supply data, renewable energy source (RES) data, processor states of individual processors in the corresponding network node, data volume per network node, throughput, data rate, network-related setup failures, number of connected users, bandwidth utilization, or any combination thereof. Example 7b includes the method of example 6 and/or some other example(s) herein, wherein the collected data for the corresponding network node is selected from a group comprising: power amplifier efficiency, feed loss, radiofrequency (RF) circuit power consumption, RF circuit efficiency, RF chain circuit power consumption, baseband power consumption, DC supply loss, main supply loss, cooling loss, renewable energy source (RES) supply loss, number of available or accessible RESs, types of available or accessible RESs, ratio of available or accessible RESs to available or accessible non-RESs, transmitter efficiency, transmitter efficiency per carrier, bandwidth per carrier, carrier independent circuit power, number of component carriers, load independent circuit power consumption, number of virtual baseband processors, virtual baseband power dissipation, network node power dissipation, virtual baseband cooling power, virtual baseband switch power, power consumption of individual processors while in one or more Cx states, power consumption of individual processor cores while in one or more Cx states, slope of CPU power consumption, maximum processor power consumption at a given frequency, maximum processor core power consumption at a given frequency, number of processors or processor cores, network node power dissipation, data volume per network node, average throughput, throughput perceived by network node, network node data rate, radio resource control setup failure ratio, radio access bearer setup ratio, radio access bearer release failure ratio, number of radio link failures, number of beam failures, number of protocol data unit session setup failures, number of QoS flow setup failures, number of connected users, network node bandwidth utilization, and any combination thereof.

Example 8 includes the method of examples 1-7b and/or some other example(s) herein, wherein a last layer of the NES GNN model is a fully connected neural network (FCNN).

Example 9 includes the method examples 1-8 and/or some other example(s) herein, wherein the NES GNN model is connected to an FCNN via one or more of an API, web service, AI/ML pipeline, workflow management platform, middleware, firmware, drivers, software glue, or communication protocol.

Example 10 includes the method examples 8-9 and/or some other example(s) herein, wherein the FCNN maps an output of the GNN to predicted NES parameters.

Example 11 includes the method examples 8-10 and/or some other example(s) herein, wherein the FCNN is a neural network (NN) selected from a group comprising: feed forward NN (FFN), deep FNN, convolutional NN (CNN), deep CNN, deconvolutional NN, autoencoder, encoder-decoder network, a deep belief NN, a perception NN, multilayer perceptron (MLP), recurrent NN, spiking NN, deep stacking network, Markov chain, perception NN, generative adversarial network, transformer, stochastic NN, probabilistic graphical model, linear dynamical system (LDS), switching LDS (SLDS), Optical NN, reinforcement learning (RL) NN, a deep RL NN, an attention mechanism, another NN including any of those discussed herein, or any combination thereof.

Example 12 includes the method examples 1-11 and/or some other example(s) herein, wherein the processor circuitry is to: train the NES GNN model using supervised learning or reinforcement learning.

Example 13 includes the method examples 1-12 and/or some other example(s) herein, wherein the NES GNN is a graph convolutional neural network or a graph attention network.

Example 14a includes the method examples 1-13 and/or some other example(s) herein, wherein the predicted at least one NES parameter is selected from a group comprising: one or more radiofrequency (RF) chains to be turned on or off, a scaling factor for power back-off at a power amplifier, one or more radio units (RUs) to be shut off or placed in a sleep mode, a processor state for individual processors or individual processor cores, a configuration of resources to be used for virtualization containers or virtual machines, or any combination thereof. Example 14b includes the method examples 1-13 and/or some other example(s) herein, wherein the predicted at least one NES parameter is selected from a group comprising: one or more radiofrequency (RF) chains to be turned on or off, a scaling factor for power back-off at a power amplifier, a number of component carriers (CC) to be enabled or disabled, a scaling factor for output power control per CC, one or more radio units (RUs) to be shut off or placed in a sleep mode, a processor power state for individual processors or individual processor cores, a processor performance state for individual processors or individual processor cores; a configuration of resources to be used for virtualization containers or virtual machines, and any combination thereof.

Example 15 includes the method examples 1-14b and/or some other example(s) herein, wherein the at least one NES parameter includes a predicted state, level, adjustment amount, scaling factor, value, variable, parameter, data, goal, policy, or configuration for changing the control parameter.

Example 16 includes the method examples 1-15 and/or some other example(s) herein, wherein the data related to the predicted at least one NES parameter includes a state, level, adjustment amount, scaling factor, value, variable, parameter, data, goal, policy, or configuration for changing the control parameter.

Example 17 includes the method examples 1-16 and/or some other example(s) herein, wherein the data related to the predicted at least one NES parameter is to cause the X the NANs can perform suitable procedures, such as cell (re)selection, beam switching, handover (HO), conditional HO (CHO), conditional PSCell addition or change (CPAC), roaming/seamless roaming, session transfer, network disconnection/detachment, contention resolution, and/or other relevant procedures in response to receipt of the NAN parameters prior to adjusting the relevant control parameters Example 18 includes the method of examples 1-17 and/or some other example(s) herein, wherein the at least one network node is a user equipment (UE), a radio unit (RU), a distributed unit (DU), or a centralized unit (CU) in a distributed radio access network (RAN) architecture or a centralized RAN architecture.

Example 19 includes the method of examples 1-18 and/or some other example(s) herein, wherein each network node is a UE, a macrocell network access node (NAN), or a small cell NAN.

Example 20 includes the method of examples 1-19 and/or some other example(s) herein, wherein the method is performed by a RAN intelligent controller (RIC).

Example 21 includes the method of example 20 and/or some other example(s) herein, wherein the RIC is a non-real time (RT) RIC and the NES GNN model is implemented as a non-RT RIC application (rApp).

Example 22 includes the method of example 20 and/or some other example(s) herein, wherein the RIC is a near-RT RIC and the NES GNN model is implemented as a near-RT RIC application (xApp).

Example 23 includes the method of examples 1-22 and/or some other example(s) herein, wherein the method is performed by an edge compute node.

Example 24 includes the method of example 23 and/or some other example(s) herein, wherein the edge compute node is a multi-access edge computing (MEC) host and the NES GNN is implemented as a MEC application.

Example 25 includes the method of example 23 and/or some other example(s) herein, wherein the edge compute node is compute infrastructure implementing a 3GPP System Architecture for enabling Edge Applications framework in an edge data network or a cloud data network, and the NES GNN is implemented as an edge application server, edge enabler server, edge configuration server, cloud application server, and/or a cloud configuration server.

Example 26 includes an edge compute node executing a service as part of one or more edge applications instantiated on virtualization infrastructure, the service being related to any of examples 1-25, portions thereof, and/or some other example(s) herein.

Example 27 includes one or more computer readable media comprising instructions, wherein execution of the instructions by processor circuitry is to cause the processor circuitry to perform the method of examples 1-25.

Example 28 includes a computer program comprising the instructions of example 27 and/or some other example(s) herein.

Example 29 includes an Application Programming Interface defining functions, methods, variables, data structures, and/or protocols for the computer program of example 28 and/or some other example(s) herein.

Example 30 includes an API or specification defining functions, methods, variables, data structures, protocols, and the like, defining or involving use of any of examples 1-25 or portions thereof, or otherwise related to any of examples 1-25 or portions thereof.

Example 31 includes an apparatus comprising circuitry loaded with the instructions of example 27 and/or some other example(s) herein.

Example 32 includes an apparatus comprising circuitry operable to run the instructions of example 27 and/or some other example(s) herein.

Example 33 includes an integrated circuit comprising one or more of the processor circuitry of example 27 and the one or more computer readable media of example 27 and/or some other example(s) herein.

Example 34 includes a computing system comprising the one or more computer readable media and the processor circuitry of example 27 and/or some other example(s) herein.

Example 35 includes an apparatus comprising means for executing the instructions of example 27 and/or some other example(s) herein.

Example 36 includes a signal generated as a result of executing the instructions of example 27.

Example 37 includes a data unit generated as a result of executing the instructions of example 27 and/or some other example(s) herein.

Example 38 includes the data unit of example 36 and/or some other example(s) herein, wherein the data unit is a datagram, packet, frame, data segment, Protocol Data Unit (PDU), Service Data Unit (SDU), message, type length value (TLV), segment, block, cell, chunk, or a database object.

Example 39 includes a signal encoded with the data unit of examples 37 and/or 38 and/or some other example(s) herein.

Example 40 includes an electromagnetic signal carrying the instructions of example 27 and/or some other example(s) herein.

Example 41 includes an apparatus comprising means for performing the method of examples 1-25 and/or some other example(s) herein.

5. Terminology

For the purposes of the present document, the following terms and definitions are applicable to the examples and embodiments discussed herein. Additionally, the terminology provided in '285 and '757 may also be applicable to aspects of the present disclosure.

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, stages, iterations, operations, elements, and/or components, but do not preclude the presence or addition of one or more other features, integers, stages, iterations, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The phrase "X(s)" means one or more X or a set of X. The description may use the phrases "in an embodiment," "In some embodiments," "in one implementation," "In some implementations," "in some examples", and the like, each of which may refer to one or more of the same or different embodiments, implementations, and/or examples. Furthermore, the terms "comprising," "including," "having," and the like, as used with respect to the present disclosure, are synonymous.

The term "access technology" at least in some examples refers to the technology used for the underlying physical connection to a communication network. The term "radio access technology" or "RAT" at least in some examples refers to the technology used for the underlying physical connection to a radio based communication network. The term "radio technology" at least in some examples refers to technology for wireless transmission and/or reception of electromagnetic radiation for information transfer. The term "RAT type" at least in some examples may identify a transmission technology and/or communication protocol used in an access network. Examples of access technologies include wired access technologies (e.g., wireline, wireline-cable, wireline broadband forum, Ethernet and variants thereof, fiber optics networks, digital subscriber line (DSL)

and variants thereof, Data Over Cable Service Interface Specification (DOCSIS) technologies, hybrid fiber-coaxial (HFC) technologies, and/or the like) and wireless access technologies/RATs (e.g., including any of those listed in '285 and '757).

The term "data set" or "dataset" at least in some examples refers to a collection of data; a "data set" or "dataset" may be formed or arranged in any type of data structure. In some examples, one or more characteristics can define or influence the structure and/or properties of a dataset such as the number and types of attributes and/or variables, and various statistical measures (e.g., standard deviation, kurtosis, and/or the like). The term "data structure" at least in some examples refers to a data organization, management, and/or storage format. Additionally or alternatively, the term "data structure" at least in some examples refers to a collection of data values, the relationships among those data values, and/or the functions, operations, tasks, and the like, that can be applied to the data. Examples of data structures include primitives (e.g., Boolean, character, floating-point numbers, fixed-point numbers, integers, reference or pointers, enumerated type, and/or the like), composites (e.g., arrays, records, strings, union, tagged union, and/or the like), abstract data types (e.g., data container, list, tuple, associative array, map, dictionary, set (or dataset), multiset or bag, stack, queue, graph (e.g., tree, heap, and the like), and/or the like), routing table, symbol table, quad-edge, blockchain, purely-functional data structures (e.g., stack, queue, (multi) set, random access list, hash consing, zipper data structure, and/or the like).

The term "telemetry" at least in some examples refers to the in situ collection of measurements, metrics, or other data (often referred to as "telemetry data" or the like) and their conveyance to another device or equipment. Additionally or alternatively, the term "telemetry" at least in some examples refers to the automatic recording and transmission of data from a remote or inaccessible source to a system for monitoring and/or analysis. The term "telemetry data" at least in some examples refers to the measurements, metrics, or other data collected via instrumentation and/or collected by a telemeter, a telemetry system, and/or telemetry pipeline. Examples of telemetry data can include any of the metrics discussed in Intel® VTune™ Profiler User Guide, Intel Corp., version 2023.1 (31 Mar. 2023), the contents of which are hereby incorporated by reference in its entirety. Additionally or alternatively, "telemetry data" can include performance measurements (see e.g., [TS28552]), key performance indicators (KPIs) (see e.g., [TS28554]), performance threshold monitoring events (see e.g., [TS28532]), and/or fault supervision events (see e.g., [TS28532]). Additionally or alternatively, "telemetry data" can include any of the measurements/metrics discussed herein; network identifiers (IDs), session IDs, application instance IDs, and/or the like (including any of those discussed herein); and/or any other type of data such as any of those discussed herein. In some examples, suitable instrumentation and/or tracing mechanisms and/or techniques can be used to measure and/or collect telemetry data.

The term "serving cell" at least in some examples refers to a primary cell (PCell) for a UE in a connected mode or state (e.g., RRC_CONNECTED) and not configured with carrier aggregation (CA) and/or dual connectivity (DC). Additionally or alternatively, the term "serving cell" at least in some examples refers to a set of cells comprising zero or more special cells and one or more secondary cells for a UE in a connected mode or state (e.g., RRC_CONNECTED) and configured with CA. The term "primary cell" or "PCell"

at least in some examples refers to a master cell group (MCG) cell, operating on a primary frequency, in which a UE either performs an initial connection establishment procedure or initiates a connection re-establishment procedure. The term "primary secondary cell", "primary SCG cell", or "PSCell" at least in some examples refers to a primary cell of a secondary cell group (SCG). The term "secondary cell" or "SCell" at least in some examples refers to a cell providing additional radio resources on top of a special cell (SpCell) for a UE configured with CA. The term "special cell" or "SpCell" at least in some examples refers to a PCell for non-DC operation or refers to a PCell of an MCG or a PSCell of an SCG for DC operation. In some examples, the terms "PCell" and "PSCell" are collectively referred to as a "special cell", "spCell", or "SpCell".

The term "handover" or "HO" at least in some examples refers to the transfer of a user's connection from one radio channel to another (can be the same or different cell). Additionally or alternatively, the term "handover" or "HO" at least in some examples refers to the process in which a radio access network changes the radio transmitters, radio access mode, and/or radio system used to provide the bearer services, while maintaining a defined bearer service QoS. The term "conditional PSCell addition" or "CPA" at least in some examples refers to a PSCell addition procedure that is executed only when PSCell addition execution condition is met. The term "conditional PSCell change" or "CPC" at least in some examples refers to a PSCell change procedure that is executed only when PSCell change execution condition is met. The term "conditional PSCell addition or change" or "CPAC" at least in some examples refers to a CPA and/or a CPC.

Although many of the various examples in the present disclosure are provided with use of specific cellular/mobile network terminology, it will be understood these examples may be applied to many other deployments of wide area networks and local wireless networks, as well as the integration of wired networks (including optical networks and associated fibers, transceivers, and/or the like). Furthermore, various standards (e.g., 3GPP, ETSI, O-RAN, and/or the like) define aspects for implementing such standards, but it should be understood that the requirements of any particular standard should not limit the aspects discussed herein, and such requirements can be modified by the aspects discussed herein, or can be used in combination with the aspects discussed herein. Aspects of the inventive subject matter may be referred to herein, individually and/or collectively, merely for convenience and without intending to limit the scope of this application to any single aspect or inventive concept that is/are disclosed. Although specific aspects have been illustrated and described herein, it should be appreciated that any arrangement capable of achieving the same purpose may be substituted for the specific aspects shown and described herein. This disclosure is intended to cover any and all adaptations or variations of various aspects. Combinations of the various aspects described herein and other aspects not specifically described herein will be apparent to those of skill in the art upon reviewing the above description.

The invention claimed is:

1. An apparatus, comprising:

memory circuitry to store a network energy savings (NES) graph neural network (GNN) model; and processor circuitry connected to the memory circuitry, wherein the processor circuitry is to:

operate the NES GNN model to predict, for a plurality of network nodes in a wireless network based on a graph of the wireless network, at least one NES parameter that indicates a control parameter to be adjusted for NES in the wireless network; and send data related to the predicted at least one NES parameter to at least one network node of the plurality of network nodes, wherein the data is to cause the at least one network node to adjust the control parameter according to the at least one NES parameter.

2. The apparatus of claim 1, wherein the processor circuitry is to: generate the graph for use by the NES GNN model.

3. The apparatus of claim 1, wherein the graph includes a set of vertices and a set of edges, wherein individual vertices in the set of vertices represents a corresponding network node in the wireless network, and individual edges in the set of edges represents a corresponding connection between two network nodes in the wireless network.

4. The apparatus of claim 3, wherein the graph includes a set of feature vectors, individual feature vectors in the set of feature vectors includes collected data for a corresponding network node of the plurality of network nodes.

5. The apparatus of claim 4, wherein, to operate the NES GNN model, the processor circuitry is to:

determine embeddings for an individual vertex in the set of vertices based on respective feature vectors of one or more vertices that are neighbors of the individual vertex; and generate a new representation of the wireless network based on the determined embeddings.

6. The apparatus of claim 5, wherein the collected data for the corresponding network node is selected from a group comprising: power amplifier data, radiofrequency (RF) circuit energy consumption data, RF chain circuit energy consumption data, power supply data, renewable energy source (RES) data, processor states of individual processors in the corresponding network node, data volume per network node, throughput, data rate, network-related setup failures, number of connected users, bandwidth utilization, or any combination thereof.

7. The apparatus of claim 1, wherein a last layer of the NES GNN model is a fully connected neural network (FCNN), wherein the FCNN maps an output of the GNN to predicted NES parameters.

8. The apparatus of claim 1, wherein the processor circuitry is to: train the NES GNN model using supervised learning or reinforcement learning.

9. The apparatus of claim 1, wherein the NES GNN is a graph convolutional neural network or a graph attention network.

10. The apparatus of claim 1, wherein the predicted at least one NES parameter is selected from a group comprising: one or more radiofrequency (RF) chains to be turned on or off, a scaling factor for power back-off at a power amplifier, one or more radio units (RUs) to be shut off or placed in a sleep mode, a processor state for individual processors or individual processor cores, a configuration of resources to be used for virtualization containers or virtual machines, or any combination thereof.

11. The apparatus of claim 1, wherein the at least one network node is a user equipment (UE), a radio unit (RU), a distributed unit (DU), or a centralized unit (CU) in a distributed radio access network (RAN) architecture or a centralized RAN architecture.

12. The apparatus of claim 1, wherein the at least one network node is a UE, a macrocell network access node (NAN), or a small cell NAN.

13. The apparatus of claim 1, wherein the apparatus is a RAN intelligent controller (RIC).

14. A non-transitory computer readable medium (NT-CRM) comprising instructions for operating a network energy savings (NES) graph neural network (GNN) model, wherein execution of the instructions by one or more processors is to cause a compute node to:

operate the NES GNN model to predict, for a plurality of network nodes in a wireless network based on a graph of the wireless network, at least one NES parameter that indicates a control parameter to be adjusted for NES in the wireless network; and send data related to the predicted at least one NES parameter to at least one network node of the plurality of network nodes, wherein the data is to cause the at least one network node to adjust the control parameter according to the at least one NES parameter.

15. The NTCRM of claim 14, wherein the graph includes a set of vertices and a set of edges, wherein individual vertices in the set of vertices represents a corresponding network node in the wireless network, and individual edges in the set of edges represents a corresponding connection between two network nodes in the wireless network.

16. The NTCRM of claim 15, wherein the graph includes a set of feature vectors, individual feature vectors in the set of feature vectors includes collected data for a corresponding network node of the plurality of network nodes.

17. The NTCRM of claim 16, wherein, to operate the NES GNN model, execution of the instructions is to cause the compute node to:

determine embeddings for an individual vertex in the set of vertices based on respective feature vectors of one or more vertices that are neighbors of the individual vertex; and generate a new representation of the wireless network based on the determined embeddings.

18. The NTCRM of claim 17, wherein:

the collected data for the corresponding network node includes one or more of: power amplifier data, radiofrequency (RF) circuit energy consumption data, RF chain circuit energy consumption data, power supply data, renewable energy source (RES) data, processor states of individual processors in the corresponding network node, data volume per network node, throughput, data rate, network-related setup failures, number of connected users, or bandwidth utilization; and the predicted at least one NES parameter includes one or more of: one or more RF chains to be turned on or off, a scaling factor for power back-off at a power amplifier, one or more radio units (RUs) to be shut off or placed in a sleep mode, a processor state for individual processors or individual processor cores, or a configuration of resources to be used for virtualization containers or virtual machines.

19. The NTCRM of claim 14, wherein the NES GNN is a graph convolutional neural network or a graph attention network, and the NES GNN model is connected to a fully connected neural network (FCNN), wherein the FCNN maps outputs of the GNN to predicted NES parameters.

20. The NTCRM of claim 14, wherein execution of the instructions is to cause the compute node to: train the NES GNN model using supervised learning or reinforcement learning.

* * * * *